United States Patent
Wu

(10) Patent No.: US 12,022,183 B2
(45) Date of Patent: Jun. 25, 2024

(54) PHOTOGRAPHING METHOD, GRAPHICAL USER INTERFACE, AND ELECTRONIC DEVICE

(71) Applicant: Huawei Technologies Co., Ltd., Shenzhen (CN)

(72) Inventor: Lei Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 17/922,252

(22) PCT Filed: Apr. 30, 2021

(86) PCT No.: PCT/CN2021/091754
§ 371 (c)(1),
(2) Date: Oct. 28, 2022

(87) PCT Pub. No.: WO2021/219141
PCT Pub. Date: Nov. 4, 2021

(65) Prior Publication Data
US 2023/0188826 A1   Jun. 15, 2023

(30) Foreign Application Priority Data
Apr. 30, 2020   (CN) .......................... 202010371511.X

(51) Int. Cl.
*H04N 23/611*   (2023.01)
*H04N 23/62*   (2023.01)
*H04N 23/80*   (2023.01)

(52) U.S. Cl.
CPC .......... *H04N 23/611* (2023.01); *H04N 23/62* (2023.01); *H04N 23/80* (2023.01)

(58) Field of Classification Search
CPC ...... H04N 23/611; H04N 23/62; H04N 23/80; H04N 23/631; H04N 23/698; H04N 23/90
See application file for complete search history.

(56) References Cited

U.S. PATENT DOCUMENTS

| | | | |
|---|---|---|---|
| 9,171,198 B1 * | 10/2015 | Raffle | G02B 27/01 |
| 11,212,449 B1 * | 12/2021 | Manzari | H04N 23/633 |
| 11,895,391 B2 * | 2/2024 | Missig | H04N 7/141 |
| 2014/0313294 A1 * | 10/2014 | Hoffman | G06F 3/04883 |
| | | | 348/46 |
| 2016/0171320 A1 * | 6/2016 | Nagata | G06F 3/005 |
| | | | 348/78 |
| 2017/0060242 A1 * | 3/2017 | Gill | G02B 5/1871 |
| 2018/0220080 A1 * | 8/2018 | Mojaver | H04N 23/60 |
| 2020/0368616 A1 * | 11/2020 | Delamont | H04N 13/239 |

* cited by examiner

*Primary Examiner* — Hung H Lam
(74) *Attorney, Agent, or Firm* — Conley Rose, P.C.

(57) ABSTRACT

A photographing method includes an electronic device that recognizes a gesture of a user using a front-facing camera, and sequentially displays a series of images in a preview box when recognizing a specific gesture. Preview angles presented by the series of images are gradually changed. For example, when the front-facing camera recognizes a gesture of opening a palm and pushing forward, the preview angles presented by the series of images sequentially displayed by the electronic device in the preview box are gradually increased, to present more scenes in the preview box.

20 Claims, 43 Drawing Sheets

PHOTOGRAPHING METHOD, GRAPHICAL USER INTERFACE, AND ELECTRONIC DEVICE

CROSS-REFERENCE TO RELATED APPLICATIONS

This is a U.S. National Stage of International Patent Application No. PCT/CN2021/091754 filed on Apr. 30, 2021, which claims priority to Chinese Patent Application No. 202010371511.X filed on Apr. 30, 2020. Both of the aforementioned applications are hereby incorporated by reference in their entireties.

TECHNICAL FIELD

This application relates to the field of terminal technologies, and in particular, to a photographing method, a graphical user interface, and an electronic device.

BACKGROUND

With development of electronic technologies, a user may capture various photos and videos by using a camera of an electronic device such as a mobile phone or a tablet computer, to record beautiful pictures such as a wonderful moment and a moving scene.

SUMMARY

This application is intended to provide a photographing method, a graphical user interface (graphic user interface, GUI), and an electronic device, to support a user in adjusting an angle of view during photographing preview by using a gesture, so that the user does not need to touch a screen with a finger, and an operation is convenient. In addition, in the photographing method, the user may be further supported in adjusting framing while adjusting the angle of view, in other words, adjustment of the angle of view and adjustment of framing may be performed at the same time, the user can gradually change a preview angle while performing framing, and the user can feel impact of a change of the angle of view on framing. In this way, it is convenient for the user to quickly obtain a desired angle of view and a desired view, so that a photographing process is more efficient.

The objective and another objective are achieved by using features in the independent claims. Further implementations are reflected in the dependent claims, the specification, and the accompanying drawings.

According to a first aspect, this application provides a photographing method. The method is applied to an electronic device including a screen, a first camera, and a second camera. The first camera and the screen are disposed on a same side of the electronic device. The method may include: The electronic device starts the first camera and the second camera; and displays a preview interface on the screen, where a first image from the second camera may be displayed in the preview interface; the electronic device may detect, by using the first camera, that a user makes a first gesture; display a second image from the second camera in the preview interface, where an angle of view of the second image is greater than an angle of view of the first image; and detect a first user input; and the electronic device may store, as a picture or a video, a third image that is from the second camera and that is displayed in the preview interface.

In this application, the first camera may be a front-facing camera, and may be configured to collect an image of the user. The second camera may be a front-facing camera or a rear-facing camera. The second camera may be configured to collect an image of a scene. For example, in a front-facing photographing scenario, the second camera is a front-facing camera; or in a rear-facing photographing scenario, the second camera is a rear-facing camera. The second camera may be one camera, for example, a common camera. Alternatively, the second camera may be a plurality of cameras with different optical angles, for example, a super telephoto camera, a telephoto camera, a common camera, a wide-angle camera, and an ultra-wide-angle camera.

In this application, a preview image that is from a camera and that is displayed in the preview interface is obtained by cropping an image collected by the camera. The electronic device may crop, in a center cropping manner, the image collected by the camera. When an angle of view presented by an image in a cropping region is the same as an angle of view presented by the image collected by the camera, the preview image displayed in the preview interface is the image collected by the camera. For example, the electronic device displays the first image from the second camera in the preview interface. The first image may be obtained by the electronic device by cropping, in the center cropping manner, an image collected by the second camera. A central location of the first image may coincide with a central location of the image collected by the second camera.

In this application, the first user input may be a user operation indicating to trigger photographing or a user operation indicating to end video recording. Specifically, when detecting the user operation indicating to trigger photographing, the electronic device may store, as a picture, an image currently displayed in the preview interface. The image currently displayed in the preview interface is the third image from the second camera. When detecting the user operation indicating to end video recording, the electronic device may store, as a video, an image displayed in the preview interface in a period from start of video recording to end of video recording.

With reference to the first aspect, in some embodiments, the angle of view of the second image that is from the second camera and that is displayed in the preview interface may be gradually increased. This may be specifically implemented as follows: The electronic device sequentially displays M second images from the second camera in the preview interface, where angles of view of the M second images are gradually increased, and M is a positive integer greater than or equal to 2.

With reference to the first aspect, in some embodiments, in the front-facing photographing scenario, the second camera and the first camera may be a same camera, for example, a front-facing wide-angle camera or a common front-facing camera.

With reference to the first aspect, in some embodiments, an angle of view of the third image may be the same as the angle of view of the second image.

With reference to the first aspect, in some embodiments, the electronic device may first detect, by using the first camera, that the user makes the first gesture; and then the electronic device may detect, by using the first camera, that the user makes a second gesture; and in response to the second gesture, the electronic device may display a fourth image from the second camera in the preview interface, where an angle of view of the fourth image is less than the angle of view of the second image, and the angle of view of the fourth image that is from the second camera and that is displayed in the preview interface may be gradually decreased. This may be specifically implemented as follows:

The electronic device sequentially displays N second images from the second camera in the preview interface, where angles of view of the N second images are gradually increased, and N is a positive integer greater than or equal to 2.

With reference to the first aspect, in some embodiments, an angle of view of the third image may be the same as the angle of view of the first image.

In a possible implementation, the electronic device may detect only that the user makes the second gesture, and then detect the first user input. In this case, the angle of view of the third image may be less than the angle of view of the first image.

In another possible implementation, the electronic device may sequentially detect that the user makes the second gesture and that the user makes the first gesture, and then detect the first user input. In this case, an angle of view of the third image may be the same as the angle of view of the first image.

In this application, based on an image collected by the first camera, the electronic device may detect, for a plurality of times, that the user makes the first gesture and detect, for a plurality of times, that the user makes the second gesture. A sequence of detecting the first gesture for a plurality of times and detecting the second gesture for a plurality of times is not limited.

With reference to the first aspect, in some embodiments, the first gesture may be a gesture of opening a palm and pushing forward.

Specifically, the electronic device may collect an image and depth information of a hand of the user by using the first camera. When the image of the hand includes an image of the open palm, and the depth information indicates that the hand approaches the first camera, the electronic device may detect that the user makes the first gesture. The first gesture includes: the user opens the palm and the hand of the user approaches the first camera.

With reference to the first aspect, in some embodiments, the second gesture may be a gesture of clenching a fist and pulling backward.

Specifically, the electronic device may collect an image and depth information of a hand of the user by using the first camera. When the image of the hand includes an image in which the hand clenches a fist, and the depth information indicates that the hand moves away from the first camera, the electronic device detects that the user makes the second gesture. The second gesture includes: the hand of the user clenches a fist and the hand of the user moves away from the first camera.

With reference to the first aspect, in some embodiments, the second camera includes H cameras with different angles of view, the H cameras are front-facing cameras or rear-facing cameras, and second images displayed in the preview interface may be sequentially from the H cameras with ascending angles of view, where H is a positive integer greater than or equal to 2.

For example, H is 2, that is, the second camera includes two cameras with different angles of view. The two cameras may be respectively a third camera and a fourth camera. An angle of view of the fourth camera is greater than an angle of view of the third camera. The first image may be from the third camera, and the second image may be from the fourth camera. Both the third camera and the fourth camera may be front-facing cameras or rear-facing cameras.

With reference to the first aspect, in some embodiments, the second camera includes H cameras with different angles of view, the H cameras are front-facing cameras or rear-facing cameras, and fourth images displayed in the preview interface may be sequentially from the H cameras with descending angles of view, where H is a positive integer greater than or equal to 2.

For example, H is 2, that is, the second camera includes two cameras with different angles of view. The two cameras may be respectively a third camera and a fourth camera. An angle of view of the fourth camera is greater than an angle of view of the third camera. The fourth image may be from the third camera, and the second image may be from the fourth camera.

With reference to the first aspect, in some embodiments, if a speed at which a hand of the user approaches the first camera when the user makes the first gesture exceeds a first speed, the angle of view of the second image may be the same as a first angle of view. The first angle of view is the same as an angle of view of a wide-angle camera, the first angle of view is the same as an angle of view of an ultra-wide-angle camera, a difference between the first angle of view and an angle of view of a wide-angle camera is less than a first value, or a difference between the first angle of view and an angle of view of an ultra-wide-angle camera is less than a second value.

That a difference between the first angle of view and an angle of view of a wide-angle camera is less than a first value means that the first angle of view is very close to the angle of view of the wide-angle camera, and that a difference between the first angle of view and an angle of view of an ultra-wide-angle camera is less than a second value means that the first angle of view is very close to the angle of view of the ultra-wide-angle camera.

For example, the first angle of view may be the angle of view of the wide-angle camera. The electronic device may collect the depth information of the hand of the user by using the first camera. The depth information may indicate that the hand of the user approaches the first camera. Based on a distance at which the hand of the user approaches the first camera in a time t, the electronic device may calculate the speed at which the hand of the user approaches the first camera when the user makes the first gesture. When detecting that the speed at which the hand of the user approaches the first camera when the hand of the user makes the first gesture exceeds the first speed, the electronic device may perform switching to the angle of view (namely, the first angle of view) of the wide-angle camera in one step in the preview interface.

In other words, the user may open the palm and quickly push forward. When a speed of pushing forward exceeds the first speed, switching to a larger angle of view, for example, the angle of view of the wide-angle camera, may be implemented in one step, to quickly switch the angle of view.

With reference to the first aspect, in some embodiments, if a speed at which the hand of the user moves away from the first camera when the user makes the second gesture exceeds a second speed, the angle of view of the fourth image may be the same as the angle of view of the first image.

For example, the electronic device 100 may collect the depth information of the hand of the user by using the first camera. The depth information may indicate that the hand of the user moves away from the first camera. Based on a distance at which the hand of the user moves away from the first camera in a time t, the electronic device 100 may calculate the speed at which the hand of the user moves away from the first camera when the user makes the second gesture. When detecting that the speed at which the hand of the user moves away from the first camera when the hand of the user makes the second gesture exceeds the second speed, the electronic device 100 may perform switching to an angle of view of a common camera in one step in the preview interface.

In other words, the user may clench a fist and quickly pull forward. When a speed of pulling backward exceeds the second speed, switching to a smaller angle of view, for example, the angle of view of the common camera, may be implemented in one step, to quickly switch the angle of view.

According to a second aspect, this application provides a photographing method. The method is applied to an electronic device including a screen and a camera. The method may include: The electronic device starts the camera; and may display a preview interface on the screen, where a first image from the camera is displayed in the preview interface; the electronic device detects that the electronic device makes a first movement, where the first movement is a movement of moving away from a to-be-photographed object by the electronic device and a moving speed of the electronic device exceeds a first speed; the electronic device may display a second image from the camera in the preview interface, where an angle of view of the second image is greater than an angle of view of the first image; and detect a second user input; and the electronic device may store, as a picture or a video, a third image that is from the camera and that is displayed in the preview interface.

With reference to the second aspect, in some embodiments, the second image that is from the camera and that is displayed in the preview interface may be gradually increased. This may be specifically implemented as follows: The electronic device may sequentially display K second images from the camera in the preview interface, where angles of view of the K second images are gradually increased, an angle of view of a second image that is first displayed in the K second images may be the same as the angle of view of the first image, and K is a positive integer greater than or equal to 2.

With reference to the second aspect, in some embodiments, an angle of view of the third image may be the same as the angle of view of the second image.

With reference to the second aspect, in some embodiments, that the electronic device detects that the electronic device makes a first movement specifically includes: When detecting that an image of the to-be-photographed object is reduced, the electronic device may determine that the electronic device makes the movement of moving away from the to-be-photographed object; and if a degree by which the image of the to-be-photographed object is reduced in a unit time exceeds a first value, determine that the moving speed of the electronic device exceeds the first speed.

In another possible implementation, that the electronic device detects that the electronic device makes a first movement specifically includes: The electronic device may detect, by using a motion sensor, that the electronic device makes the movement of moving away from the to-be-photographed object and the moving speed of the electronic device exceeds the first speed.

With reference to the second aspect, in some embodiments, the electronic device may detect that the electronic device makes a second movement, where the second movement is a movement of approaching the to-be-photographed object by the electronic device and the moving speed of the electronic device exceeds a second speed; and the electronic device may display a fourth image from the camera in the preview interface, where an angle of view of the fourth image is less than the angle of view of the second image.

With reference to the second aspect, in some embodiments, the fourth image that is from the camera and that is displayed in the preview interface may be gradually decreased. This may be specifically implemented as follows: The electronic device may sequentially display J fourth images from the camera in the preview interface, where angles of view of the J fourth images are gradually decreased, an angle of view of a fourth image that is first displayed in the J fourth images is the same as the angle of view of the first image, and J is a positive integer greater than or equal to 2.

With reference to the second aspect, in some embodiments, an angle of view of the third image may be the same as the angle of view of the fourth image. With reference to the second aspect, in some embodiments, that the electronic device detects that the electronic device makes a second movement specifically includes: When detecting that the image of the to-be-photographed object is enlarged, the electronic device may determine that the electronic device makes the movement of approaching the to-be-photographed object; and if a degree by which the image of the to-be-photographed object is enlarged in the unit time exceeds the first value, determine that the moving speed of the electronic device exceeds the second speed.

In another possible implementation, that the electronic device detects that the electronic device makes a second movement specifically includes: The electronic device may detect, by using the motion sensor, that the electronic device makes the movement of approaching the to-be-photographed object and the moving speed of the electronic device exceeds the second speed.

According to a third aspect, this application provides a photographing method. The method is applied to an electronic device including a screen and a camera. The method includes: The electronic device may start the camera; and display a preview interface on the screen, where a first image from the camera may be displayed in the preview interface; the electronic device may detect that a quantity N1 of faces included in the first image is greater than a quantity N2 of human bodies included in the first image, where N1 and N2 are positive integers, the electronic device may display a second image from the camera in the preview interface, where an angle of view of the second image is greater than an angle of view of the first image; and detect a second user input; and the electronic device may store, as a picture or a video, a third image that is from the camera and that is displayed in the preview interface.

With reference to the third aspect, in some embodiments, angles of view of second images that are from the camera and that are sequentially displayed in the preview interface may be gradually increased. This may be specifically implemented as follows: The electronic device may sequentially display S second images from the camera in the preview interface, where angles of view of the S second images are gradually increased, an angle of view of a second image that is first displayed in the S second images is the same as the angle of view of the first image, and S is a positive integer greater than or equal to 2.

With reference to the third aspect, in some embodiments, an angle of view of the third image may be the same as the angle of view of the second image.

According to a fourth aspect, this application provides an electronic device. The electronic device may include a screen, a first camera, a second camera, a memory, one or more processors, a plurality of applications, and one or more programs. The one or more processors are configured to execute one or more computer programs stored in the memory.

The first camera may be a front-facing camera, and may be configured to collect an image of a user. The second camera may be a front-facing camera or a rear-facing camera. The second camera may be configured to collect an image of a scene. The second camera may be one camera, for example, a common camera. Alternatively, the second camera may be a plurality of cameras with different optical angles, for example, a super telephoto camera, a telephoto camera, a common camera, a wide-angle camera, and an ultra-wide-angle camera.

The screen may be used to display a preview interface. The preview interface may be used to display an image collected by the second camera, and may be further used to display an image collected by the first camera.

For a specific implementation of each component included in the electronic device in the fourth aspect, refer to the photographing preview method described in the first aspect. Details are not described herein.

According to a fifth aspect, this application provides an electronic device. The electronic device may include an apparatus. The apparatus may implement any possible implementation of the first aspect, any possible implementation of the second aspect, or any possible implementation of the third aspect.

According to a sixth aspect, this application further provides a photographing apparatus. The apparatus has a function of implementing actual behavior of an electronic device in a method. The function may be implemented by using hardware, or may be implemented by using hardware executing corresponding software. The hardware or software includes one or more modules corresponding to the function.

According to a seventh aspect, this application provides a computer device, including a memory, a processor, and a computer program that is stored in the memory and that may be run on the processor. When the processor executes the computer program, the computer device is enabled to implement any possible implementation of the first aspect, any possible implementation of the second aspect, or any possible implementation of the third aspect.

According to an eighth aspect, a computer program product including instructions is provided. When the computer program product is run on an electronic device, the electronic device is enabled to perform any possible implementation of the first aspect, any possible implementation of the second aspect, or any possible implementation of the third aspect.

According to a ninth aspect, a computer-readable storage medium is provided, and includes instructions. When the instructions are run on an electronic device, the electronic device is enabled to perform any possible implementation of the first aspect, any possible implementation of the second aspect, or any possible implementation of the third aspect.

DESCRIPTION OF EMBODIMENTS

Figure 1:
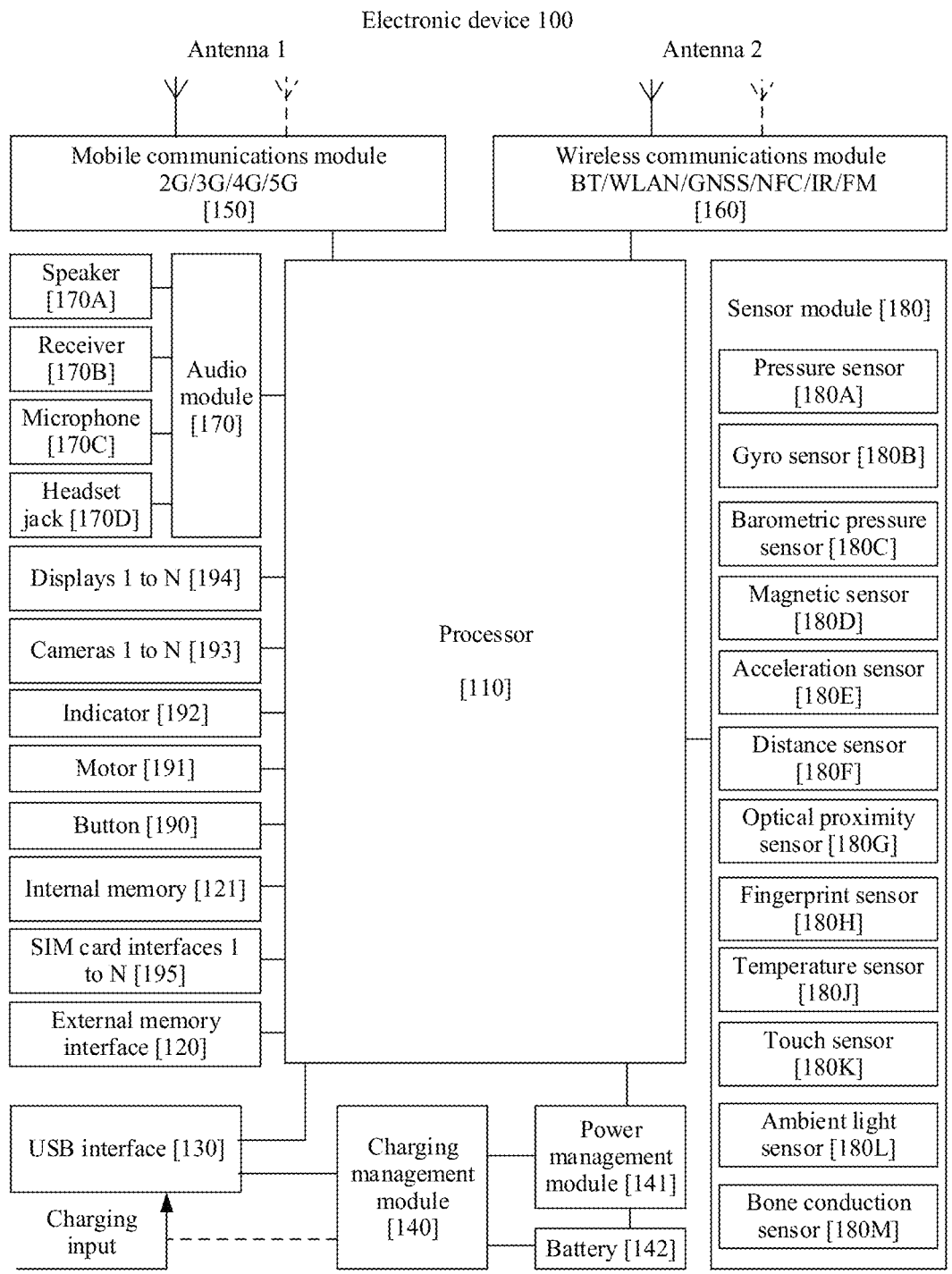
FIG. 1 is a schematic diagram of a structure of an electronic device according to an embodiment of this application.

Terms used in the following embodiments of this application are merely intended to describe particular embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that the term "and/or" used in this application refers to and includes any or all possible combinations of one or more of the listed items.

Embodiments of this application provide a photographing method. In the photographing method, a user may be supported in adjusting an angle of view during photographing preview by using a gesture, and does not need to touch a screen, and a user operation is convenient. In addition, in the photographing method, the user may be further supported in performing framing while adjusting a preview angle, in other words, adjustment of the preview angle and framing may be performed at the same time, the user can gradually adjust the preview angle while performing framing, and the user can feel impact of a change of the preview angle on framing. In this way, it is convenient for the user to quickly obtain a desired angle of view and a desired view, so that a photographing process is more efficient. However, in the conventional technology, when the user wants to adjust the preview angle, the user needs to hold an electronic device close and touch the screen with a finger to select a zoom ratio. In this case, a view is usually not desired by the user. For example, the view faces the ground, and the user usually needs to adjust the preview angle and then adjust a photographing posture to perform framing again, for example, holds up a mobile phone towards a scene. In other words, in the conventional technology, it is difficult for the user to adjust the preview angle and perform framing at the same time.

The photographing method provided in embodiments of this application may be applied to an electronic device including a plurality of cameras. The electronic device may recognize a gesture of a user by using a front-facing camera. When recognizing a specific gesture, the electronic device sequentially displays a series of images in a preview box. Preview angles presented by the series of images are gradually changed. That preview angles presented by the series of images are gradually changed includes that the preview angles are gradually increased or gradually decreased. For example, when the front-facing camera recognizes a gesture of opening a palm and pushing forward, the preview angles presented by the series of images sequentially displayed by the electronic device in the preview box are gradually increased, to present more scenes in the preview box. For another example, when the front-facing camera recognizes a gesture of clenching a fist and pulling backward, the preview angles presented by the series of images sequentially displayed by the electronic device in the preview box are gradually decreased, to gradually reduce scenes presented in the preview box. "Forward" in "opening a palm and pushing forward" means that the palm of the user approaches the electronic device, and "backward" in "clenching a fist and pulling backward" means that the user clenches a fist and moves away from the electronic device.

For the user, when the user makes the gesture of opening a palm and pushing forward, the preview angles presented by the series of images in the preview box are gradually increased, to include an increasing quantity of scenes in the preview box. When the user makes the gesture of clenching a fist and pulling backward, the preview angles presented by the series of images in the preview box are gradually decreased, to include a decreasing quantity of scenes in the preview box.

A gesture used to change the preview angles presented by the series of images displayed in the preview box is not limited in embodiments of this application.

In addition to recognizing the gesture of the user by using any one of front-facing cameras, the electronic device may further recognize the gesture of the user by using any one of rear-facing cameras.

It may be learned from the photographing method that the user may adjust, by using a mid-air gesture of a single hand, the preview angle presented by the image displayed in the preview box. Especially in a scenario in which photographing is performed by using the front-facing camera, the user usually performs photographing by straightening an arm or by using a selfie stick. However, in the photographing method in this solution, the user may conveniently adjust the preview angle presented by the image displayed in the preview box. In this way, the user does not need to repeatedly hold the electronic device close and touch a screen of the electronic device with a finger to adjust the preview angle presented by the image displayed in the preview box.

In addition, when the user holds the electronic device close to adjust the preview angle presented by the image displayed in the preview box, a scene displayed in the preview box is usually not a scene that the user wants to capture. However, in the photographing method in this solution, while adjusting the preview angle presented by the image displayed in the preview box, the user may feel a change of the scene displayed in the preview box. In this case, the change of the scene displayed in the preview box is usually a scene that the user wants to capture. In this way, the user may quickly obtain a desired view while adjusting the preview angle presented by the image displayed in the preview box.

The electronic device may be a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), a dedicated camera (for example, a single-lens reflex camera or a card camera), or the like. A specific type of the electronic device is not limited in this application.

FIG. 1 shows an example of a structure of the electronic device. As shown in FIG. 1, the electronic device 100 may include a plurality of cameras 193, for example, a common camera, a wide-angle camera, an ultra-wide-angle camera, a telephoto camera, and a super telephoto camera. The plurality of cameras 193 may be respectively disposed on both sides of the electronic device. A camera disposed on a side of a display 194 of the electronic device 100 may be referred to as a front-facing camera, and a camera disposed on a side of a rear cover of the electronic device 100 may be referred to as a rear-facing camera. The front-facing camera may be configured to collect an image of a scene facing the display 194, and the rear-facing camera may be configured to collect an image of a scene facing the rear cover of the electronic device 100.

A smaller focal length of the camera 193 indicates a larger angle of view of the camera 193, a wider framing range, and a larger quantity of scenes that can be captured. On the contrary, a larger focal length of the camera 193 indicates a smaller angle of view of the camera 193, a narrower framing range, and a smaller quantity of scenes that are at a longer distance and that can be captured. Herein, the angle of view may also be referred to as a field of view (field of view, FOV). The field of view refers to an angle range in which imaging can be performed by an optical system of a camera. For example, a focal length of the ultra-wide-angle camera usually approximately ranges from 12 millimeters (millimeter, mm) to 24 mm, and an angle of view of the ultra-wide-angle camera usually ranges from 84° to 120°; a focal length of the wide-angle camera usually approximately ranges from 24 mm to 35 mm, and an angle of view of the wide-angle camera usually ranges from 63° to 84°; a focal length of the common camera usually approximates to 50 mm, and an angle of view of the common camera usually approximates to 46°; a focal length of the telephoto camera usually approximately ranges from 135 mm to 500 mm, and an angle of view of the telephoto camera usually ranges from 5° to 18°; and a focal length of the super telephoto camera usually exceeds 500 mm, and an angle of view of the super telephoto camera usually ranges from 0° to 5°. Performance of the following three cameras in terms of the angle of view is that the ultra-wide-angle camera is better than the wide-angle camera, and the wide-angle camera is better than the common camera.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a display 194, a subscriber identification module (subscriber identification module, SIM) card interface 195, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

In some embodiments, the processor 110 such as the controller or the GPU may be configured to combine, in a multi-channel photographing scenario in a manner of splicing, partial superposition, or the like, a plurality of frames of images simultaneously collected by the plurality of cameras 193, to obtain a preview image to be displayed in a viewfinder frame, so that the electronic device 100 may simultaneously display the images collected by the plurality of cameras 193.

In some other embodiments, the processor 110 such as the controller or the GPU may be further configured to: in the multi-channel photographing scenario, perform anti-shake processing on an image collected by each camera 193, and combine images that are obtained after anti-shake processing and that correspond to the plurality of cameras 193.

The controller may be a nerve center and a command center of the electronic device 100. The controller may generate an operation control signal based on an instruction operation code and a time sequence signal, to complete control of instruction fetching and instruction execution.

The memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like. It may be understood that an interface connection relationship between the modules that is shown in embodiments of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to be connected to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be configured to monitor parameters such as a battery capacity, a battery cycle count, and a battery state of health (electric leakage and impedance).

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution to wireless communication such as 2G/3G/4G/5G applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1.

The wireless communications module 160 may provide a wireless communication solution that is applied to the electronic device 100, and that includes a wireless local area network (wireless local area network, WLAN) (for example, a wireless fidelity (wireless fidelity, Wi-Fi) network). Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 16) in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution. LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash storage device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like. The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may calculate a touch location based on a detection signal of the pressure sensor 180A.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D.

Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 1803. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or more SIM card interfaces. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. The ISP is not limited to being integrated into the processor 110, and may alternatively be disposed in the camera 193.

The camera 193 includes a lens and a photosensitive element (which may also be referred to as an image sensor), configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transfers the electrical signal to the ISP for conversion into a digital image signal, for example, an image signal in a format such as standard RGB or YUV.

In some embodiments, the camera 193 may be configured to collect depth data. For example, the camera 193 may include a (time of flight, TOF) 3D sensing module or a structured light (structured light) 3D sensing module, and is configured to obtain depth information. A camera configured to collect the depth data may be a front-facing camera or a rear-facing camera.

The video codec is configured to compress or decompress a digital image. The electronic device 100 may support one or more image codecs. In this way, the electronic device 100 may open or store pictures or videos in a plurality of encoding formats.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or more displays 194.

Figure 2B:
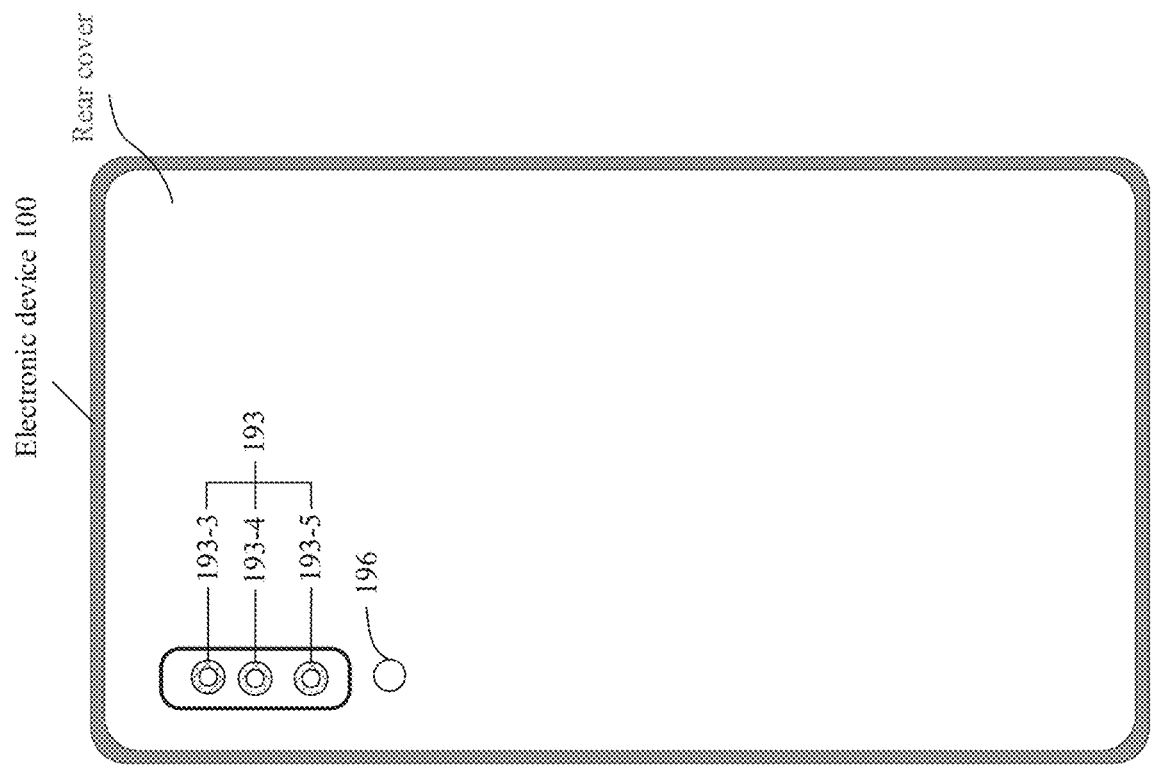
FIG. 2A and FIG. 2B are a schematic diagram of an outline structure of an electronic device according to an embodiment of this application.
Figure 2A:
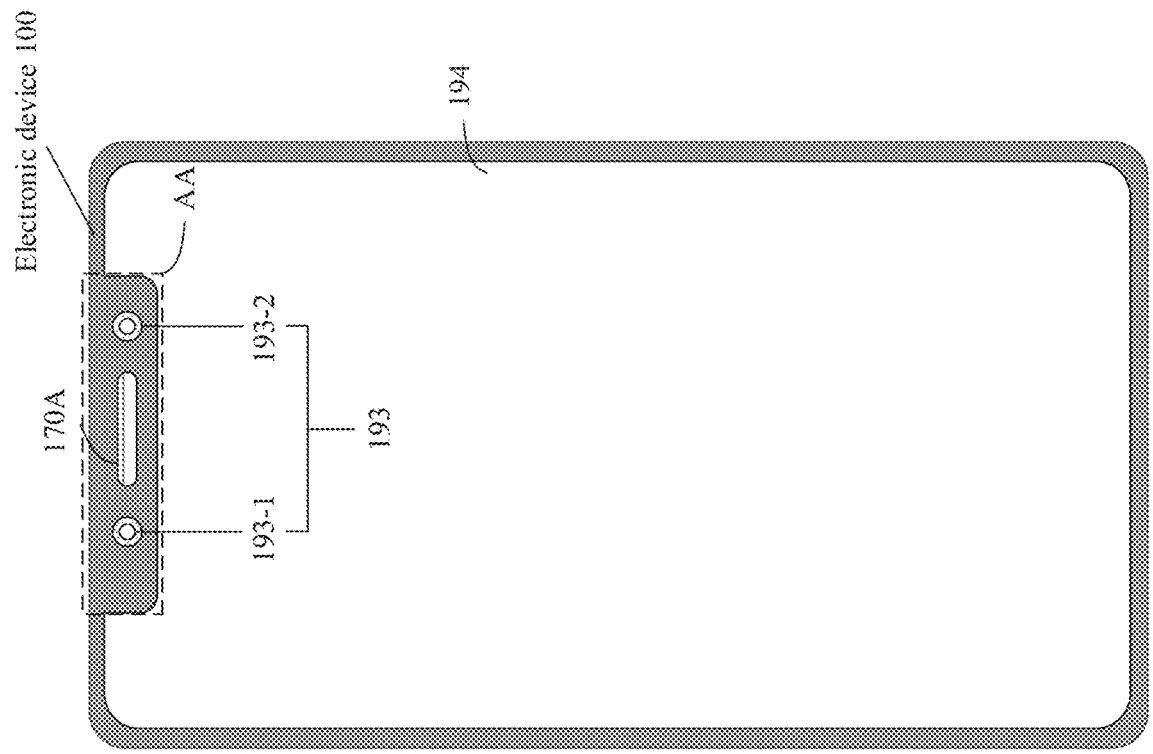

FIG. 2A and FIG. 2B are a schematic diagram of an outline structure of an electronic device 100. FIG. 2A shows a side on which a display 194 of the electronic device 100 is located. FIG. 2B shows a side on which a rear cover of the electronic device 100 is located.

The electronic device 100 may include a plurality of cameras 193. The electronic device 100 may include a plurality of front-facing cameras, for example, a front-facing camera 193-1 and a front-facing camera 193-2. The front-facing camera 193-1 may be a common camera. The front-facing camera 193-2 may be a wide-angle camera. As shown in FIG. 2A, the front-facing camera 193-1 and the front-facing camera 193-2 may be disposed at a top of the electronic device 100, for example, at a "notch" position (namely, a region AA shown in FIG. 2A) of the electronic device 100. In addition to the cameras 193, the region AA may further include a speaker 170A and the like. As shown in FIG. 2B, the electronic device 100 may include a plurality of rear-facing cameras, for example, a rear-facing camera 193-3, a rear-facing camera 193-4, and a rear-facing camera 193-5. The rear-facing camera 193-3, the rear-facing camera 193-4, and the rear-facing camera 193-5 may be respectively a common camera, a wide-angle camera, and a telephoto camera. There may further be a flash 196 and the like on the side on which the rear cover of the electronic device 100 is located.

The camera 193 may change an angle of view of a preview image in a preview box through digital zoom, may change an angle of view of a preview image in a preview box through optical zoom, or may change an angle of view of a preview image by using a combination of optical zoom and digital zoom (which is also referred to as hybrid zoom). In other words, zoom may include digital zoom, optical zoom, or hybrid zoom. Hybrid zoom is used as an example below.

The electronic device 100 may gradually change, by changing a camera configured to perform photographing in the plurality of cameras 193 and with reference to digital zoom, preview angles presented by a series of images displayed in the preview box. The camera configured to perform photographing may be a camera that is to collect an image to be displayed in the preview box. The digital zoom may be used by the electronic device 100 to increase an area of each pixel in an image collected by the camera 193, to change a focal length. This is equivalent to that the electronic device 100 crops an image collected by a camera, and then enlarges a cropped image, that is, adjusts resolution of the cropped image to resolution the same as resolution of the image before cropping. In this way, compared with the image before cropping, an area of each pixel in the enlarged cropped image is increased. In addition, an image in a part of an angle of view is cut of, so that a preview angle presented by the enlarged cropped image is decreased, to approximate to an effect of increasing a focal length. However, actually, a focal length of the camera is not changed through the digital zoom.

It is assumed that an image collected by the common camera 193-1 in the front-facing cameras is currently displayed in the preview box, and a current zoom ratio is a 1× ratio (1×). When the electronic device 100 recognizes, by using the image collected by the common camera 193-1, a gesture of opening a palm and pushing forward, the electronic device 100 first displays, in the preview box, the image collected by the common camera 193-1, and then crops an image collected by the wide-angle camera 193-2, and displays a cropped image in the preview box. Specifically, the electronic device 100 may crop, for a plurality of times, images sequentially collected by the wide-angle camera 193-2. There is an increasingly large cropping region for the plurality of times of cropping. In other words, the electronic device 100 performs a process of performing digital zoom for a plurality of times. In other words, when the gesture is made, image display may sequentially include two phases: a phase in which the image collected by the common camera 193-1 is used and a phase in which the image collected by the wide-angle camera 193-2 is used. In the phase in which the image collected by the common camera 193-1 is used, the zoom ratio is the 1× ratio 1×. In the phase in which the image collected by the wide-angle camera 193-2 is used, the zoom ratio is gradually decreased from 1×. For example, the zoom ratio is decreased from a 0.9× ratio (0.9×) to a 0.8× ratio (0.8×) or decreased from 0.8× to a 0.7× ratio (0.7×). In this way, when the gesture of opening a palm and pushing forward is made, preview angles presented by a series of images displayed in the preview box are gradually increased.

It is assumed that the image collected by the wide-angle camera 193-2 is currently displayed in the preview box, and the current zoom ratio is a wide ratio (Wide). When the electronic device 100 recognizes, by using the image collected by the wide-angle camera 193-2, a gesture of clenching a fist and pulling backward, the electronic device 100 first displays, in the preview box, the image collected by the wide-angle camera 193-2, and then crops the image collected by the wide-angle camera 193-2, and displays a cropped image in the preview box. Specifically, the electronic device 100 may crop, for a plurality of times, images sequentially collected by the wide-angle camera 193-2. There is an increasingly small cropping region for the plurality of times of cropping. In other words, the electronic device 100 performs a process of performing digital zoom for a plurality of times. In the phase in which the image collected by the wide-angle camera 193-2 is used, the zoom ratio is gradually increased from Wide. For example, the zoom ratio is increased from Wide to 0.7× or increased from 0.7× to 0.8×. When the zoom ratio is increased to 1×, the electronic device 100 displays, in the preview box, the image collected by the common camera 193-1. If the electronic device 100 still recognizes, by using the image collected by the common camera 193-1, the gesture of clenching a fist and pulling backward, the electronic device 100 may crop the image collected by the common camera 193-1, and display a cropped image in the preview box. Specifically, the electronic device 100 may crop, for a plurality of times, images sequentially collected by the common camera 193-1. There is an increasingly small cropping region for the plurality of times of cropping. In the phase in which the image collected by the common camera 193-1 is used, the zoom ratio is gradually increased from 1×. For example, the zoom ratio is increased from 1× to a 1.1× ratio (1.1×) or increased from 1.1× to a 1.2× ratio (1.2×). In this way, when the gesture of clenching a fist and pulling backward is made, preview angles presented by a series of images displayed in the preview box are gradually decreased.

When an image collected by a camera is used, a preview angle presented by an image that is from the camera and that is displayed in the preview box may be usually less than an angle of view of the camera. In this case, the image in the preview box is obtained by cropping the image collected by the camera. When the zoom ratio is changed to a specific ratio, the preview angle presented by the image displayed in the preview box may be the same as the angle of view of the camera. For example, in the phase in which the image collected by the wide-angle camera 193-2 is used (in other words, from 0.9× to Wide), a preview angle presented by an image displayed in the preview box is usually less than an angle of view of the wide-angle camera 193-2. When the zoom ratio is the wide ratio (for example, 0.6×), the preview angle presented by the image displayed in the preview box may be the same as the angle of view of the wide-angle camera 193-2.

The electronic device 100 is not limited to those shown in FIG. 1, and may further include more or fewer components. For example, the electronic device 100 may be a large-screen device such as a smart television or a smart screen. The camera 193 may be configured for the large-screen device. In a video call scenario or a front-facing photographing scenario, the large-screen device may recognize the foregoing specific gesture by using the image collected by the front-facing camera 193, and then adjust a preview angle during photographing preview, video recording preview, or video recording (including a video call). How to adjust the preview angle is described in detail in subsequent embodiments, and is not described herein.

An example user interface for an application menu on the electronic device 100 is described below.

Figure 2C:
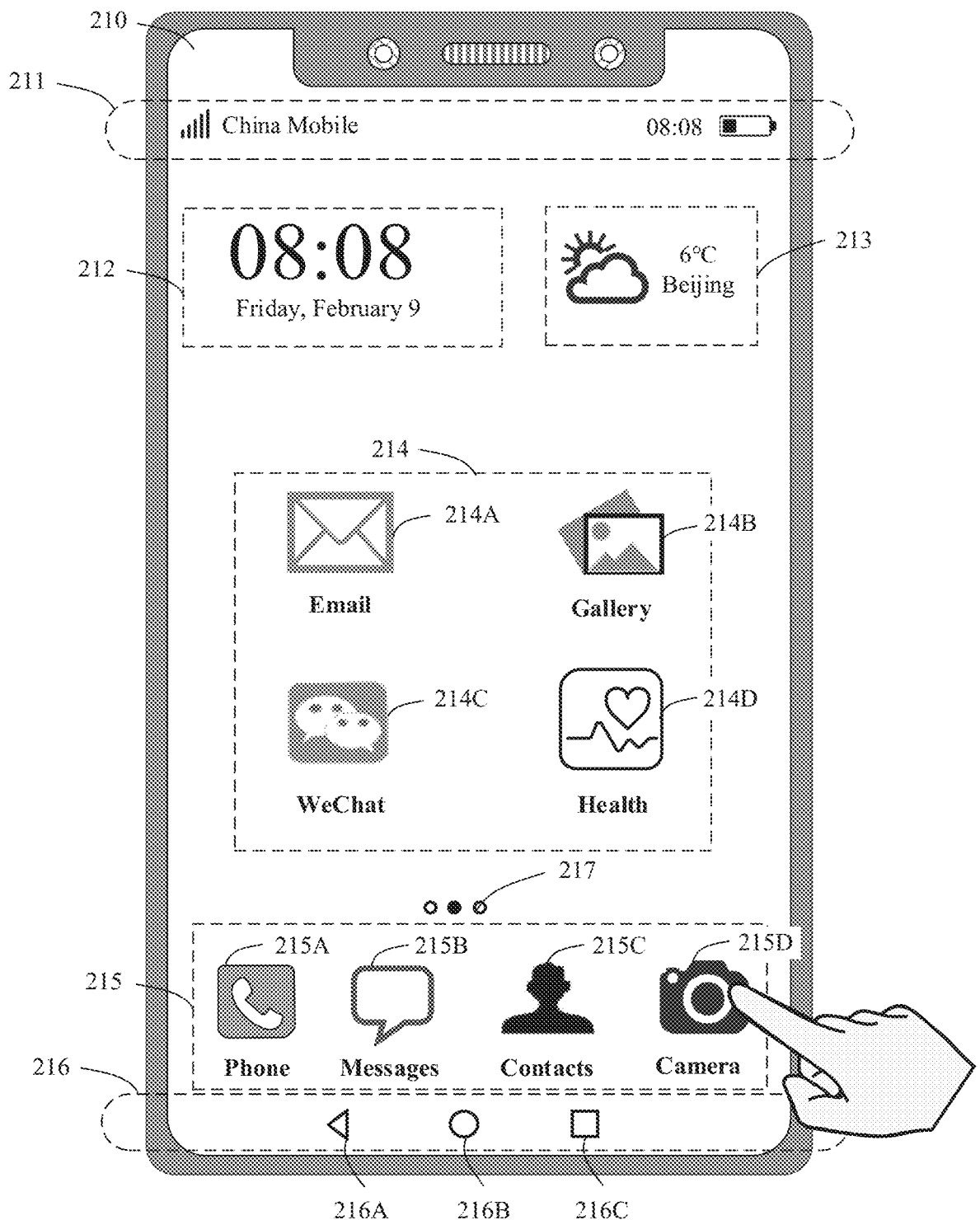
FIG. 2C shows a user interface for an application menu according to an embodiment of this application.

FIG. 2C shows an example of an example user interface 210 for the application menu on the electronic device 100.

As shown in FIG. 2C, the user interface 210 may include a status bar 211, a tray 215 that includes a list of common applications, a calendar indicator 212, a weather indicator 213, a navigation bar 216, and other application icons 214.

The status bar 211 may include one or more signal strength indicators of a mobile communication signal, one or more signal strength indicators of a wireless fidelity (wireless fidelity, Wi-Fi) signal, a battery status indicator, and a time indicator.

The calendar indicator 212 may be used to indicate current time, for example, a date, a day of a week, and hour and minute information.

The weather indicator 213 may be used to indicate a weather type, for example, from cloudy to sunny or a light rain, and may be further used to indicate information such as a temperature.

The tray 215 that includes common application icons may display a phone icon 215A, a messages icon 215B, a contacts icon 215C, and a camera icon 215D. The camera icon 215D may be used to start a camera application. For example, m response to a user operation, for example, a touch operation, that acts on the camera icon 215D, the electronic device 100 may start the camera application, to perform functions such as photographing and video recording.

The navigation bar 216 may include system navigation buttons such as a back button 216C, a home screen (Home screen) button 216B, and a button 216C for calling up a task history. When detecting that a user taps the back button 216C, the electronic device 100 may display a previous page of a current page. When detecting that the user taps the home screen button 216B, the electronic device 100 may display a home screen. When detecting that the user taps the button 216C for calling up a task history, the electronic device 100 may display a task recently opened by the user. Each navigation button may be named differently. This is not limited in this application. Each navigation button in the navigation bar 216 is not limited to a virtual button, and may be implemented as a physical button.

The other application icons 214 may include an email icon 214A, a gallery icon 214B, a WeChat icon 214C, and a health icon 214D. The gallery icon 214B may be used to start a gallery application. For example, in response to a user operation, for example, a touch operation, that acts on the gallery icon 214B, the electronic device 100 may start the gallery application, to display information such as a picture and a video stored in the electronic device 100. The picture and the video stored in the electronic device 100 include a picture and a video captured by the electronic device 100 by using the camera application. The other application icons 214 may further include more application icons. This is not limited in this embodiment of this application.

The user interface 210 may further include a page indicator 217. The other application icons may be distributed on a plurality of pages, and the page indicator 217 may be used to indicate a page on which an application currently browsed by the user is located. The user may slide to the left or to the right in a region of the other application icons, to browse an application icon on another page. When detecting that the user taps the application icon, the electronic device 100 may display a user interface of an application.

In some embodiments, the user interface 210 shown as an example in FIG. 2C may be the home screen (Home screen).

In some other embodiments, the electronic device 100 may further include a home screen button. The home screen button may be a physical button or a virtual button (for example, the button 216B). The home screen button may be used to receive an instruction from the user and return to the home screen from a currently displayed UI, so that the user can conveniently view the home screen at any time.

It may be understood that FIG. 2C merely shows an example of a user interface on the electronic device 100, and should not constitute a limitation on this embodiment of this application.

A typical photographing scenario in this application is described below.

Figure 3A:
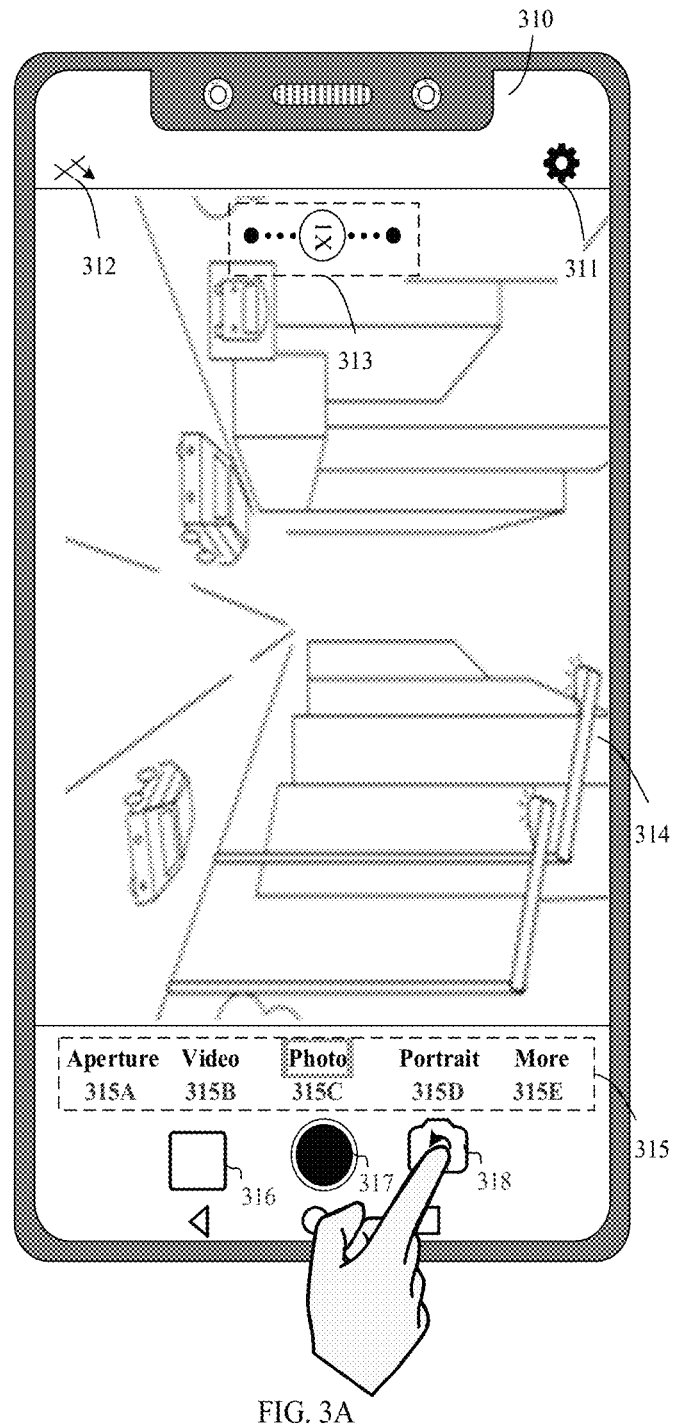
FIG. 3A and FIG. 3B show a user interface in a typical photographing scenario according to an embodiment of this application.

As shown in FIG. 2C, an electronic device may detect a touch operation acting on the camera icon 215D (for example, a tap operation on the camera icon 215D), and in response to the operation, may display a user interface 310 shown as an example in FIG. 3A. The user interface 310 may be a user interface of a camera application in a default photographing mode, and may be used by a user to perform photographing by using a default rear-facing camera. The camera application is an application for capturing an image on an electronic device such as a smartphone or a tablet computer. A name of the application is not limited in this application. In other words, the user may tap the camera icon 215D to launch the user interface 310 of the camera application. This constitutes no limitation. The user may alternatively launch the user interface 310 in another application. For example, the user taps a photographing control in "WeChat" to launch the user interface 310. "WeChat" is a social application, and may support the user in sharing a captured photo and the like with others. A default camera is not limited to the rear-facing camera. The electronic device 100 may set a front-facing camera as the default camera. That is, when starting the camera application, the electronic device 100 may display, in a preview box 314, an image collected by the front-facing camera. The user interface 310 may be used by the user to perform photographing by using the default front-facing camera.

FIG. 3A shows an example of a user interface 310 of a camera application in an electronic device such as a smartphone. As shown in FIG. 3A, the user interface 310 may include a settings control 311, a flash control 312, a zoom ratio 313, a preview box 314, a camera mode option 315, a gallery shortcut control 316, a shutter control 317, and a camera flip control 318.

The settings control 311 may be used to adjust parameters (such as resolution and a filter) of a to-be-captured photo and enable or disable some photographing methods (for example, timer photographing, smile capture photographing, and audio control photographing). The settings control 311 may be used to set more other photographing functions. This is not limited in this embodiment of this application.

The flash control 312 may be used to turn on or turn off a flash.

The zoom ratio 313 may be used to indicate a ratio for changing a preview angle presented by an image displayed in the preview box 314. A larger zoom ratio 313 indicates a smaller preview angle presented by the image displayed in the preview box 314. On the contrary, a smaller zoom ratio 313 indicates a larger preview angle presented by the image displayed in the preview box 314. As shown in FIG. 3A, 1× may be a default zoom ratio of the camera application. When the zoom ratio 313 is the 1× ratio 1×, the preview angle presented by the image displayed in the preview box 314 is the same as a photographing angle of a common camera 193-1. That is, when starting the camera application, the electronic device 100 may display, in the preview box 314, an image collected by the common camera 193-1. A preview angle presented by the image is the same as the photographing angle of the common camera 193-1. The default zoom ratio is not limited in this embodiment of this application.

The preview box 314 may be used to display an image collected by a camera 193 in real time. The electronic device may refresh display content on the electronic device in real time, so that a user previews an image currently collected by the camera 193.

One or more photographing mode options may be displayed in the camera mode option 315. The one or more photographing mode options may include an aperture mode option 315A, a video mode option 315B, a photo mode option 315C, a portrait mode option 315D, and a more option 315E. The one or more photographing mode options may be represented as text information, for example, "aperture", "video", "photo", "portrait", and "more", in an interface. The one or more photographing options are not limited to this, and may alternatively be represented as icons or interactive elements (interactive element, IE) in another form in the interface. When detecting a user operation acting on the photographing mode option, the electronic device 100 may enable a photographing mode selected by the user. Particularly, when detecting a user operation acting on the more option 315E, the electronic device 100 may further display more other photographing mode options such as a slow-motion photographing mode option, to display richer photographing functions to the user. No limitation is imposed by those shown in FIG. 3A. The more option 315E may not be displayed in the camera mode option 315, and the user may slide to the left/to the right in the camera mode option 315 to browse another photographing mode option.

The gallery shortcut button 316 may be used to start a gallery application. In response to a user operation, for example, a tap operation, that acts on the gallery shortcut button 316, the electronic device 100 may start the gallery application. In this way, the user can conveniently view a captured photo and video, and does not need to exit the camera application first and then start the gallery application. The gallery application is an application for picture management in an electronic device such as a smartphone or a tablet computer, and may also be referred to as an "album". A name of the application is not limited in this embodiment. The gallery application may support the user in performing various operations, for example, browsing, editing, deleting, and selecting, on a picture stored in the electronic device 100.

The shutter control 317 may be used to monitor a user operation that triggers photographing. The electronic device 100 may detect a user operation acting on the shutter control 317, and in response to the operation, the electronic device 100 may store an image in the preview box 314 as a picture in the gallery application. In addition, the electronic device 100 may further display a thumbnail of the stored image in the gallery shortcut button 316. In other words, the user may tap the shutter control 317 to trigger photographing. The shutter control 317 may be a button or a control in another form.

The camera flip control 318 may be used to monitor a user operation that triggers camera flip. The electronic device 100 may detect a user operation, for example, a tap operation, that acts on the camera flip control 318, and in response to the operation, the electronic device 100 may flip a camera, for example, perform switching from a rear-facing camera to a front-facing camera. In this case, as shown in FIG. 3B, an image collected by the front-facing camera is displayed in the preview box 314.

Based on the foregoing photographing scenario, some user interfaces (user interface, UI) implemented on the electronic device 100 are described below.

FIG. 3B to FIG. 3H show an example of a user interface for adjusting a preview angle in a front-facing photographing scenario. The front-facing photographing scenario may be a scenario in which a user performs photographing by holding the electronic device 100 by using a selfie stick.

Figure 3B:
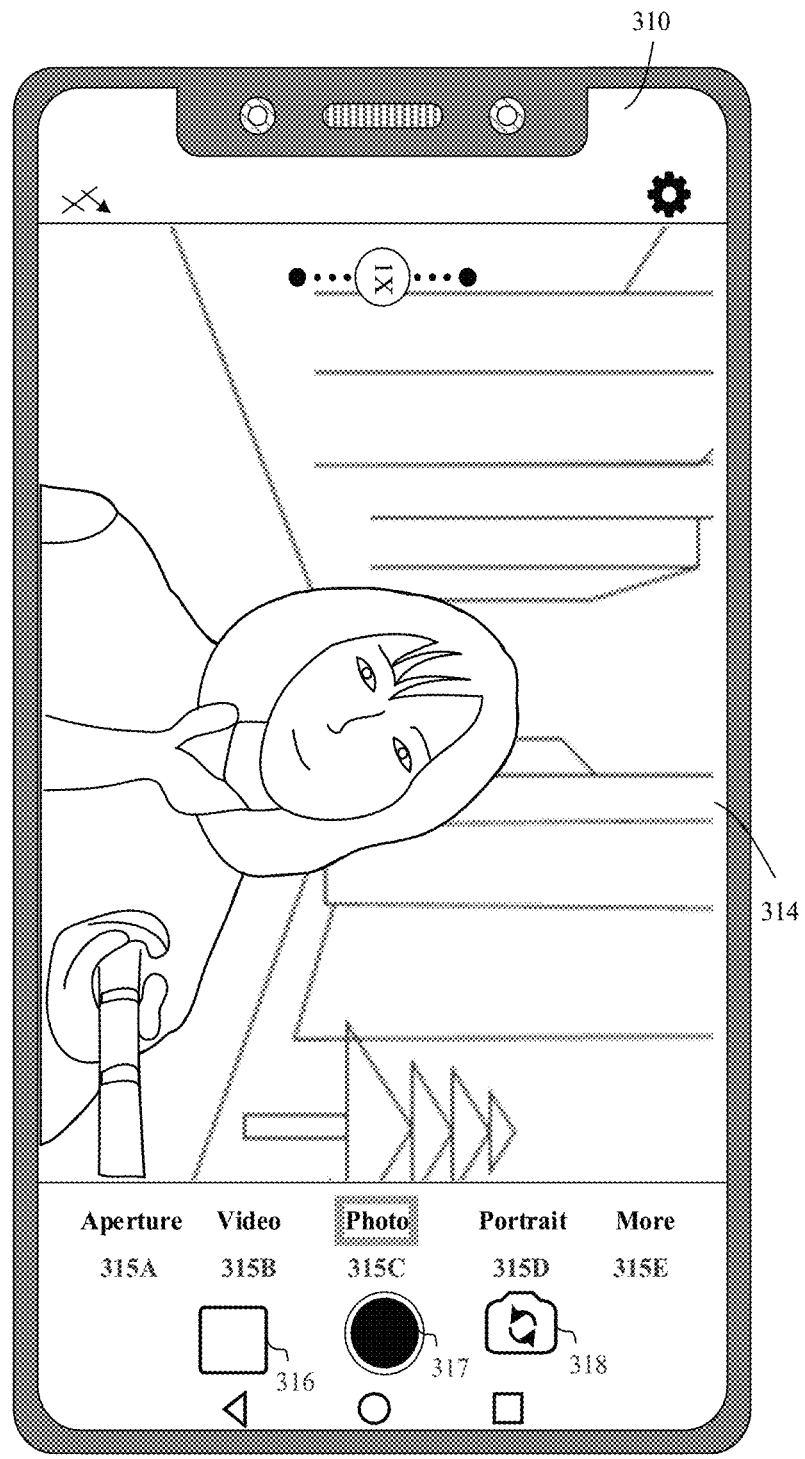
Figure 3C:
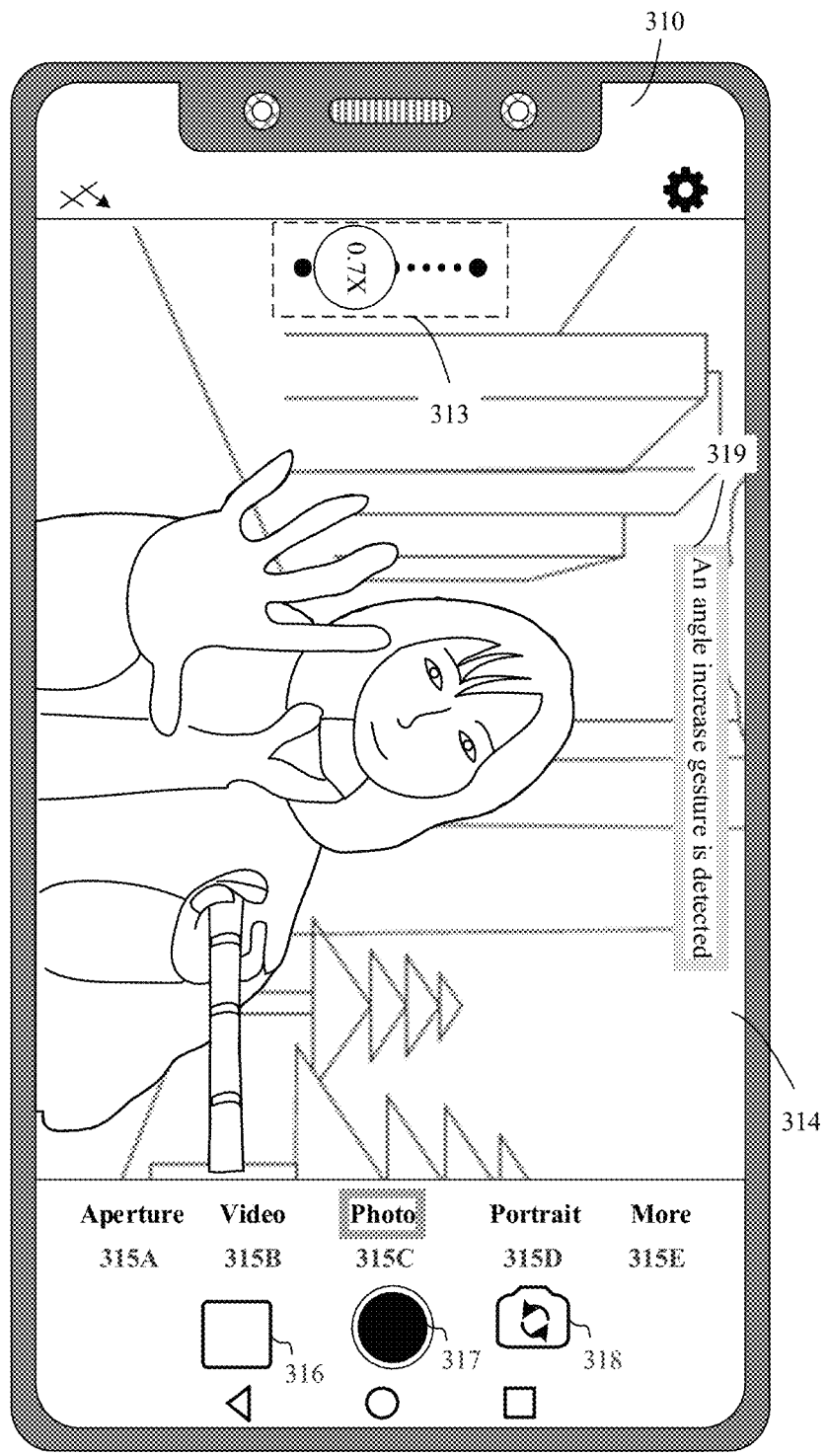
FIG. 3C to FIG. 3H show a user interface for adjusting, when photographing is performed by using a front-facing camera of an electronic device, a preview angle presented by an image displayed in a preview box according to an embodiment of this application.
Figure 3D:
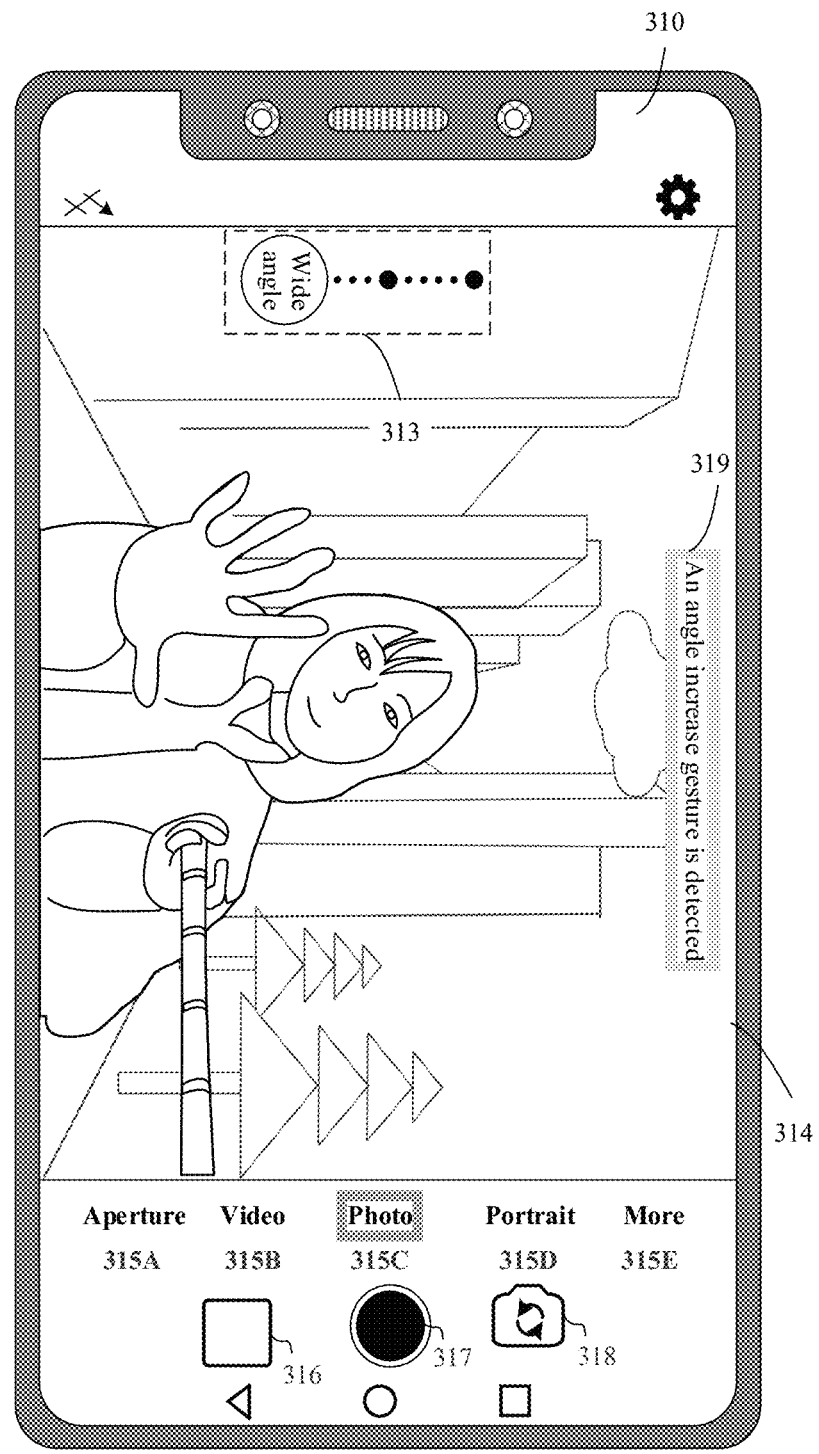

(1) FIG. 3B to FIG. 3D show an example of a user interface for increasing the preview angle in the front-facing photographing scenario.

The electronic device 100 may recognize a gesture of the user by using an image collected by a front-facing camera, and increase the preview angle in response to a specific gesture (for example, a gesture of opening a palm and pushing forward).

As shown in FIG. 3B to FIG. 3D, when a front-facing photographing preview interface is displayed, if the gesture of opening a palm and pushing forward is detected, the electronic device 100 may gradually increase a preview angle presented by an image displayed in a preview box 314. In addition, a zoom ratio 313 displayed in the front-facing photographing preview interface 310 is gradually decreased.

As shown in FIG. 3B, an initial zoom ratio 313 may be a 1× ratio 1×, and the image displayed in the preview box 314 is from a common front-facing camera. Subsequently, the electronic device 100 may recognize the gesture of opening a palm and pushing forward, the preview angle presented by the image displayed in the preview box 314 may be gradually increased, and the zoom ratio 313 is gradually decreased. For example, the zoom ratio is decreased from 1× to 0.9× or decreased from 0.9× to 0.8×.

As shown in FIG. 3C, in comparison with the scenario shown in FIG. 3B, the electronic device 100 may recognize a gesture of opening a palm and continuing to push forward, the preview angle presented by the image displayed in the preview box 314 is further increased, and the zoom ratio 313 is decreased to 0.7×.

As shown in FIG. 3D, in comparison with the scenario shown in FIG. 3C, the electronic device 100 recognizes a gesture of opening a palm and further continuing to push forward, the preview angle presented by the image displayed in the preview box 314 is still further increased, and the zoom ratio 313 is decreased to 0.6×, for example, a wide ratio.

In the scenarios shown in FIG. 3B to FIG. 3D, the zoom ratio 313 may be decreased from 1× to 0.9×, increased from 0.9× to 0.7×, ..., and gradually decreased to the wide ratio, and the preview angle presented by the image displayed in the preview box 314 is gradually increased. In other words, in a front-facing photographing preview process, the user may increase the preview angle by using the gesture of opening a palm and pushing forward.

The electronic device 100 may adjust, based on a speed at which a hand is pushed forward, a speed at which the preview angle is increased. A higher speed at which the hand is pushed forward indicates a higher speed at which the preview angle is increased. Particularly, when recognizing, in a short time T (for example, 0.5 seconds), that a speed of opening a palm and pushing forward is greater than a preset speed, the electronic device 100 may directly switch the preview angle from a relatively small preview angle (for example, a preview angle that exists when the zoom ratio is the 1× ratio) to a maximum preview angle, for example, an angle of view of a wide-angle camera 193-2. In this way, the user can be supported in quickly performing switching to a larger preview angle.

When detecting that forward pushing of the hand is stopped, that is, a distance between the hand and the electronic device 100 is no longer changed or slightly changed, the electronic device 100 may stop increasing the preview angle. In this way, the user may feel impact of increase of the preview angle on framing while opening the palm and pushing forward. When the user considers that a current view in the preview box 314 is appropriate, the user may lower the hand or no longer push the palm forward. In this case, the photographing angle presented by the image displayed in the preview box 314 is no longer changed.

Figure 3E:
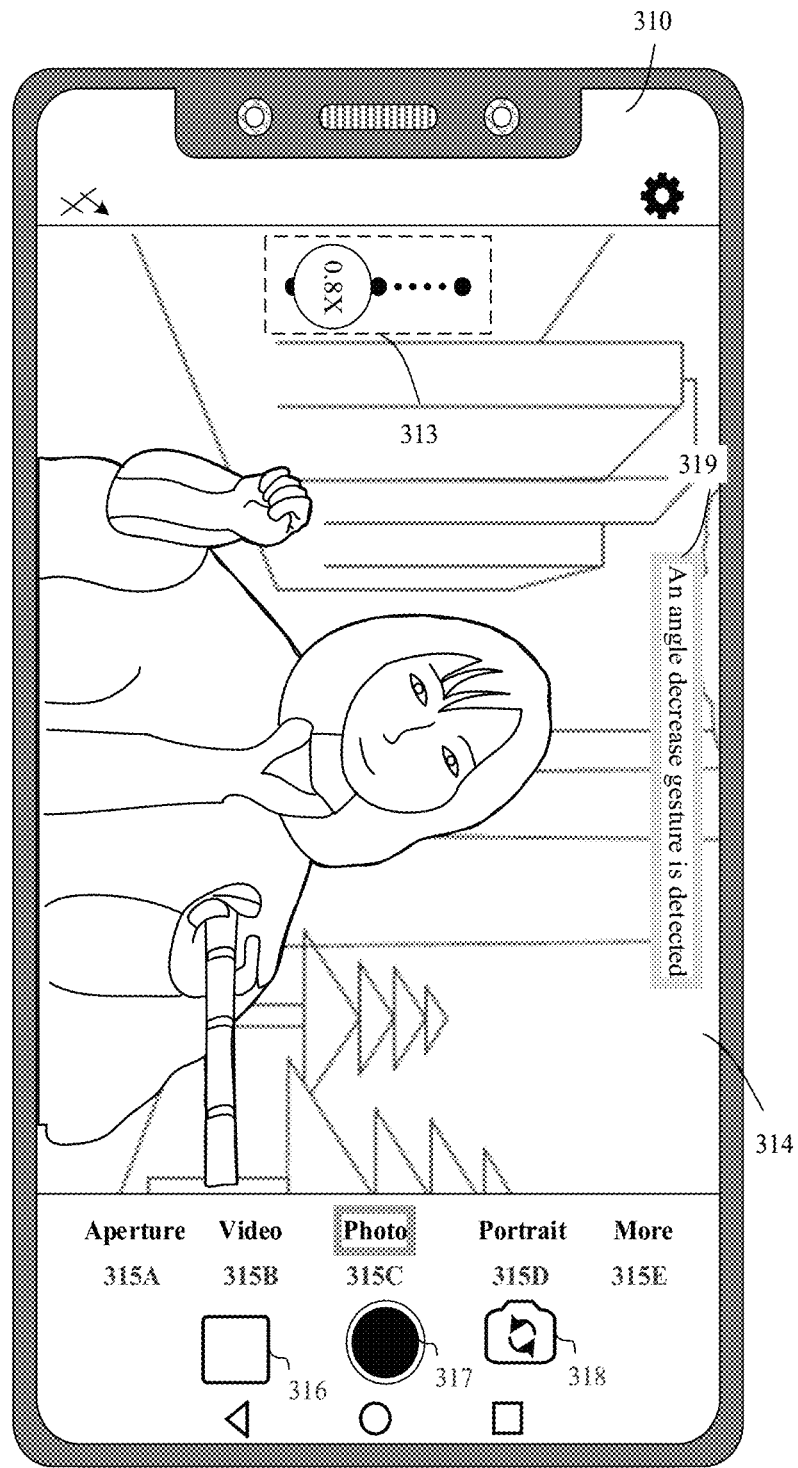
Figure 3F:
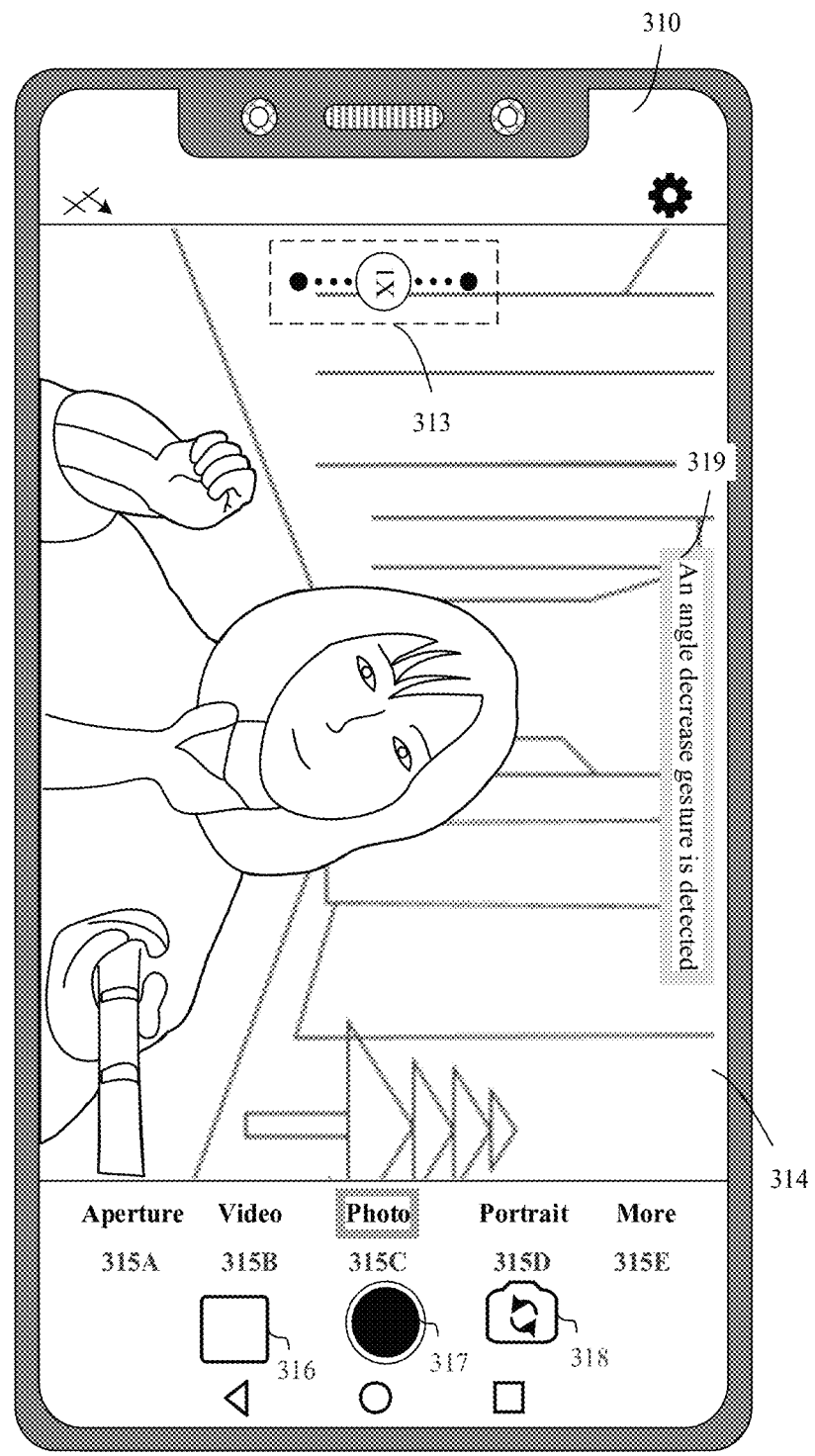
Figure 3G:
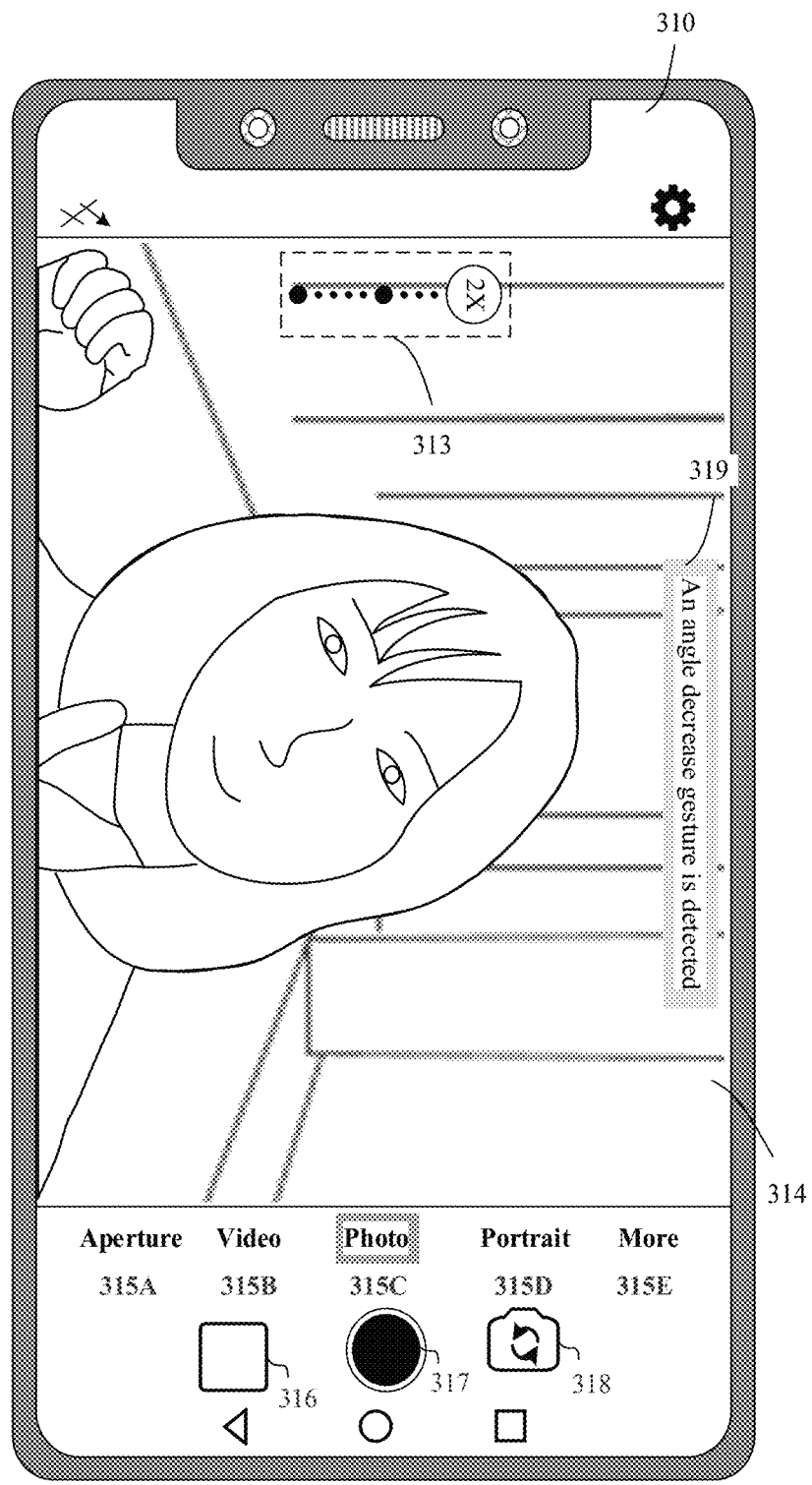

(2) FIG. 3E to FIG. 3G show an example of a user interface for decreasing the preview angle in the front-facing photographing scenario.

The electronic device 100 may recognize the gesture of the user by using the image collected by the front-facing camera, and decrease the preview angle in response to a specific gesture (for example, a gesture of clenching a fist and pulling backward).

As shown in FIG. 3E to FIG. 3G, when a front-facing photographing preview interface is displayed, if the gesture of clenching a fist and pulling backward is detected, the electronic device 100 may gradually decrease the preview angle presented by the image displayed in the preview box 314. In addition, a zoom ratio 313 displayed in the front-facing photographing preview interface 310 is gradually increased.

As shown in FIG. 3E, an initial zoom ratio 313 may be the wide ratio. Subsequently, the electronic device 100 may recognize the gesture of clenching a fist and pulling backward, the preview angle presented by the image displayed in the preview box 314 is decreased, and the zoom ratio 313 is increased to 0.8×.

As shown in FIG. 3F, in comparison with the scenario shown in FIG. 3E, the electronic device 100 may recognize a gesture of clenching a fist and continuing to pull backward, the preview angle presented by the image displayed in the preview box 314 is further decreased, and the zoom ratio 313 is increased to 1×.

As shown in FIG. 3G, in comparison with the scenario shown in FIG. 3F, the electronic device 100 recognizes a gesture of clenching a fist and further continuing to pull backward, the preview angle presented by the image displayed in the preview box 314 is still further decreased, and the zoom ratio 313 is increased to 2×.

In the scenarios shown in FIG. 3E to FIG. 3G, the zoom ratio 313 may be increased from 1× to 1.1×, increased from 1.1× to 1.2×, ..., and gradually increased to 2×, and the preview angle presented by the image displayed in the preview box 314 is gradually decreased. In other words, in the front-facing photographing preview process, the user may decrease the preview angle by using the gesture of clenching a fist and pulling backward.

The electronic device 100 may adjust, based on a speed of clenching a fist and pulling backward, a speed at which the preview angle is decreased. A higher speed of clenching a fist and pulling backward indicates a higher speed at which the preview angle is decreased. Particularly, when recognizing, in the short time T (for example, 0.5 seconds), that the speed of clenching a fist and pulling backward is greater than the preset speed, the electronic device 100 may directly switch the preview angle from a relatively large preview angle (for example, a preview angle that exists when the zoom ratio is the wide ratio) to a minimum preview angle, for example, an angle of view of a common camera. In this way, the user can be supported in quickly performing switching to a smaller preview angle.

When detecting that fist clenching and backward pulling are stopped, that is, the distance between the hand and the electronic device 100 is no longer changed or slightly changed, the electronic device 100 may stop decreasing the preview angle. In this way, the user may feel impact of decrease of the preview angle on framing while clenching a fist and pulling backward. When the user considers that a current view in the preview box 314 is appropriate, the user may lower the hand or no longer push the palm forward. In this case, the photographing angle presented by the image displayed in the preview box 314 is no longer changed.

It may be learned from (1) and (2) that the user may adjust, by using a mid-air gesture of a single hand, the preview angle presented by the image displayed in the preview box. Especially in a scenario in which photographing is performed by using the front-facing camera, the user usually performs photographing by straightening an arm or by using a selfie stick. However, in the photographing method in this solution, the user may conveniently adjust the preview angle presented by the image displayed in the preview box. In this way, the user does not need to repeatedly hold the electronic device close and touch a screen of the electronic device with a finger to adjust the preview angle presented by the image displayed in the preview box.

In addition, the user does not need to touch the screen of the electronic device with a finger, and therefore the user may feel impact of a change of the preview angle on a to-be-captured picture while adjusting the preview angle. In the conventional technology, when the user adjusts, by touching the screen of the electronic device by using a gesture, the preview angle presented by the image displayed in the preview box, a scene displayed in the preview box is usually not a scene that the user wants to capture. Therefore, the user needs to adjust the preview angle and then adjust a photographing posture (for example, hold up the electronic device) to include a to-be-captured scene in the preview box. In this way, it is difficult for the user to adjust the preview angle and perform photographing and framing at the same time. However, in the photographing method in this solution, the user can be supported in adjusting the preview angle while performing photographing and framing, to provide good photographing experience for the user.

In some embodiments, when a gesture that does not match the foregoing specific gesture, for example, a gesture of opening a palm and pulling backward or a gesture of clenching a fist and pushing forward, is recognized, the preview angle presented by the image displayed in the preview box 314 remains unchanged. In this case, the electronic device 100 may prompt, in the preview box 314, the user with a gesture to be used to adjust the preview angle.

Figure 3H:
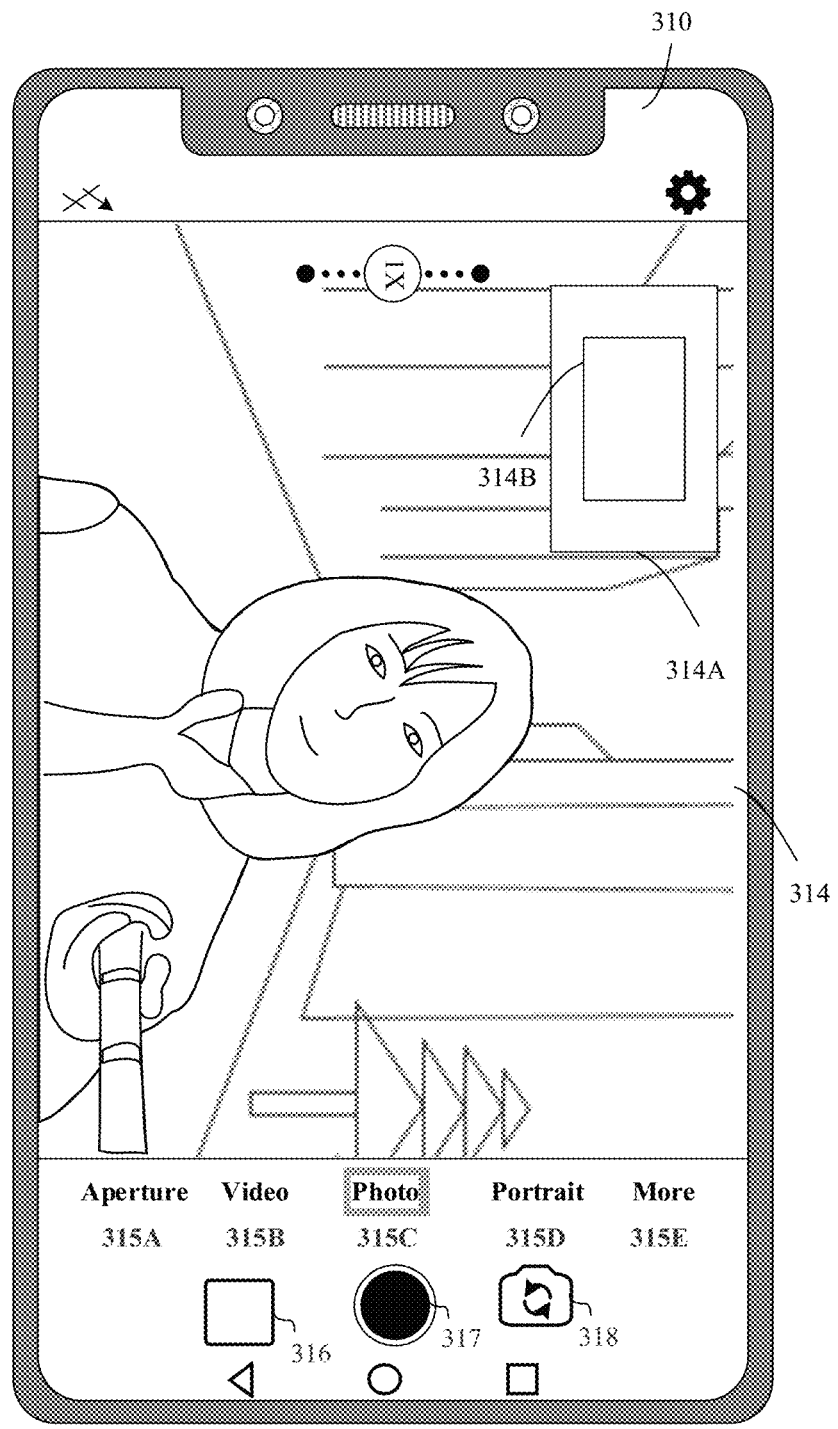

In some embodiments, as shown in FIG. 3H, the electronic device 100 may display prompts 314A and 314B in a manner similar to a picture-in-picture manner in the preview box 314. The prompt 314B may be a thumbnail of a preview image displayed in the preview box. The prompt 314A is a thumbnail of an image actually collected by a camera with a maximum angle of view. Specifically, when the zoom ratio is the 1× ratio 1×, the preview angle is the same as the angle of view of the common camera 193-1. When the gesture of opening a palm and pushing forward is recognized, the preview angle is gradually increased, and a percentage of 314B in 314A is also gradually increased. When the gesture of clenching a fist and pulling backward is recognized, the preview angle is gradually decreased, and the percentage of 314B in 314A is also gradually decreased. In this way, the user can intuitively feel a difference between the preview angle presented by the preview image and the maximum angle of view, so that the user better performs photographing.

In some embodiments, the electronic device 100 may detect a user operation used to trigger photographing, for example, a tap operation on a control 317, and store the image displayed in the preview box 314 as a photo in a gallery application. This is not limited to the tap operation on the control 317. When a smile capture mode is enabled, the electronic device 100 may trigger photographing when recognizing a smile in the image displayed in the preview box 314. Alternatively, when an audio control photographing mode is enabled, the electronic device 100 may trigger photographing when detecting a voice instruction indicating to perform photographing. In this way, the user can trigger photographing without touching the screen.

When the preview angle presented by the image displayed in the preview box 314 is increased or decreased, a posture of the electronic device 100) may remain unchanged or a relative distance between the electronic device 100 and a scene remains unchanged. Herein, that a posture of the electronic device 100 remains unchanged or a relative distance between the electronic device 100 and a scene remains unchanged may mean that there is a very slight change in the posture of the electronic device 100 or there is a very slight change in the relative distance between the electronic device 100 and the scene, and the change is not large enough to exert significant impact on the preview angle presented by the image displayed in the preview box 314.

A specific implementation of adjusting a preview angle in a front-facing photographing scenario is described below.

In some embodiments, an electronic device 100 includes a plurality of front-facing cameras, for example, two front-facing cameras. The two front-facing cameras may include a common camera 193-1 and a wide-angle camera 193-2.

Phase 1: Increase an angle of view during photographing preview.

Figure 4A:
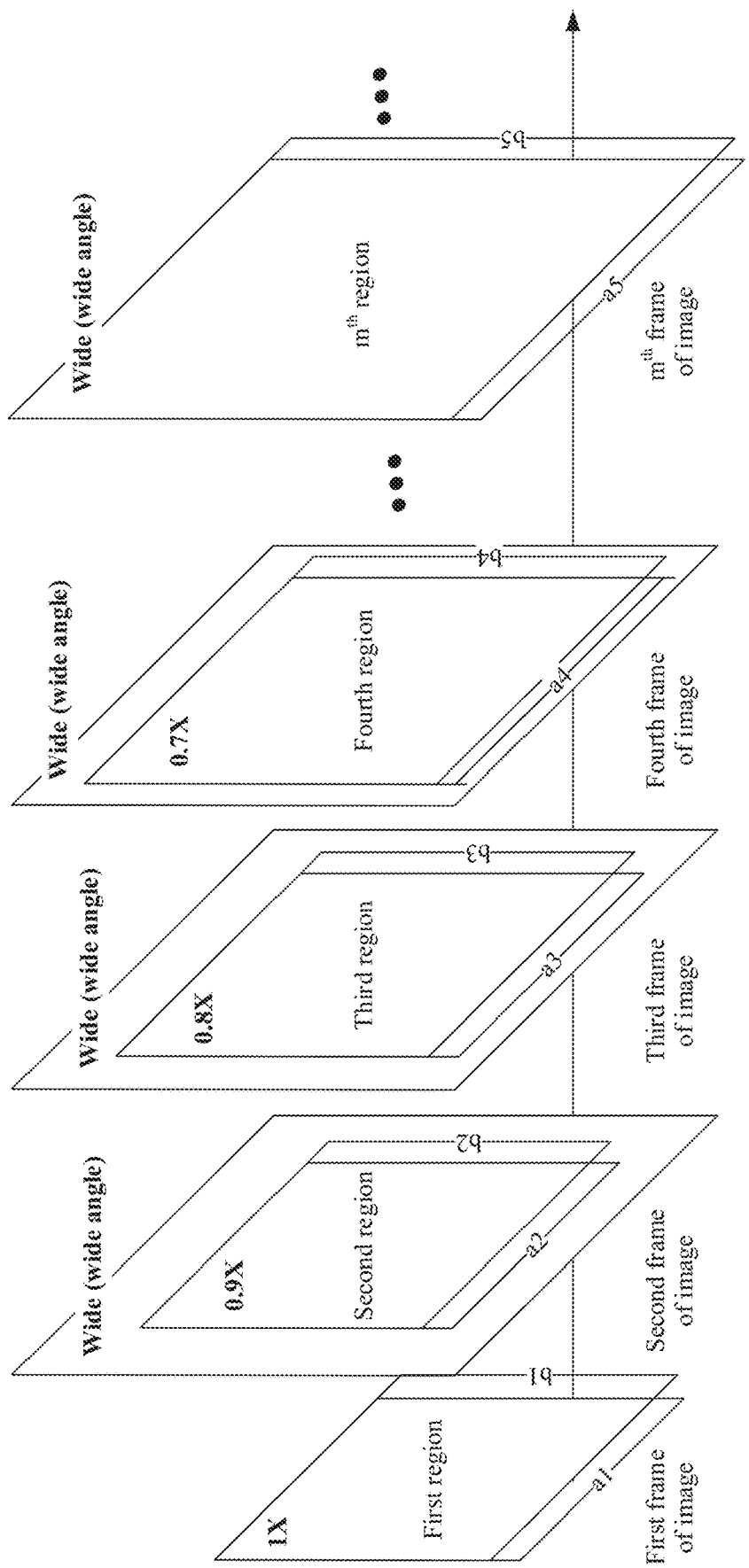
FIG. 4A and FIG. 4B show an implementation of adjusting, when photographing is performed by using a front-facing camera of an electronic device, a preview angle presented by an image displayed in a preview box according to an embodiment of this application.

FIG. 4A shows an example of a process in which the electronic device 100 gradually increases a preview angle presented by an image displayed in a preview box 314.

In a possible case, when recognizing a gesture of opening a palm and pushing forward, the electronic device 100 may gradually increase the preview angle presented by the image displayed in the preview box 314. Specifically, the electronic device 100 may first use an image collected by the common camera 193-1, and then use an image collected by the wide-angle camera 193-2.

(1) The image collected by the common camera 193-1 is used.

When using the image collected by the common camera 193-1, the electronic device 100 may first crop the image collected by the common camera 193-1, and display a cropped image in the preview box 314. The electronic device 100 may crop, for a plurality of times, images sequentially collected by the common camera 193-1, until a preview angle presented by an image in a cropping region is the same as an angle of view of the common camera 193-1. There is an increasingly large cropping region for the plurality of times of cropping. A process of performing cropping for the plurality of times is a process of performing digital zoom for a plurality of times by the electronic device 100.

As shown in FIG. 4A, it is assumed that a first frame of image displayed by the electronic device 100 in the preview box 314 is an image shown in a first region. The image shown in the first region may be the image collected by the common camera 193-1, and a size of the image may be a1*b1. In other words, the preview angle presented by the image displayed in the preview box 314 is the same as the angle of view of the common camera 193-1. In addition, in this case, a zoom ratio is 1×.

If the gesture of opening a palm and pushing forward is recognized, the electronic device 100 may increase the angle of view during photographing preview. That is, the electronic device 100 may make an adjustment from a case in which the image collected by the common camera 193-1 is used to a case in which the image collected by the wide-angle camera 193-2 is used.

(2) The image collected by the wide-angle camera 193-2 is used.

When using the image collected by the wide-angle camera 193-2, the electronic device 100 may first crop the image collected by the wide-angle camera 193-2, and display a cropped image in the preview box 314. The electronic device 100 may crop, for a plurality of times, images sequentially collected by the wide-angle camera 193-2, until a preview angle presented by an image in a cropping region is the same as an angle of view of the wide-angle camera 193-2. There is an increasingly large cropping region for the plurality of times of cropping. A process of performing cropping for the plurality of times is a process of performing digital zoom for a plurality of times by the electronic device 100.

The electronic device 100 first crops the image collected by the wide-angle camera 193-2, to obtain a second region shown as an example in FIG. 4A. A second frame of image displayed by the electronic device 100 in the preview box 314 may be an image shown in the second region. In this case, the zoom ratio is 0.9×. A size of the image shown in the second region may be a2*b2, where a2 is greater than a1, and b2 is greater than b1. A preview angle presented by the image shown in the second region is greater than a preview angle presented by the image shown in the first region.

If the electronic device 100 can still recognize the gesture of opening a palm and pushing forward, the electronic device 100 may continue to crop the image collected by the wide-angle camera 193-2, to obtain an image shown in a third region. A third frame of image displayed by the electronic device 100 in the preview box may be the image shown in the third region. In this case, the zoom ratio is 0.8×. A size of the image shown in the third region may be a3*b3, where a3 is greater than a2, and b3 is greater than b2. A preview angle presented by the image shown in the third region is greater than the preview angle presented by the image shown in the second region.

Similarly, if the electronic device 100 can still recognize the gesture of opening a palm and pushing forward, the electronic device 100 may continue to crop the image collected by the wide-angle camera 193-2, to obtain an image shown in a fourth region and the like, until an $m^{th}$ frame of image displayed by the electronic device 100 in the preview box 314 is an image shown in an $m^{th}$ region. In this case, the zoom ratio is Wide. A preview angle presented by the image shown in the $m^{th}$ region is the same as the angle of view of the wide-angle camera 193-2. In other words, the electronic device 100 increases the preview angle presented by the image displayed in the preview box 314 to a maximum angle of view.

It should be noted that in a process in which the electronic device 100 displays the first frame of image to the $m^{th}$ frame of image in the preview box 314, if the gesture of opening a palm and pushing forward is not recognized, the electronic device 100 may stop increasing the preview angle presented by the image displayed in the preview box 314. For example, if the electronic device 100 does not recognize the gesture of opening a palm and pushing forward in a process of displaying the third frame of image and a fourth frame of image in the preview box 314, the third frame of image may be the image shown in the third region, and the zoom ratio is 0.8×; and a preview angle presented by the fourth frame of image may be the same as the preview angle presented by the third frame of image, and the zoom ratio is still 0.8×. In other words, increase of the preview angle presented by the image displayed in the preview box 314 is stopped.

In addition, if the electronic device 100 further includes a camera (for example, an ultra-wide-angle camera) whose angle of view is greater than that of the wide-angle camera 193-2, after displaying the image shown in the $m^{th}$ region in FIG. 4A in the preview box 314, the electronic device 100 may continue to increase, based on the recognized gesture of opening a palm and pushing forward, the preview angle presented by the image displayed in the preview box 314. Specifically, the electronic device 100 may crop an image collected by the ultra-wide-angle camera, and display a cropped image in the preview box 314. The electronic device 100 may crop, for a plurality of times, images sequentially collected by the ultra-wide-angle camera. There is an increasingly large cropping region for the plurality of times of cropping.

The images shown in the first region to the $m^{th}$ region differ in size. When displaying the images shown in the first region to the $m^{th}$ region in the preview box 314, the electronic device 100 may first perform adaptation processing on the images based on a size of the preview box 314. For example, if a size of an image is less than the size of the preview box 314, the electronic device 100 may increase a length and a width of the image, so that the size of the image is the same as the size of the preview box 314. A manner of performing adaptation processing on the images and the preview box 314 is not limited in this embodiment of this application.

In this application, the electronic device 100 crops, in a center cropping manner, an image collected by a camera 193 (for example, the common camera 193-1 or the wide-angle camera 193-2). That is, central locations of the images shown in the first region to the $m^{th}$ region shown as examples in FIG. 4A coincide.

Phase 2: Decrease the angle of view during photographing preview.

Figure 4B:
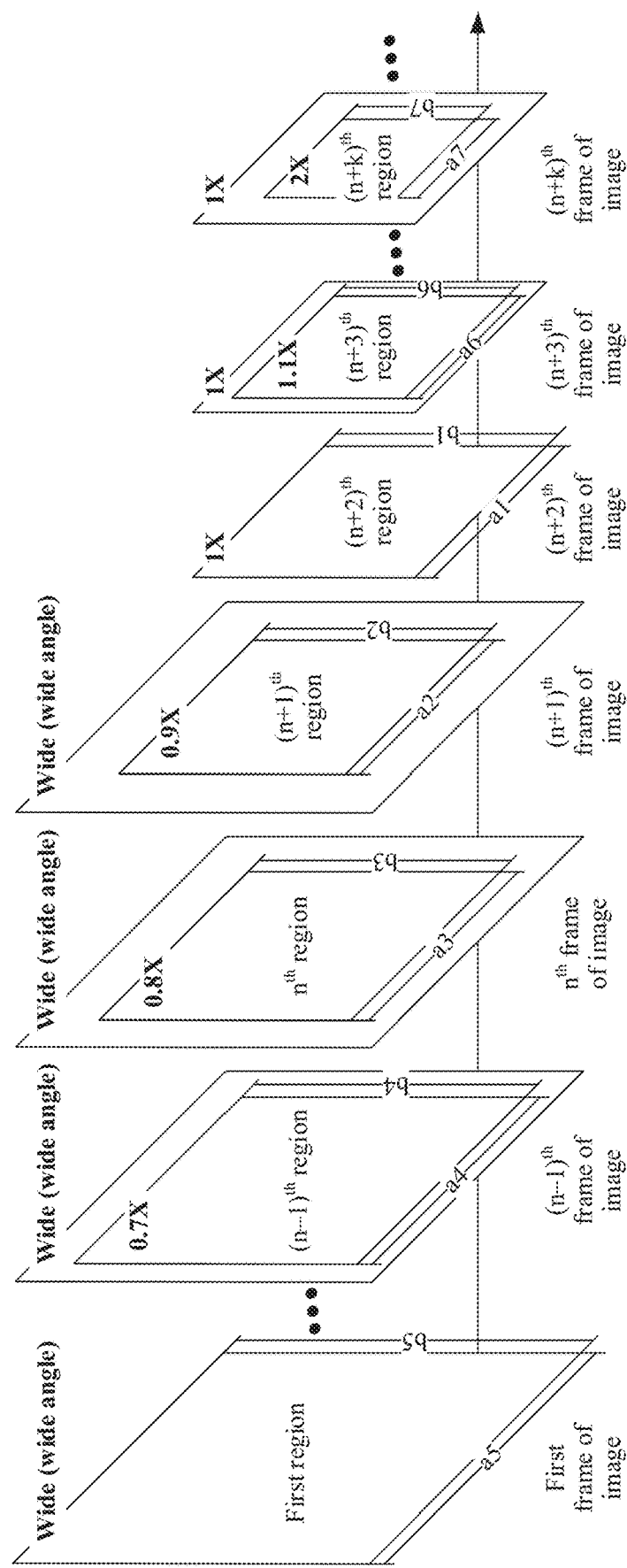

FIG. 4B shows an example of a process in which the electronic device 100 gradually decreases the preview angle presented by the image displayed in the preview box 314.

In a possible case, when recognizing a gesture of clenching a fist and pulling backward, the electronic device 100 may gradually decrease the preview angle presented by the image displayed in the preview box 314. Specifically, the electronic device 100 may first use the image collected by the wide-angle camera 193-2, and then use the image collected by the common camera 193-1.

(1) The image collected by the wide-angle camera 193-2 is used.

When using the image collected by the wide-angle camera 193-2, the electronic device 100 may first display, in the preview box 314, the image collected by the wide-angle camera 193-2, and then crop the image collected by the wide-angle camera 193-2, and display a cropped image in the preview box 314. The electronic device 100 may crop, for a plurality of times, images sequentially collected by the wide-angle camera 193-2, until a preview angle presented by an image in a cropping region is slightly greater than the angle of view of the common camera 193-1. There is an increasingly small cropping region for the plurality of times of cropping. A process of performing cropping for the plurality of times is a process of performing digital zoom for a plurality of times by the electronic device 100.

As shown in FIG. 4B, it is assumed that a first frame of image displayed by the electronic device 100 in the preview box 314 is an image shown in a first region. The image shown in the first region may be the image collected by the wide-angle camera 193-2, and a size of the image may be a5*b5. In other words, the preview angle presented by the image displayed in the preview box 314 is the same as the angle of view of the wide-angle camera 193-2. In addition, in this case, the zoom ratio is Wide.

If the gesture of clenching a fist and pulling backward is recognized, the electronic device 100 may gradually decrease the preview angle presented by the image displayed in the preview box 314. A process in which the electronic device 100 increases the zoom ratio from Wide to 0.9× may be an inverse process of the process in which the electronic device 100 decreases the zoom ratio from 0.9× to Wide and that is shown in FIG. 4A. Details are not described herein.

An $(n+1)^{th}$ frame of image displayed by the electronic device 100 in the preview box 314 is an image shown in an $(n+1)^{th}$ region. In this case, the zoom ratio is 0.9. A preview angle presented by the image shown in the $(n+1)^{th}$ region is slightly greater than the angle of view of the common camera 193-1. If the gesture of clenching a fist and pulling backward can still be recognized, the electronic device 100 may make an adjustment from a case in which the image collected by the wide-angle camera 193-2 is used to a case in which the image collected by the common camera 193-1 is used.

(2) The image collected by the common camera 193-1 is used.

When using the image collected by the common camera 193-1, the electronic device 100 may first display, in the preview box 314, the image collected by the common camera 193-1, and then crop the image collected by the common camera 193-1, and display a cropped image in the preview box 314. The electronic device 100 may crop, for a plurality of times, images sequentially collected by the common camera 193-1. There is an increasingly small cropping region for the plurality of times of cropping. A process of performing cropping for the plurality of times is a process of performing digital zoom for a plurality of times by the electronic device 100.

As shown in FIG. 4B, an $(n+2)^{th}$ frame of image displayed by the electronic device 100 in the preview box 314 is an image shown in an $(n+2)^{th}$ region. In this case, the zoom ratio is 1×. A preview angle presented by the image shown in the $(n+2)^{th}$ region may be the same as the angle of view of the common camera 193-1.

When the electronic device 100 can still recognize the gesture of clenching a fist and pulling backward after displaying the image shown in the $(n+2)^{th}$ region m the preview box 314, the electronic device 100 may crop the image collected by the common camera 193-1, to obtain an image shown in an $(n+3)^{th}$ region. Then, an $(n+3)^{th}$ frame of image displayed by the electronic device 100 in the preview box 314 may be the image shown in the $(n+3)^{th}$ region. In this case, the zoom ratio is 1.1×. A size of the image shown in the $(n+2)^{th}$ region is a1*b1, and a size of the image shown in the $(n+3)^{th}$ region is a6*b6, where a6 is less than a1, and b6 is less than b1. In other words, a preview angle presented by the image shown in the $(n+3)^{th}$ region is less than a preview angle presented by the image shown in the $(n+2)^{th}$ region.

Further, if the electronic device 100 still recognizes the gesture of clenching a fist and pulling backward, the electronic device 100 may continue to crop the image collected by the common camera 193-1, and display a cropped image in the preview box 314. The electronic device 100 may crop, for a plurality of times, images sequentially collected by the common camera 193-1. There is an increasingly small cropping region for the plurality of times of cropping. For example, an $(n+k)^{th}$ frame of image displayed by the electronic device 100 in the preview box 314 is an image shown in an $(n+k)^{th}$ region. In this case, the zoom ratio may be 2×. A size of the image shown in the $(n+k)^{th}$ region is a7*b7, where a7 is less than a6, and b7 is less than b6.

It should be noted that in a process in which the electronic device 100 displays, in the preview box 314, the first frame of image to the $(n+k)^{th}$ frame of image shown in FIG. 4B, if the gesture of clenching a fist and pulling backward is not recognized, the electronic device 100 may stop decreasing the preview angle presented by the image displayed in the preview box 314. For example, if the electronic device 100 does not recognize the gesture of clenching a fist and pulling backward in a process of displaying an $n^{th}$ frame of image and the $(n+1)^{th}$ frame of image in the preview box 314, the $n^{th}$ frame of image may be an image shown in an $n^{th}$ region, and the zoom ratio is 0.8×; and a preview angle presented by the $(n+1)^{th}$ frame of image is the same as a preview angle presented by the $n^{th}$ frame of image, and the zoom ratio is still 0.8×. In other words, decrease of the preview angle presented by the image displayed in the preview box 314 is stopped.

It may be learned from the phase 1 and the phase 2 that in the process of increasing or decreasing the angle of view during photographing preview, the electronic device 100 may gradually increase or decrease, by adjusting a camera configured to perform photographing and by using digital zoom, the preview angle presented by the image displayed in the preview box.

This is not limited to the foregoing implementation of combining switching between a plurality of cameras and digital zoom. In a possible case, the electronic device 100 includes only one front-facing camera. The one front-facing camera may be a fixed-focus camera or a zoom camera. The fixed-focus camera is a camera with a fixed focal length. The zoom camera is a camera that can perform optical zoom, and a focal length of the zoom camera may be changed. For this case, a preview angle may be specifically adjusted as follows:

Case 1: The electronic device 100 includes one front-facing fixed-focus camera.

When recognizing a gesture of opening a palm and pushing forward or a gesture of clenching a fist and pulling backward, the electronic device 100 may increase or decrease, through digital zoom, a preview angle presented by an image displayed in a preview box 314. The front-facing fixed-focus camera may be a common camera, a wide-angle camera, an ultra-wide-angle camera, or the like.

Case 2: The electronic device 100 includes one front-facing zoom camera.

The front-facing zoom camera may include a plurality of lenses, and the electronic device 100 may change a focal length of the front-facing zoom camera by adjusting a distance between the plurality of lenses, to adjust a preview angle presented by an image displayed in a preview box 314.

For example, when recognizing a gesture of clenching a fist and pulling backward, the electronic device 100 may adjust the distance between the plurality of lenses, to gradually increase the focal length of the front-facing zoom camera. In this way, an angle of view of the front-facing zoom camera is gradually decreased, and the preview angle presented by the image displayed in the preview box 314 is also gradually decreased. When recognizing a gesture of opening a palm and pushing forward, the electronic device may adjust the distance between the plurality of lenses, to gradually decrease the focal length of the front-facing zoom camera. In this way, an angle of view of the front-facing zoom camera is gradually increased, and the preview angle presented by the image displayed in the preview box 314 is also gradually increased.

Figure 5A:
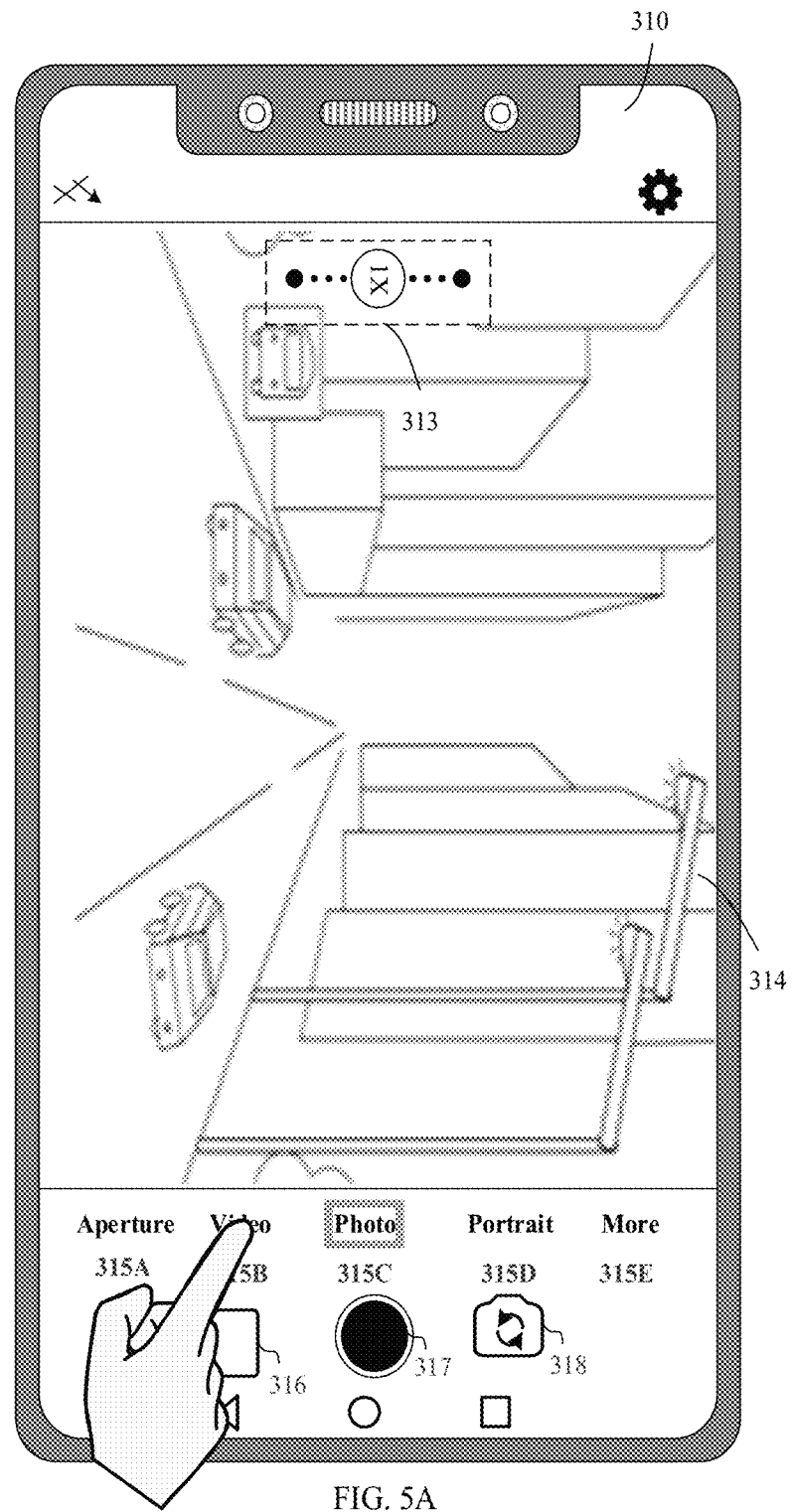
FIG. 5A to FIG. 5O show a user interface for adjusting, when video recording is performed by using a front-facing camera of an electronic device, a preview angle presented by an image displayed in a preview box according to an embodiment of this application.
Figure 5B:
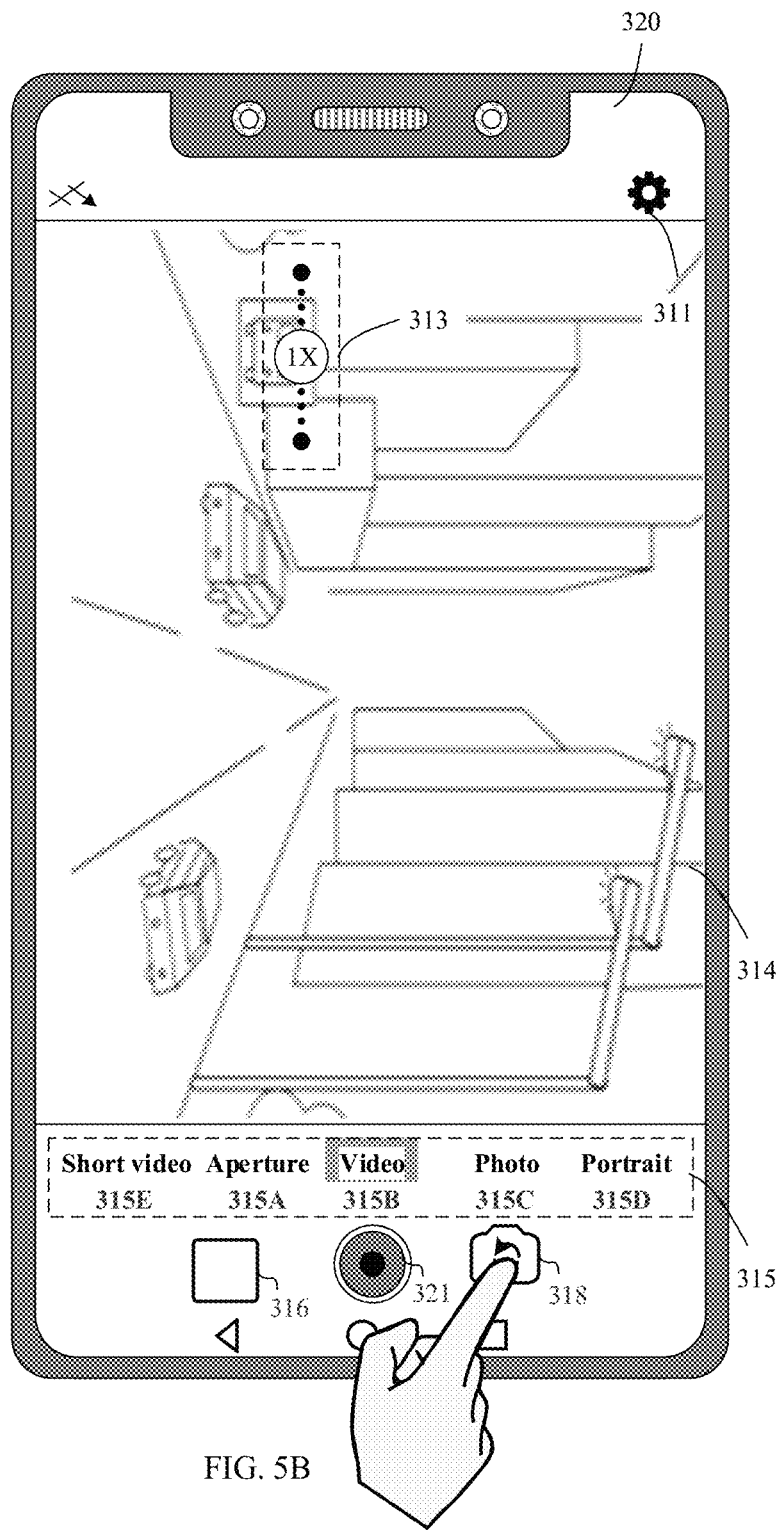
Figure 5C:
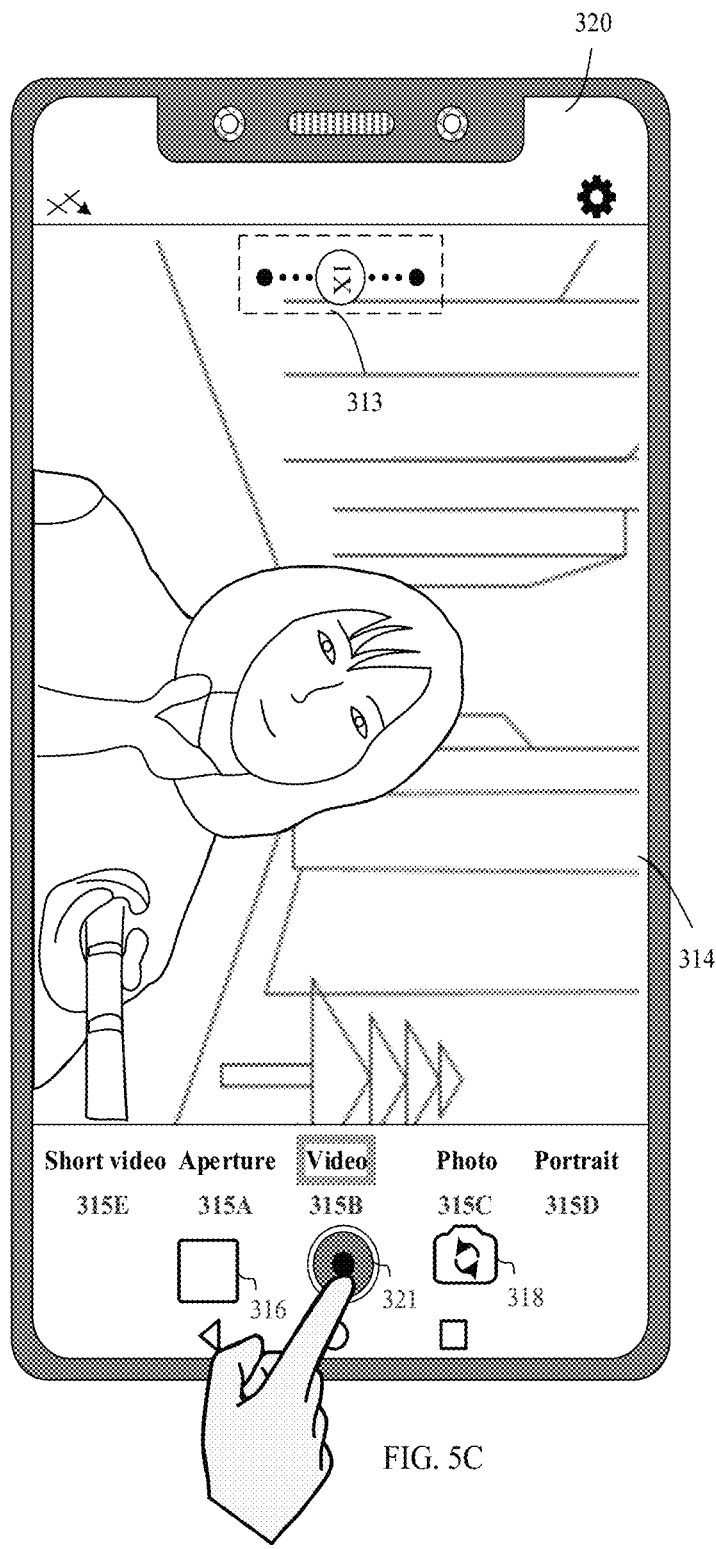
Figure 5D:
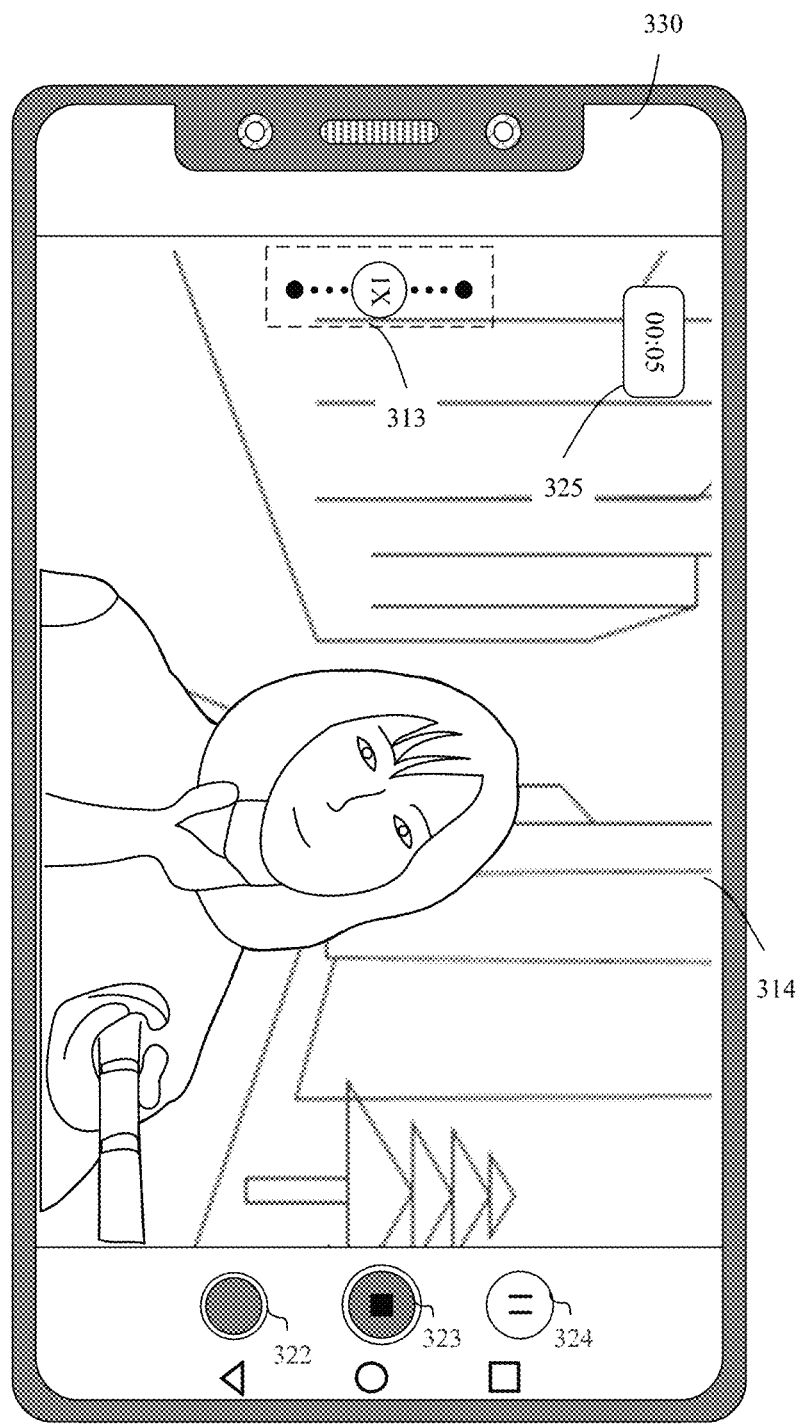
Figure 5E:
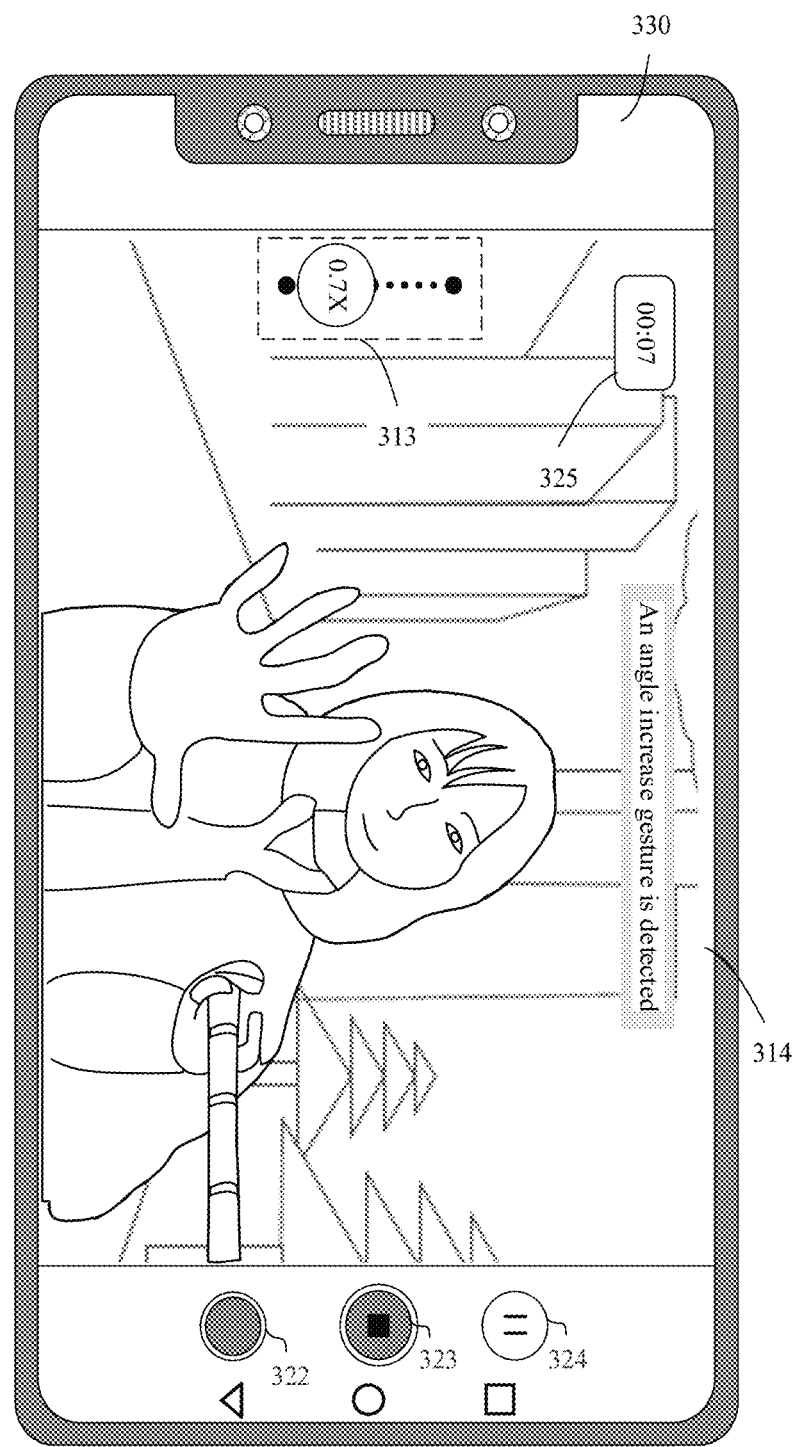
Figure 5F:
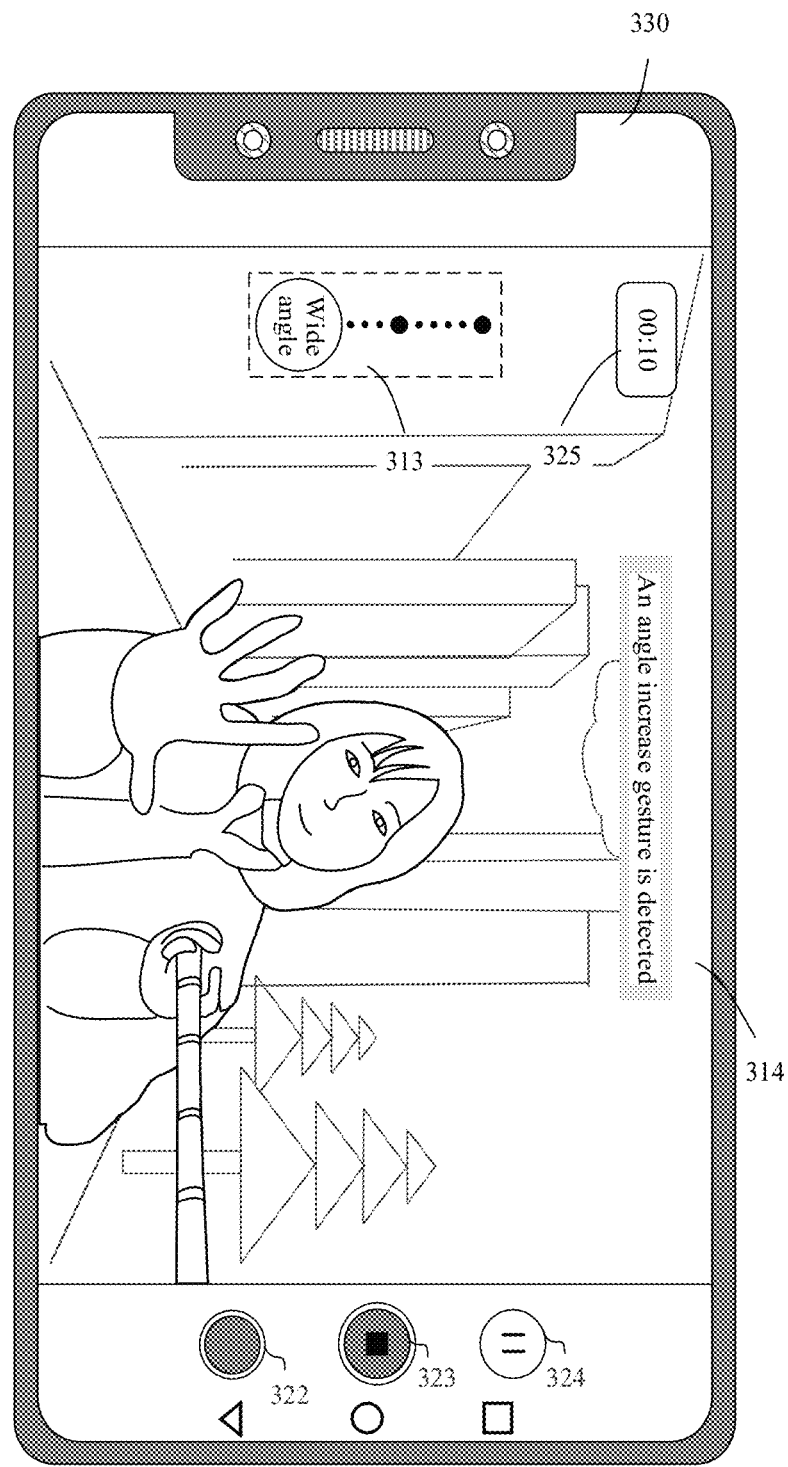
Figure 5G:
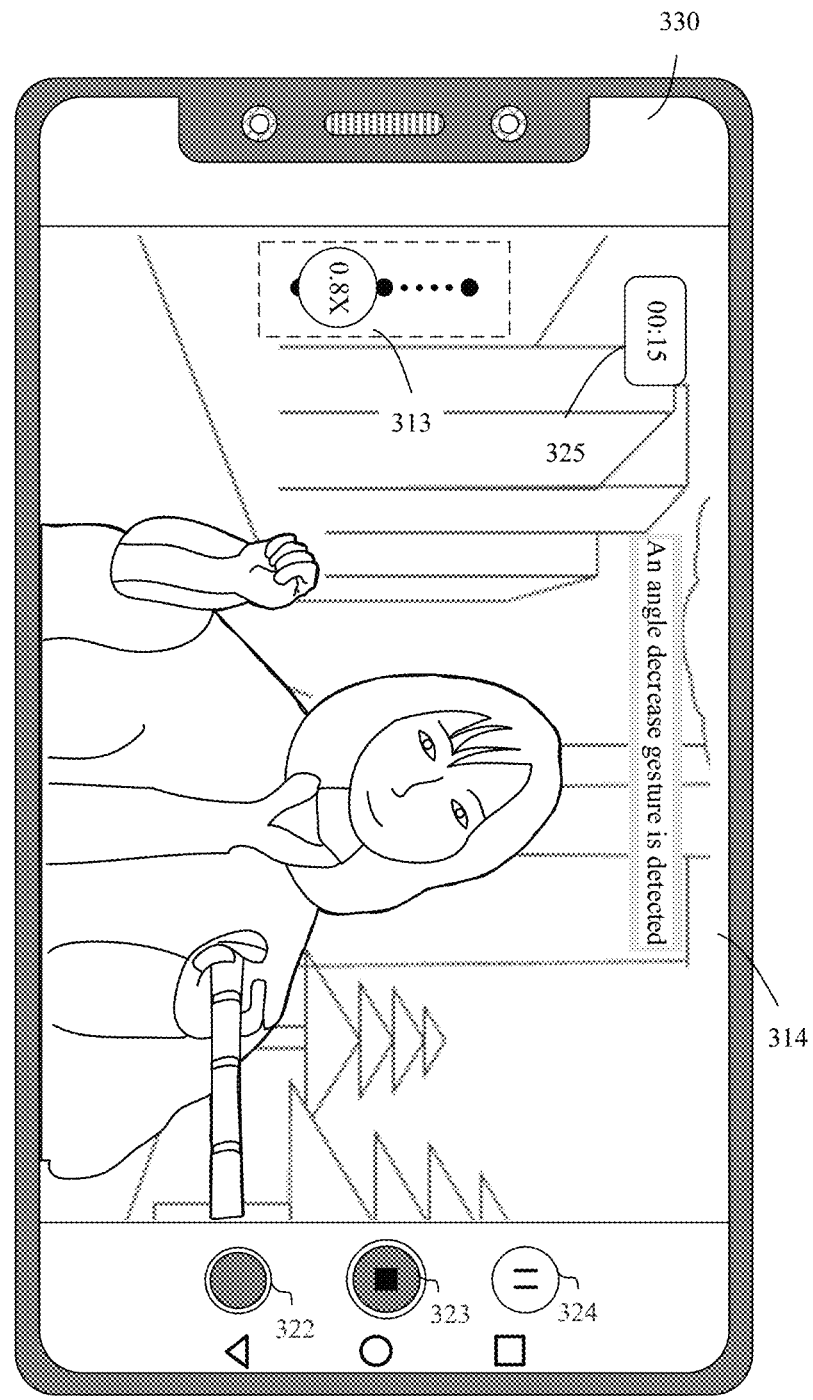
Figure 5H:
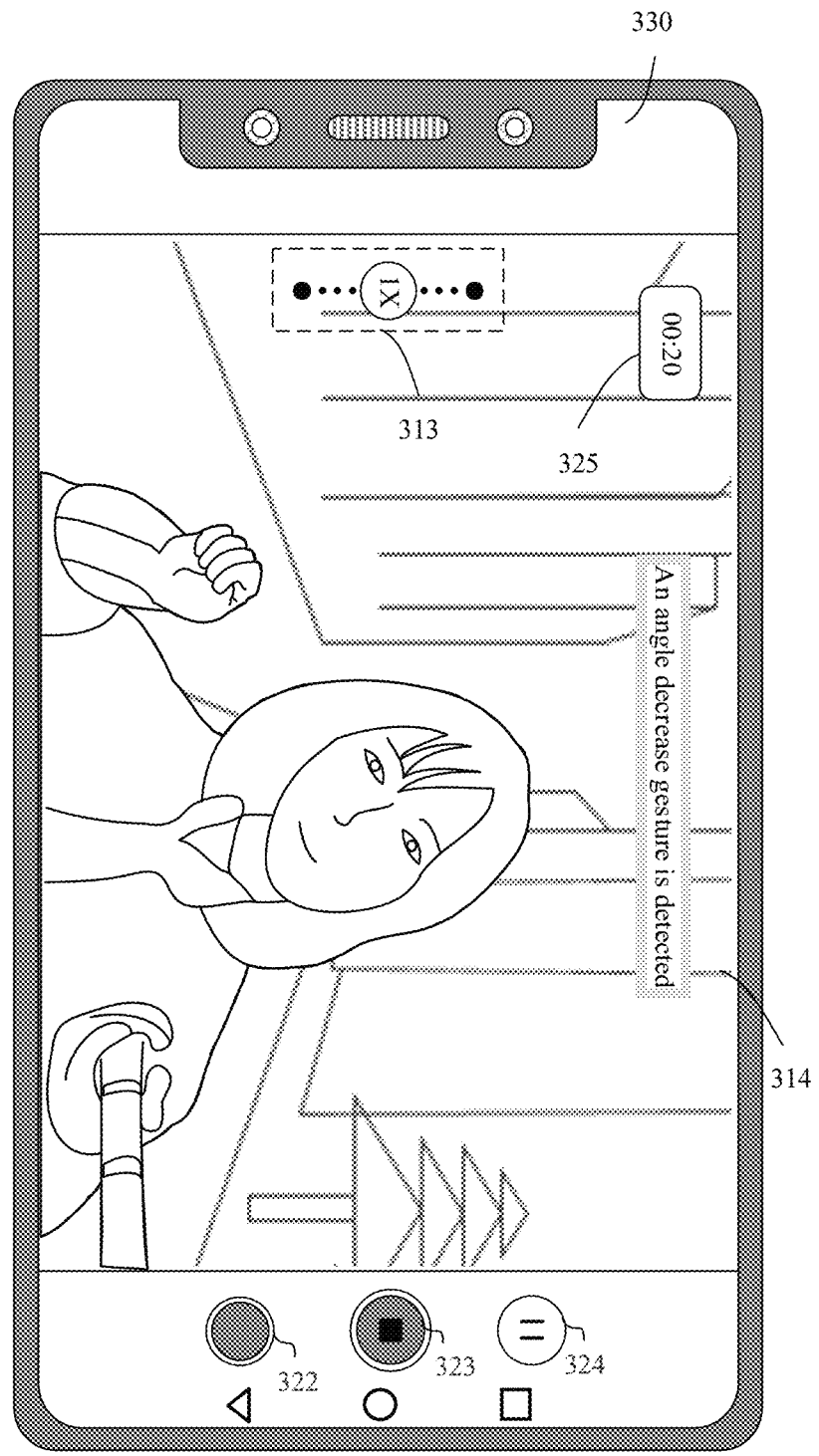
Figure 5I:
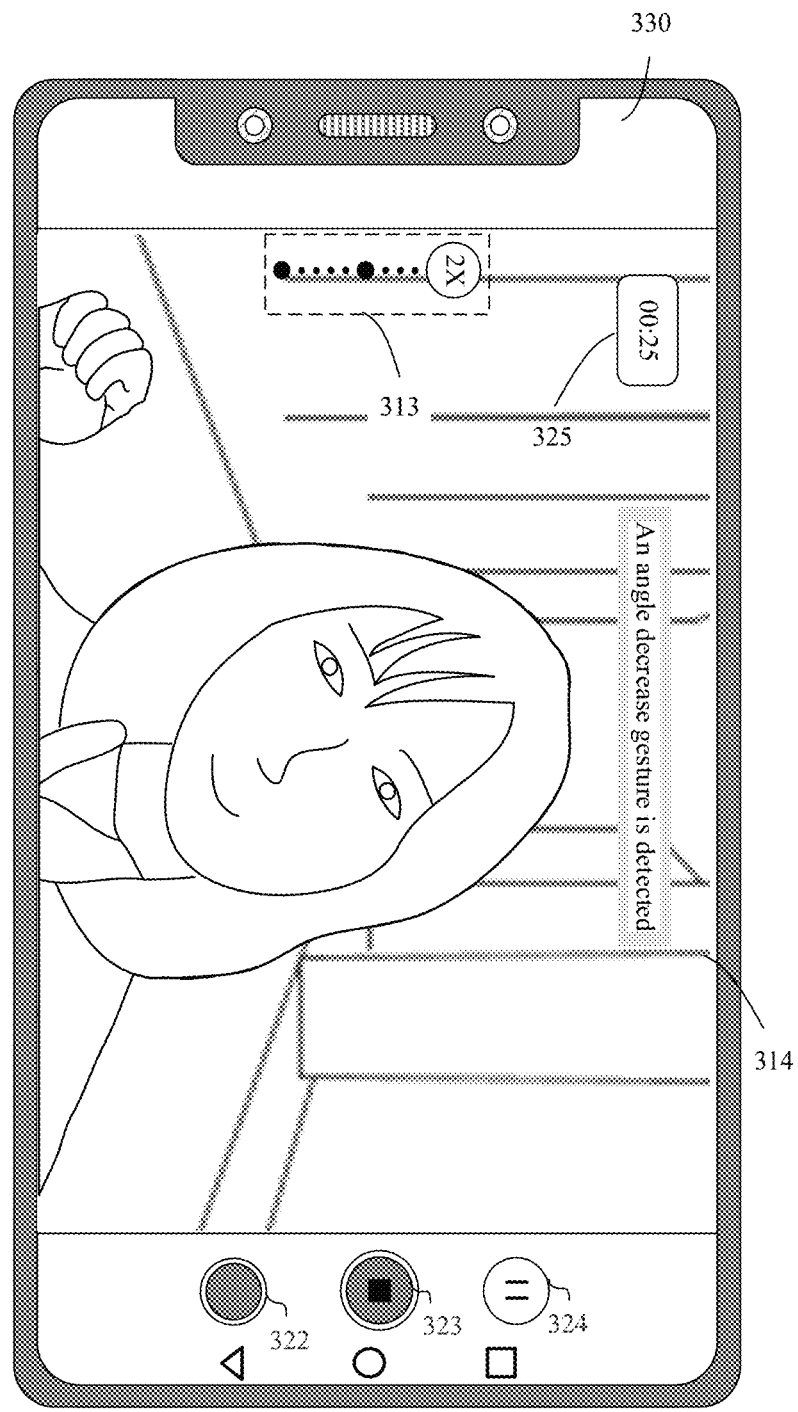
Figure 5J:
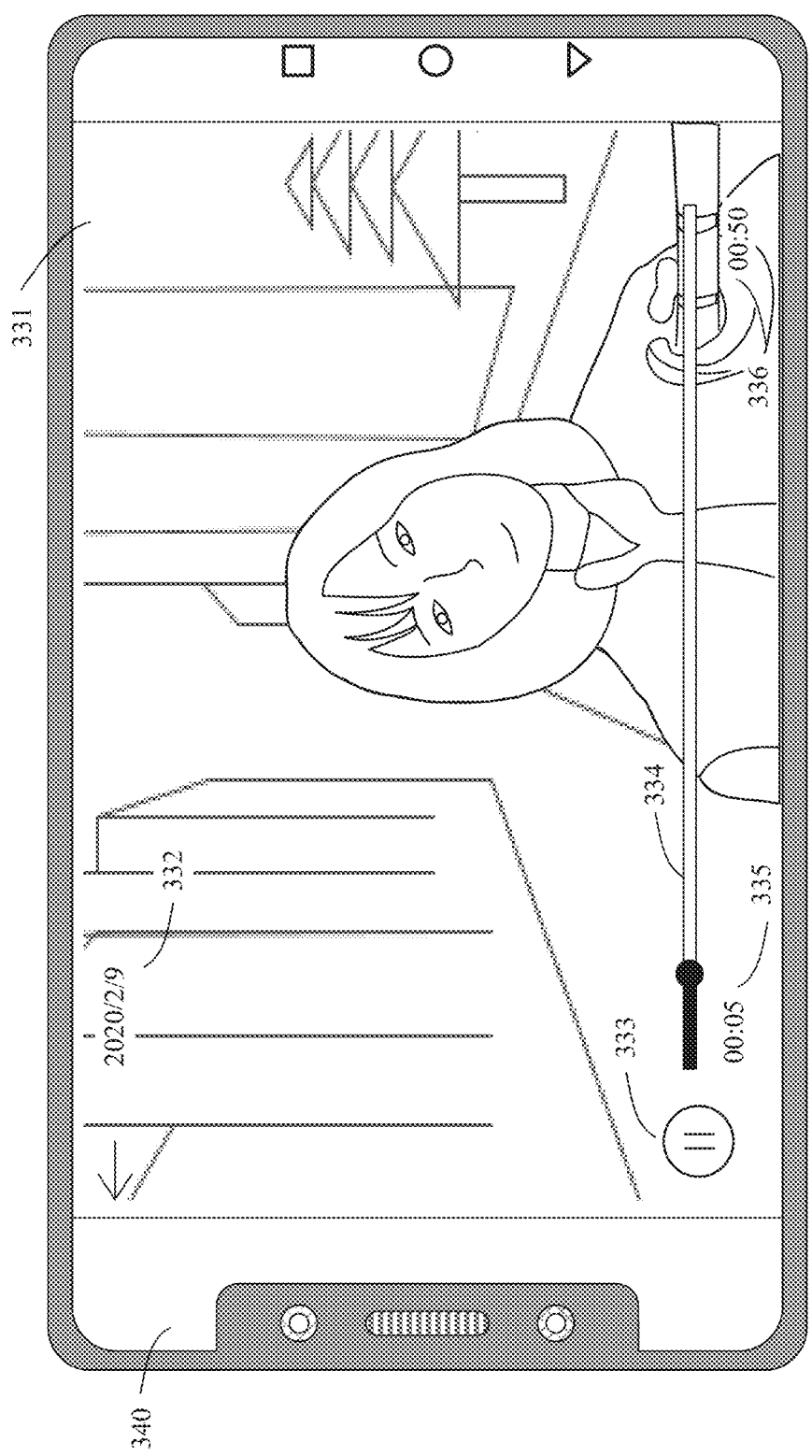
Figure 5K:
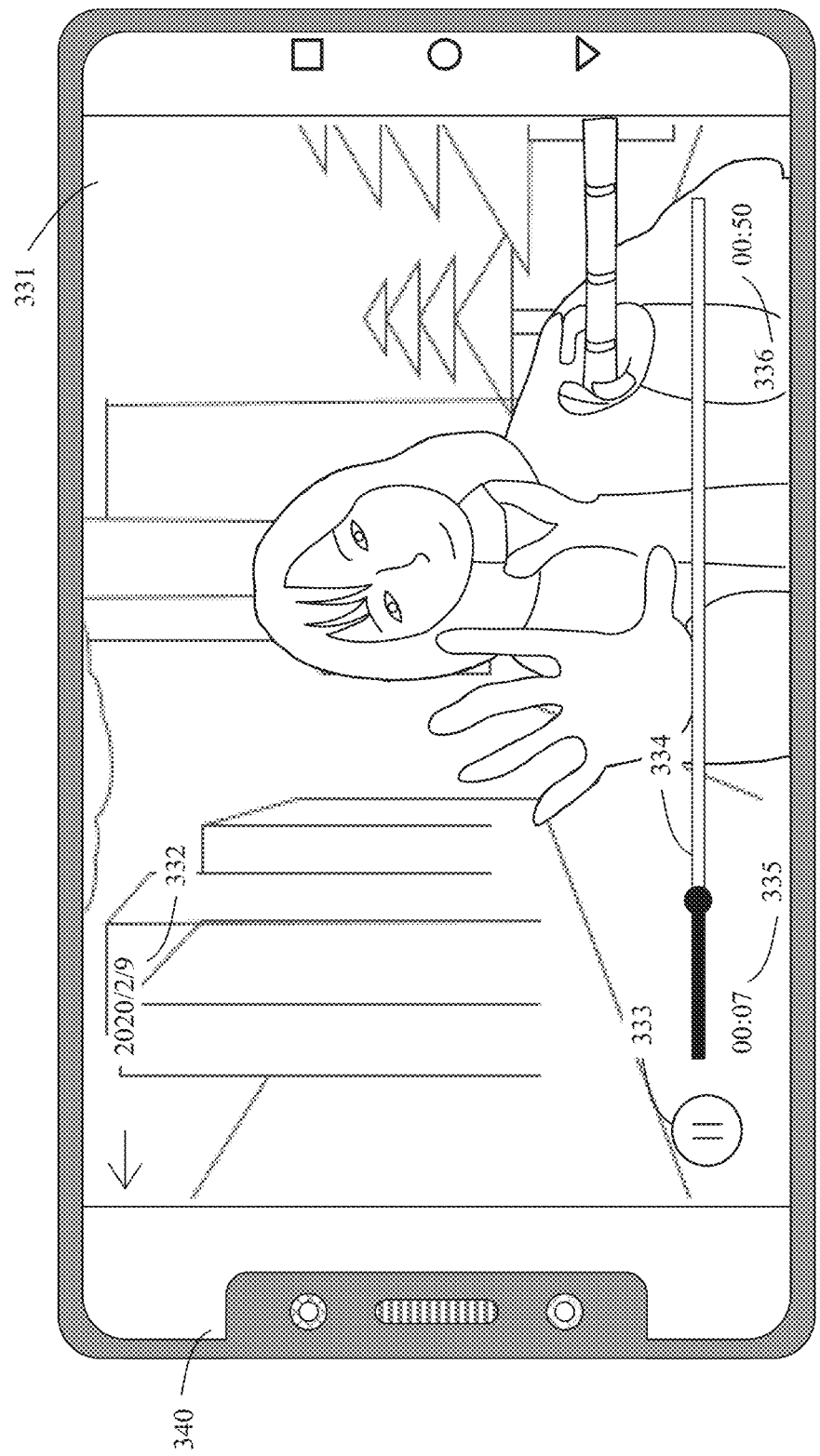
Figure 5L:
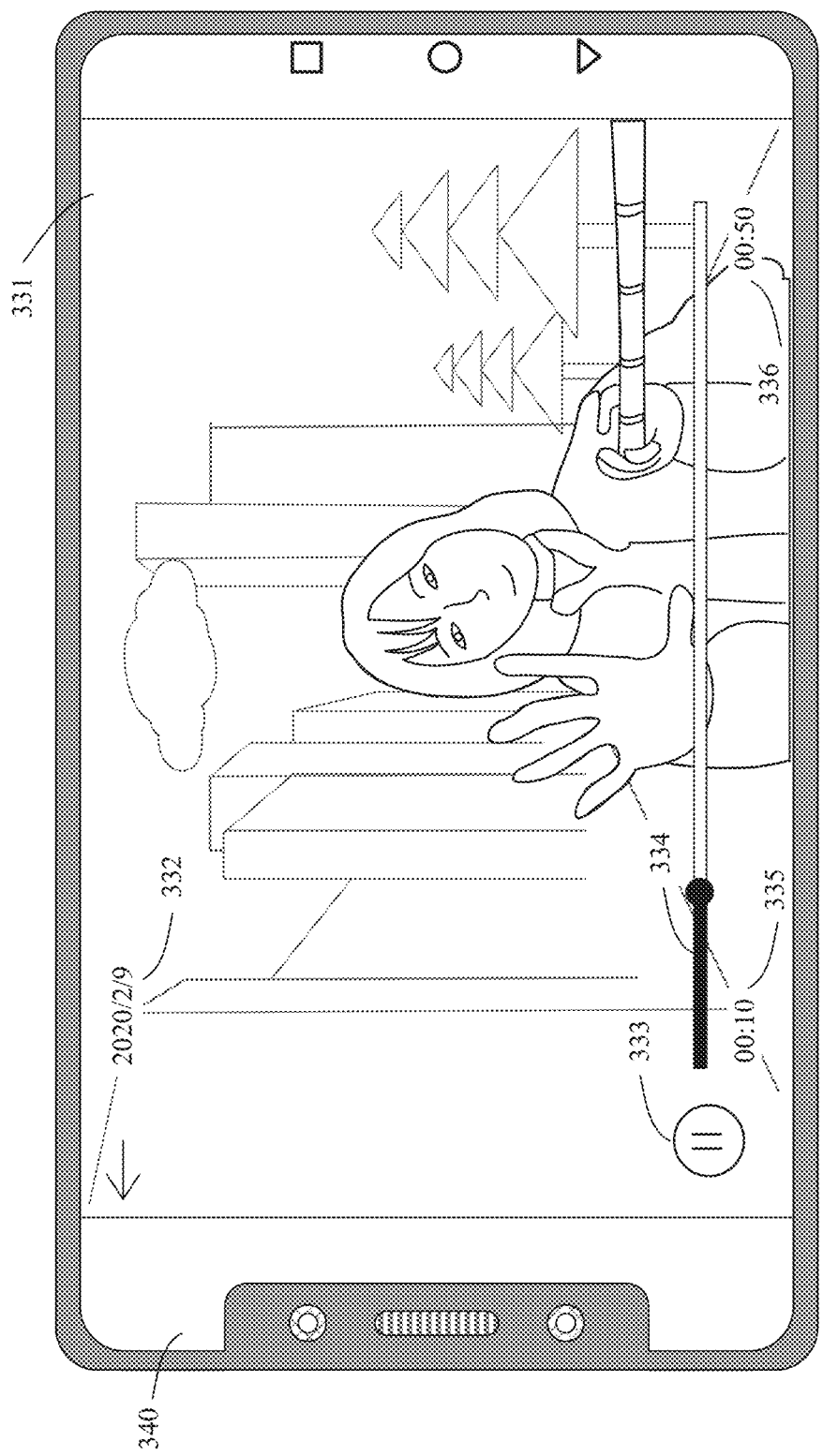
Figure 5M:
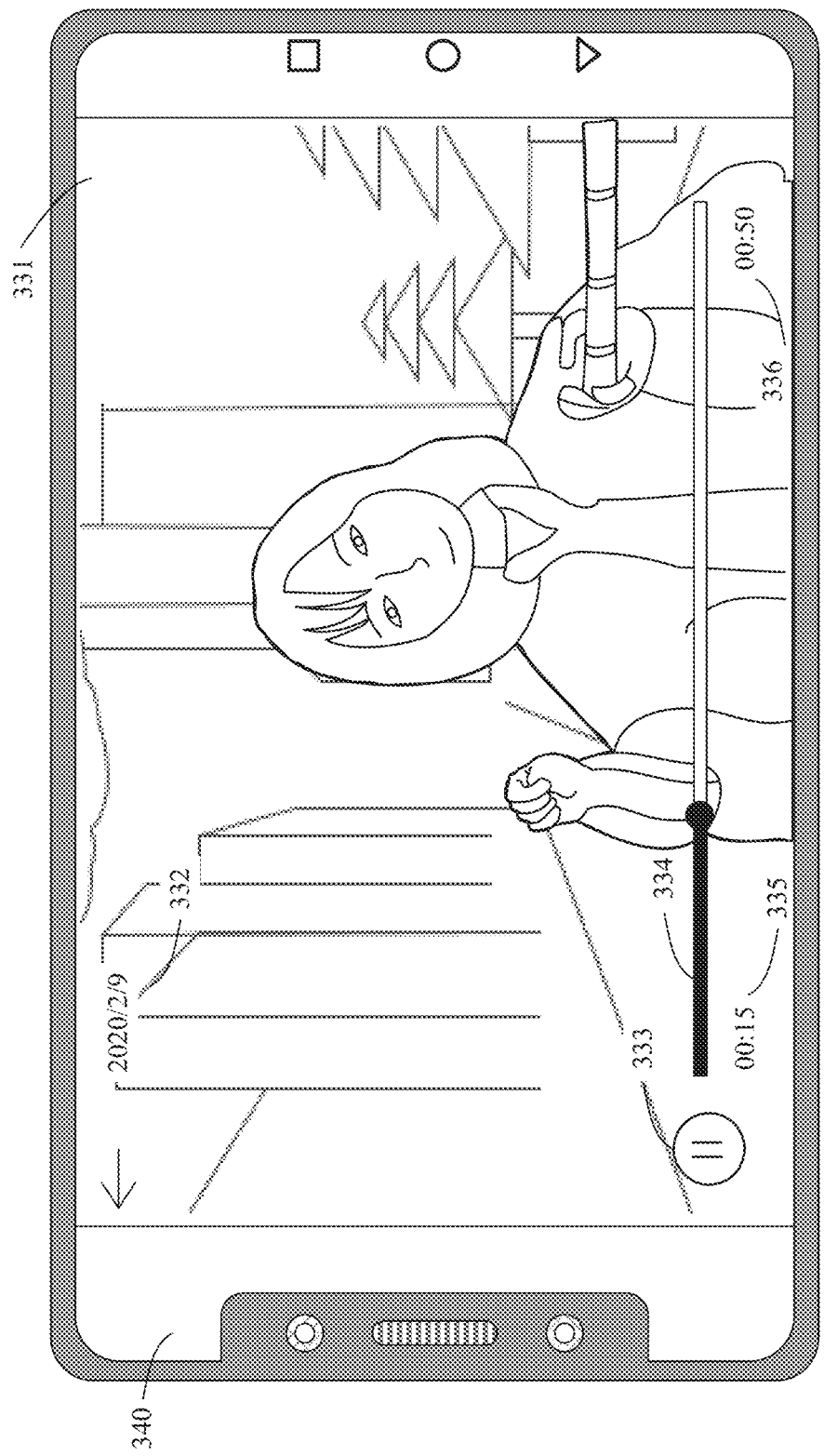
Figure 5N:
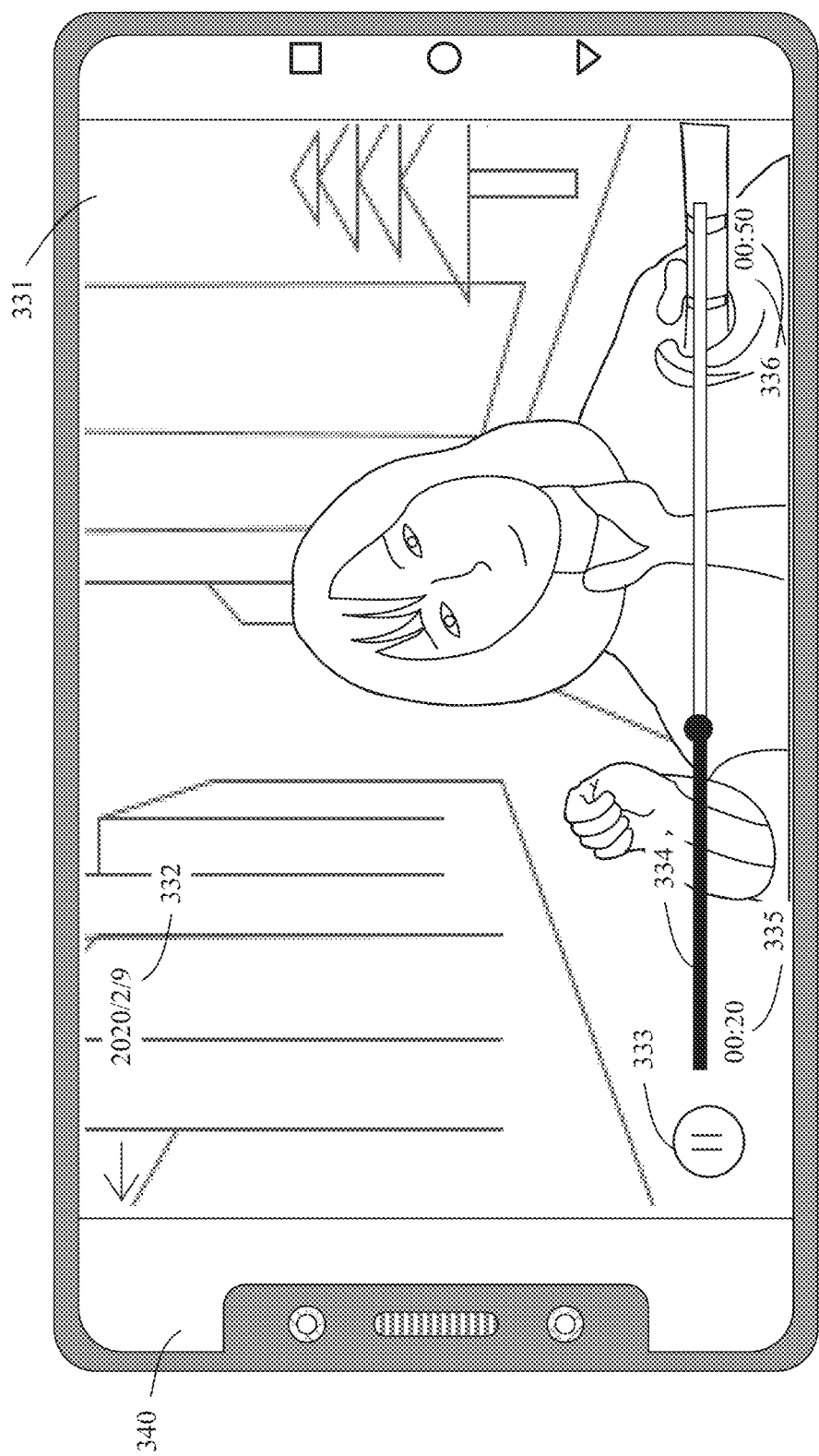
Figure 5O:
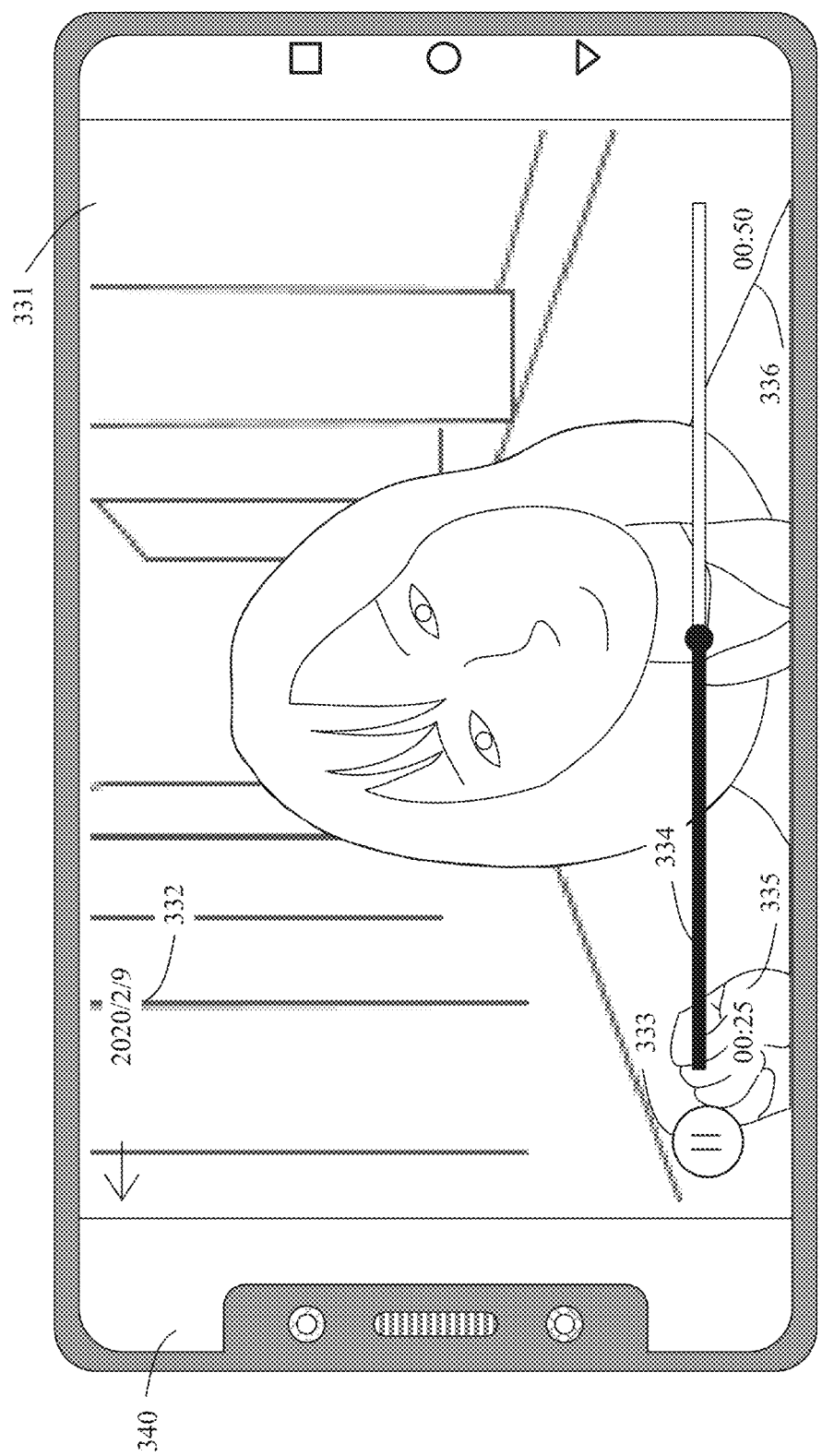

FIG. 5A to FIG. 5O show an example of a user interface for adjusting a preview angle in a front-facing video recording scenario.

(1) FIG. 5A to FIG. 5D show an example of a process of launching a front-facing video recording interface.

As shown in FIG. 5A, after starting a camera application, an electronic device 100 may display a user interface 310. The user interface 310 may be a user interface of the camera application in a default photographing mode. It is considered by default that in a preview box in the user interface, a display is from a common rear-facing camera 193-3.

When detecting a user operation of selecting a video mode, for example, a tap operation on a video mode option 315B, the electronic device 100 may display a video recording preview interface 320 shown in FIG. 5B. Controls included in the video recording preview interface 320 are basically the same as those included in the user interface 310 for performing photographing. In addition, the video recording preview interface 320 may include a video recording start control 321.

As shown in FIG. 5B, when detecting a tap operation on a lens flip control 318, the electronic device 100 may display a video recording preview interface 320 shown in FIG. 5C. A display in a preview box in the video recording preview interface 320 is from a common front-facing camera 193-1. In this case, a zoom ratio 313 is a 1× ratio 1×, and a preview angle presented by an image displayed in a preview box 314 may be the same as an angle of view of the common camera 193-1.

When detecting a user operation, for example, a tap operation, that acts on the video recording start control 321, the electronic device 100 may start video recording, and display a video recording interface 330 shown in FIG. 5D. Controls in the video recording interface 330 are basically the same as those in the user interface 310 for performing photographing. A difference is that there is no camera mode option 315 in the video recording interface 330, and a shutter control 322, a video recording end control 323, a video recording pause control 324, and a video recording time control 325 may be displayed in the video recording interface 330. The shutter control 322 may be used to trigger photographing, that is, a user may tap, in a video recording process, the shutter control 322 to perform photographing. The video recording end control 323 may be used to end video recording. The video recording pause control 324 may be used to temporarily stop video recording. The video recording time control 325 may indicate a time length in which video recording is currently performed. As shown in FIG. 5D, 00:05 is displayed in the video recording time control 325, which indicates that video recording is currently performed for 5 seconds. For a function of another control in the video recording interface 330, refer to the description of the user interface 310 shown in FIG. 3A. Details are not described herein.

(2) FIG. 5D to FIG. 5F show an example of a user interface for increasing the preview angle in the front-facing video recording scenario.

The electronic device 100 may recognize a gesture of the user by using an image collected by a front-facing camera, and increase the preview angle in response to a specific gesture (for example, a gesture of opening a palm and pushing forward).

As shown in FIG. 5D to FIG. 5F, in a video recording process, if the gesture of opening a palm and pushing forward is detected, the electronic device 100 may gradually increase the preview angle presented by the image displayed in the preview box 314. In addition, the zoom ratio 313 displayed in the video recording interface 330 is gradually decreased.

As shown in FIG. 5D, at a fifth second of video recording, the zoom ratio 313 is a 1× ratio 1×. In a time period from the fifth second to a seventh second of video recording, the electronic device 100 recognizes the gesture of opening a palm and pushing forward, the preview angle presented by the image displayed in the preview box 314 is gradually increased, and the zoom ratio 313 is gradually decreased. For example, the zoom ratio is decreased from 1× to 0.9× or decreased from 0.9× to 0.8×.

As shown in FIG. 5E, in comparison with the case at the fifth second of video recording, at the seventh second of video recording, the electronic device 100 recognizes a gesture of opening a palm and continuing to push forward, the preview angle presented by the image displayed in the preview box 314 is further increased, and the zoom ratio 313 is decreased to 0.7×.

As shown in FIG. 5F, in comparison with the case at the seventh second of video recording, at a $10^{th}$ second of video recording, the electronic device 100 recognizes a gesture of opening a palm and further continuing to push forward, the preview angle presented by the image displayed in the preview box 314 is still further increased, and the zoom ratio 313 is decreased to 0.6×, for example, a wide ratio.

In a time period from start of video recording to the $10^{th}$ second, the zoom ratio 313 may be decreased from 1× to 0.9×, increased from 0.9× to 0.7×, . . . , and gradually decreased to the wide ratio, and the preview angle presented by the image displayed in the preview box 314 is gradually increased. In other words, in the video recording process, the user may increase the preview angle by using the gesture of opening a palm and pushing forward.

(3) FIG. 5G to FIG. 5I show an example of a user interface for increasing the preview angle in the front-facing video recording scenario.

The electronic device 100 may recognize the gesture of the user by using the image collected by the front-facing camera, and decrease the preview angle in response to a specific gesture (for example, a gesture of clenching a fist and pulling backward).

As shown in FIG. 5G to FIG. 5I, m a video recording process, if the gesture of clenching a fist and pulling backward is detected, the electronic device 100 may gradually decrease the preview angle presented by the image displayed in the preview box 314. In addition, the zoom ratio 313 displayed in the video recording interface 330 is gradually increased.

As shown in FIG. 5G, in comparison with the case at the $10^{th}$ second of video recording, at a $15^{th}$ second of video recording, the electronic device 100 recognizes the gesture of clenching a fist and pulling backward, the preview angle presented by the image displayed in the preview box 314 is decreased, and the zoom ratio 313 is increased to 0.8×.

As shown in FIG. 5H, at a $20^{th}$ second of video recording, the electronic device 100 recognizes a gesture of clenching a fist and continuing to pull backward, the preview angle presented by the image displayed in the preview box 314 is further decreased, and the zoom ratio 313 is increased to 1×.

As shown in FIG. 5I, at a $25^{th}$ second of video recording, the electronic device 100 recognizes a gesture of clenching a fist and further continuing to pull backward, the preview angle presented by the image displayed in the preview box 314 is still further decreased, and the zoom ratio 313 is increased to 2×.

In a time period from the $20^{th}$ second to the $25^{th}$ second of video recording, the zoom ratio 313 may be increased from 1× to 1.1×, increased from 1.1× to 1.2×, . . . , and gradually increased to 2×, and the preview angle presented by the image displayed in the preview box 314 is gradually decreased. In other words, in the video recording process, the user may decrease the preview angle by using the gesture of clenching a fist and pulling backward.

During video recording, the electronic device 100 may determine, based on a speed of pushing forward or pulling backward in the recognized gesture, a speed of adjusting the preview angle presented by the image displayed in the preview box 314. For a manner of determining the speed of adjusting the photographing angle presented by the image displayed in the preview box 314, refer to the description of adjusting, during photographing, the preview angle presented by the image displayed in the preview box 314. Details are not described herein.

For specific implementation of adjusting the preview angle in the front-facing video recording scenario, refer to the specific implementation of adjusting the preview angle in the front-facing photographing scenario. Details are not described herein.

(4) FIG. 5J to FIG. 5O show some user interfaces for playing a recorded video.

The electronic device 100 may detect a user operation used to end video recording, for example, a tap operation on the video recording end control 323, and store, as a video, a series of images sequentially displayed in the preview box 314 in the video recording process.

When playing the recorded video, the electronic device 100 may display a video play interface 340 shown in FIG. 5J to FIG. 5O. The video play interface 340 may include an image display region 331, a time control 332, a pause control 333, a play progress bar 334, an existing video play time 335, and total video duration 336.

The image display region 331 may be used to display a frame of image included in the video.

The time control 332 may indicate a recording time of the video, for example, Feb. 9, 2020.

The pause control 333 may be used to pause video play.

The play progress bar 334 may be used to compare the existing video play time with the total video duration, and indicate video play progress.

The existing video play time 335 may be used to indicate an existing play time of the video.

The total video duration 336 may be used to indicate total duration of the video.

When the recorded video is played, as shown in FIG. 5J to FIG. 5L, in a time period from a fifth second to a $10^{th}$ second of the video, a preview angle presented by an image in the display region 331 is gradually increased, and a picture includes an increasing quantity of scenes.

When the recorded video is played, as shown in FIG. 5M to FIG. 5O, in a time period from the $10^{th}$ second to a $25^{th}$ second of the video, the preview angle presented by the image in the display region 331 is gradually decreased, and the picture includes a decreasing quantity of scenes.

It may be learned that in the method provided in this embodiment of this application, the user may be supported in adjusting the preview angle in the video recording process, so that a captured video picture presents richer changes, to improve photographing experience.

FIG. 6A to FIG. 6I show an example of a user interface for adjusting a preview angle in a rear-facing photographing scenario.

(1) A "mid-air gesture-based photographing" function is enabled in the rear-facing photographing scenario.

An electronic device 100 may photograph a scene by using a rear-facing camera, but does not recognize a gesture of a user by using the rear-facing camera. When photographing is performed by using the rear-facing camera, an image displayed in a preview box 314 is from the rear-facing camera. The electronic device 100 may start a front-facing camera, recognize the gesture of the user by using an image collected by the front-facing camera, and increase the preview angle in response to a specific gesture (for example, a gesture of opening a palm and pushing forward).

In the rear-facing photographing scenario, the electronic device 100 may detect a user operation of enabling the "mid-air gesture-based photographing" function, start the front-facing camera, and recognize the specific gesture by using the image collected by the front-facing camera. The "mid-air gesture-based photographing" function means that the electronic device may start the front-facing camera, recognize the specific gesture by using the image collected by the front-facing camera, and adjust the preview angle once the specific gesture is recognized. How to adjust the preview angle based on the specific gesture is explained in detail in embodiments of this application. Details are not described herein.

Figure 6A:
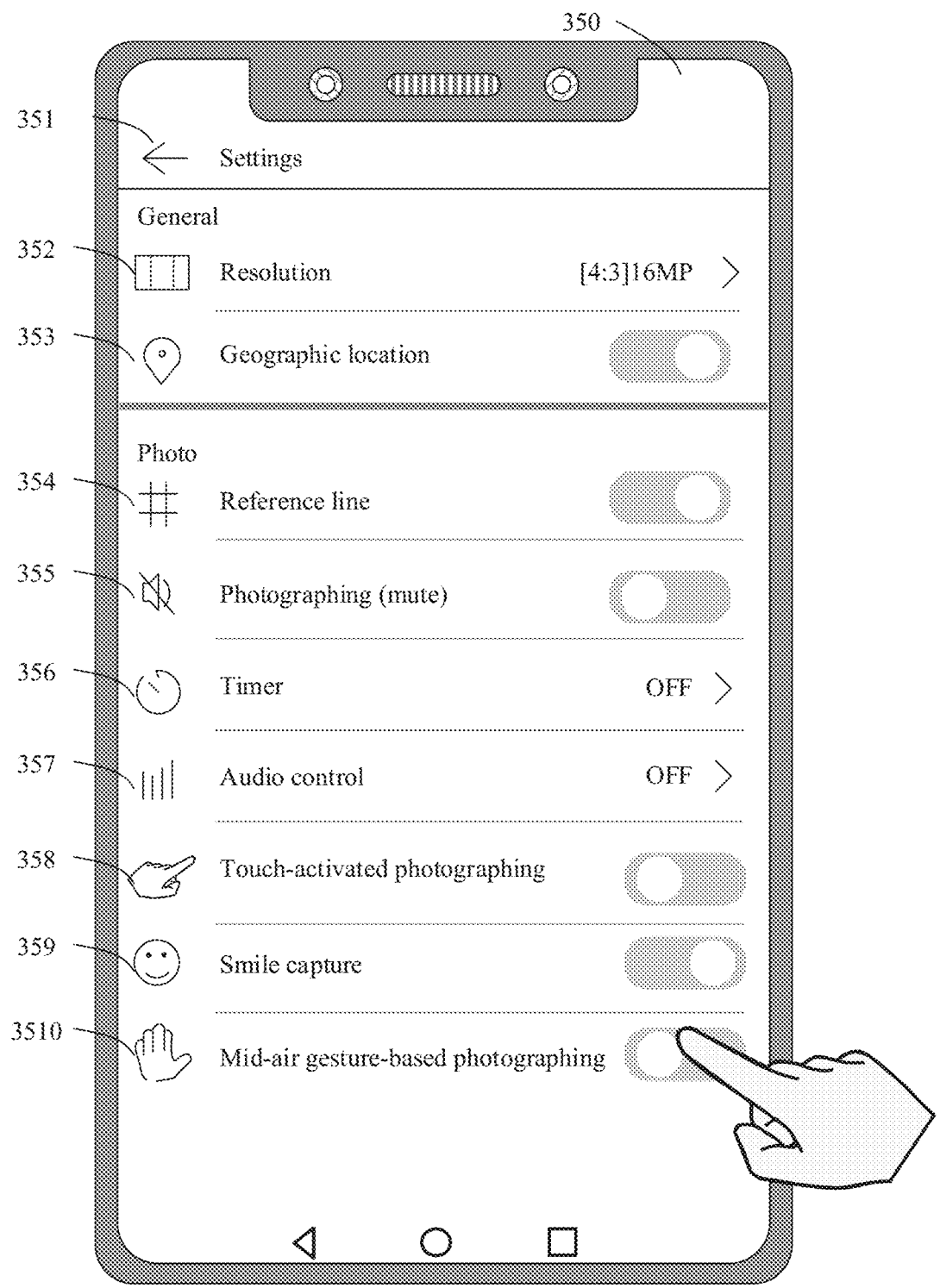
FIG. 6A and FIG. 6B show a user interface for enabling mid-air gesture-based photographing according to an embodiment of this application.
Figure 6B:
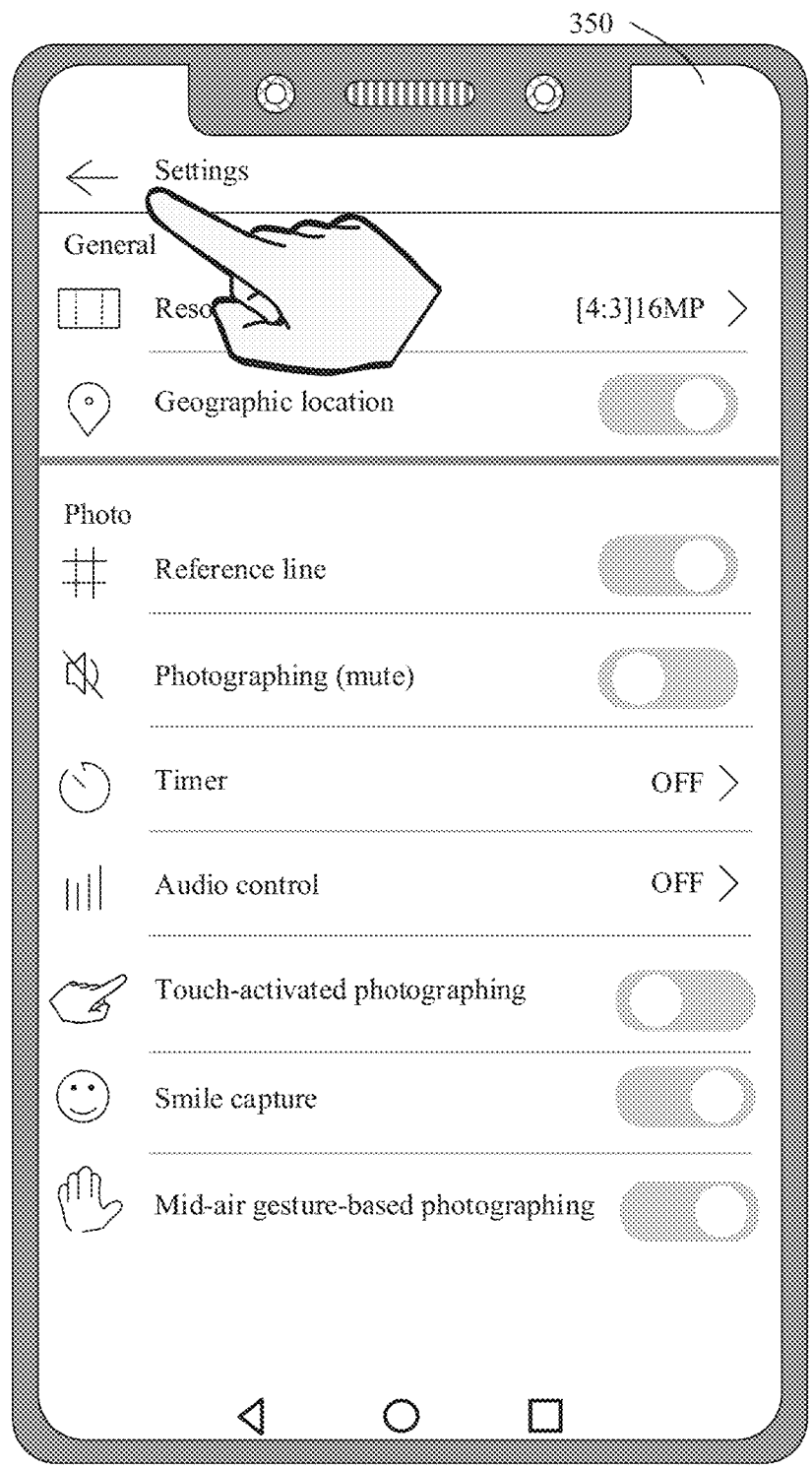

For example, when detecting a tap operation on the settings control 311 in the user interface 310 shown in FIG. 3A, the electronic device 100 may display a user interface 350 shown in FIG. 6A and FIG. 6B. The user interface 350 may include a back control 351, a resolution control 352, a location tag control 353, an assistive grid control 354, a mute control 355, a timer photographing control 356, an audio control photographing control 357, a touch to capture control 358, a smile capture control 359, a "mid-air gesture-based photographing" control 3510, and the like. The "mid-air gesture-based photographing" control 3510 may be used by the user to enable or disable the "mid-air gesture-based photographing" function. This is not limited to the user interface shown in FIG. 6A and FIG. 6B. Controls for enabling functions such as "mid-air gesture-based photographing" and "mid-air gesture-based video recording" may be photographing mode options displayed in the user interface 310, for example, a "mid-air gesture-based photographing" option and a "mid-air gesture-based video recording" option.

Figure 6C:
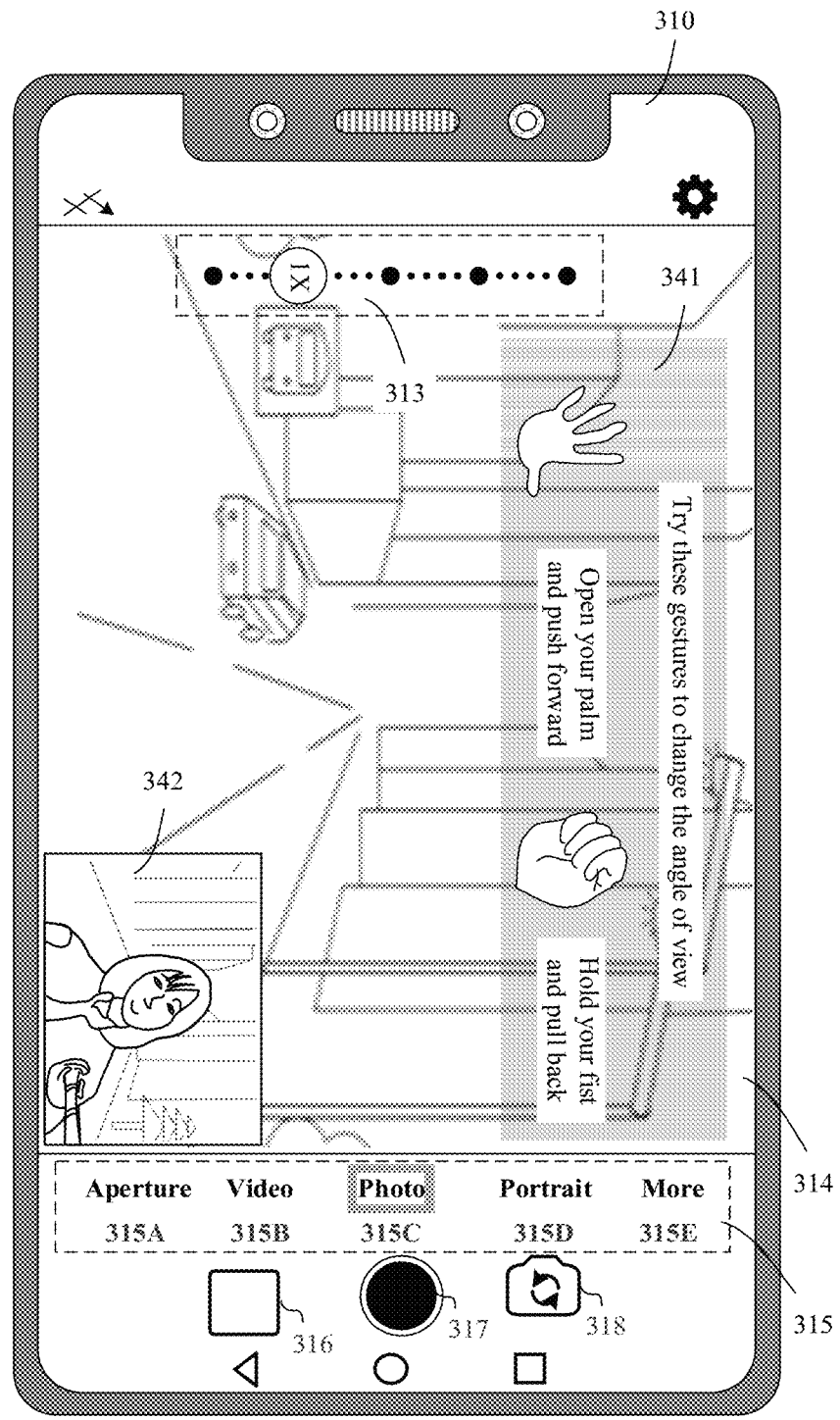
FIG. 6C to FIG. 6I show a user interface for adjusting, when photographing is performed by using a rear-facing camera of an electronic device, a preview angle presented by an image displayed in a preview box according to an embodiment of this application.

After the "mid-air gesture-based photographing" function is enabled, the electronic device 100 may display a user interface 310 shown in FIG. 6C. The user interface 310 may include a prompt 341 and a prompt 342. The prompt 341 may be used to prompt the user with a gesture that can be used to adjust the preview angle. The prompt 342 may be a thumbnail of the image collected by the front-facing camera. Occasions of displaying the prompt 341 and the prompt 342 by the electronic device 100 and a UI representation of the prompt 341 are not limited in this embodiment of this application.

The "mid-air gesture-based photographing" function is also applicable to a front-facing photographing scenario. That is, only after the "mid-air gesture-based photographing" function is enabled, the electronic device recognizes the specific gesture by using the image collected by the front-facing camera. Otherwise, even if the user makes the specific gesture during front-facing photographing preview, the electronic device does not respond to the gesture, in other words, does not adjust the preview angle.

Figure 6D:
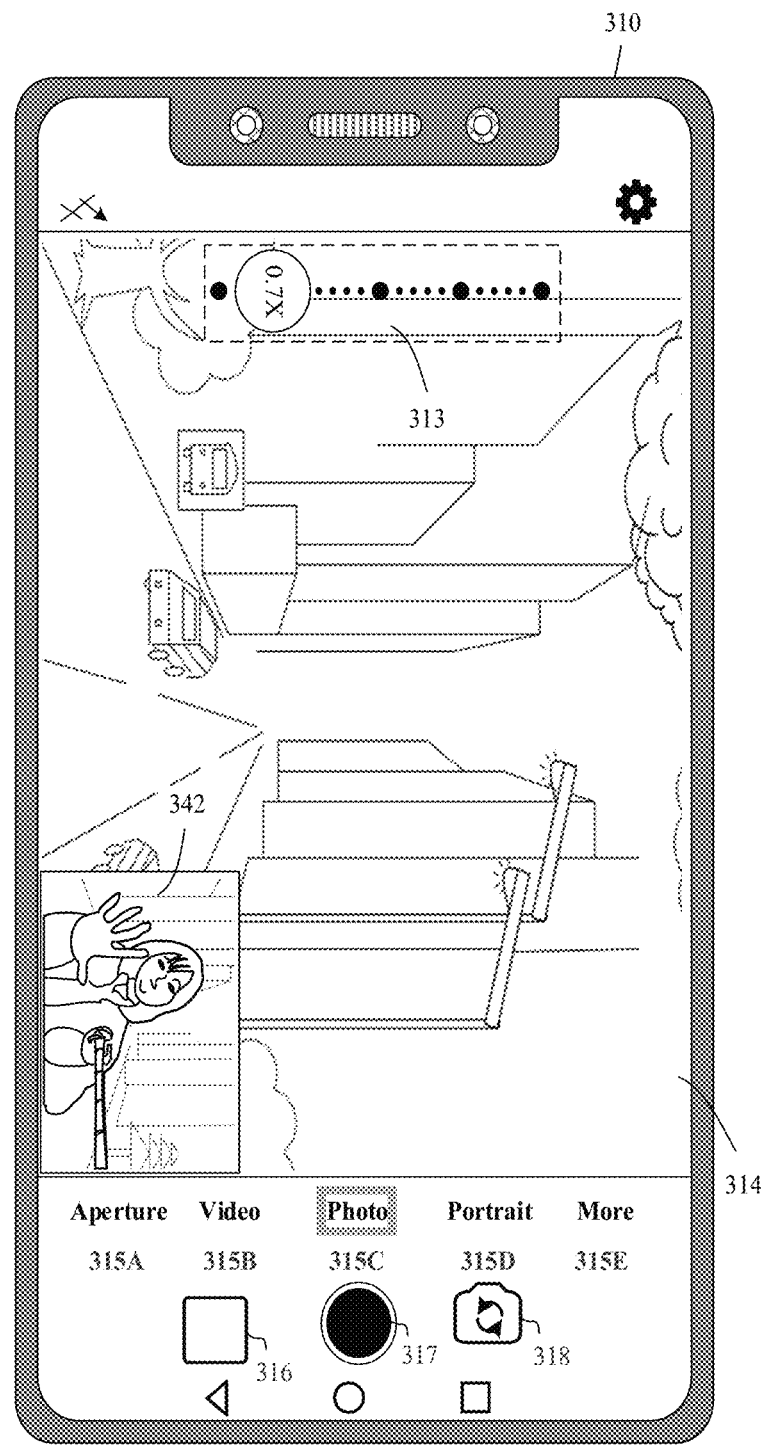
Figure 6E:
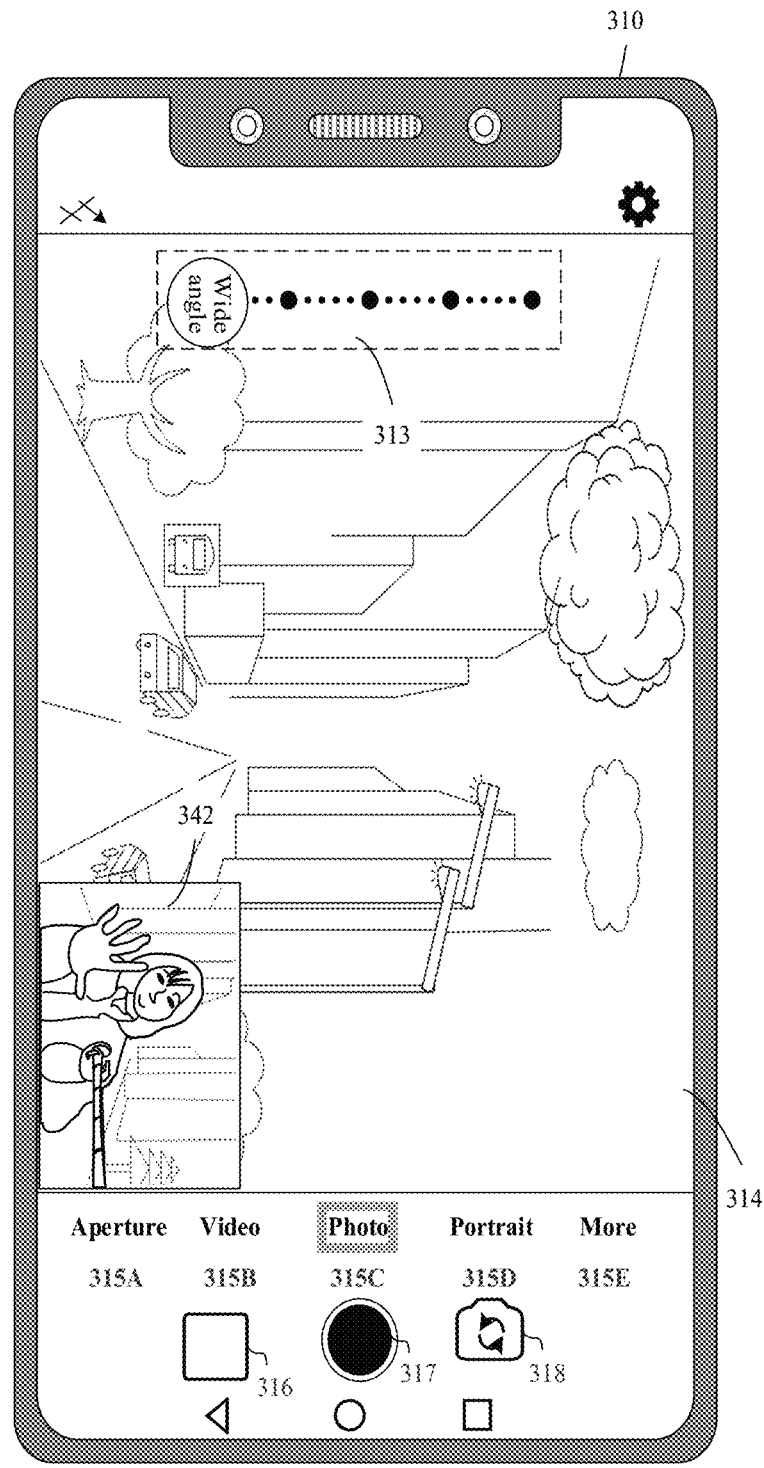

(2) FIG. 6C to FIG. 6E show an example of a user interface for increasing the preview angle in the rear-facing photographing scenario.

After the "mid-air gesture-based photographing" function is enabled, the electronic device 100 may recognize the gesture of the user by using the image collected by the front-facing camera, and increase the preview angle in response to a specific gesture (for example, the gesture of opening a palm and pushing forward).

As shown in FIG. 6C to FIG. 6E, when a rear-facing photographing preview interface is displayed, if the gesture of opening a palm and pushing forward is detected, the electronic device 100 may gradually increase a preview angle presented by an image displayed in the preview box 314. The image in the preview box 314 is from the rear-facing camera. In addition, a zoom ratio 313 displayed in the rear-facing photographing preview interface 310 is gradually decreased.

As shown in FIG. 6C, an initial zoom ratio 313 may be a 1× ratio 1×, and the image displayed in the preview box 314 is from a common rear-facing camera. Subsequently, the electronic device 100 may recognize, by using the front-facing camera, the gesture of opening a palm and pushing forward, the preview angle presented by the image displayed in the preview box 314 may be gradually increased, and the zoom ratio 313 is gradually decreased. For example, the zoom ratio is decreased from 1× to 0.9× or decreased from 0.9× to 0.8×.

As shown in FIG. 6D, in comparison with the scenario shown in FIG. 6C, the electronic device 100 may recognize, by using the front-facing camera, a gesture of opening a palm and continuing to push forward, the preview angle presented by the image displayed in the preview box 314 is further increased, and the zoom ratio 313 is decreased to 0.7×.

As shown in FIG. 6E, in comparison with the scenario shown in FIG. 6D, the electronic device 100 may recognize, by using the front-facing camera, a gesture of opening a palm and further continuing to push forward, the preview angle presented by the image displayed in the preview box 314 is still further increased, and the zoom ratio 313 is decreased to 0.6×, for example, a wide ratio.

In the process from the scenario shown in FIG. 6C to the scenario shown in FIG. 6E, the zoom ratio 313 may be decreased from 1× to 0.9×, increased from 0.9× to 0.7×, . . . , and gradually decreased to the wide ratio, and the preview angle presented by the image displayed in the preview box 314 is gradually increased. In other words, in a front-facing photographing preview process, the user may increase the preview angle by using the gesture of opening a palm and pushing forward.

(3) FIG. 6F to FIG. 6I show an example of a user interface for decreasing the preview angle in the rear-facing photographing scenario.

After the "mid-air gesture-based photographing" function is enabled, the electronic device 100 may recognize the gesture of the user by using the image collected by the front-facing camera, and decrease the preview angle in response to a specific gesture (for example, a gesture of clenching a fist and pulling backward).

As shown in FIG. 6F to FIG. 6I, when a rear-facing photographing preview interface is displayed, if the gesture of clenching a fist and pulling backward is detected, the electronic device 100 may gradually decrease the preview angle presented by the image displayed in the preview box 314. The image in the preview box 314 is from the rear-facing camera. In addition, a zoom ratio 313 displayed in the rear-facing photographing preview interface 310 is gradually increased.

Figure 6F:
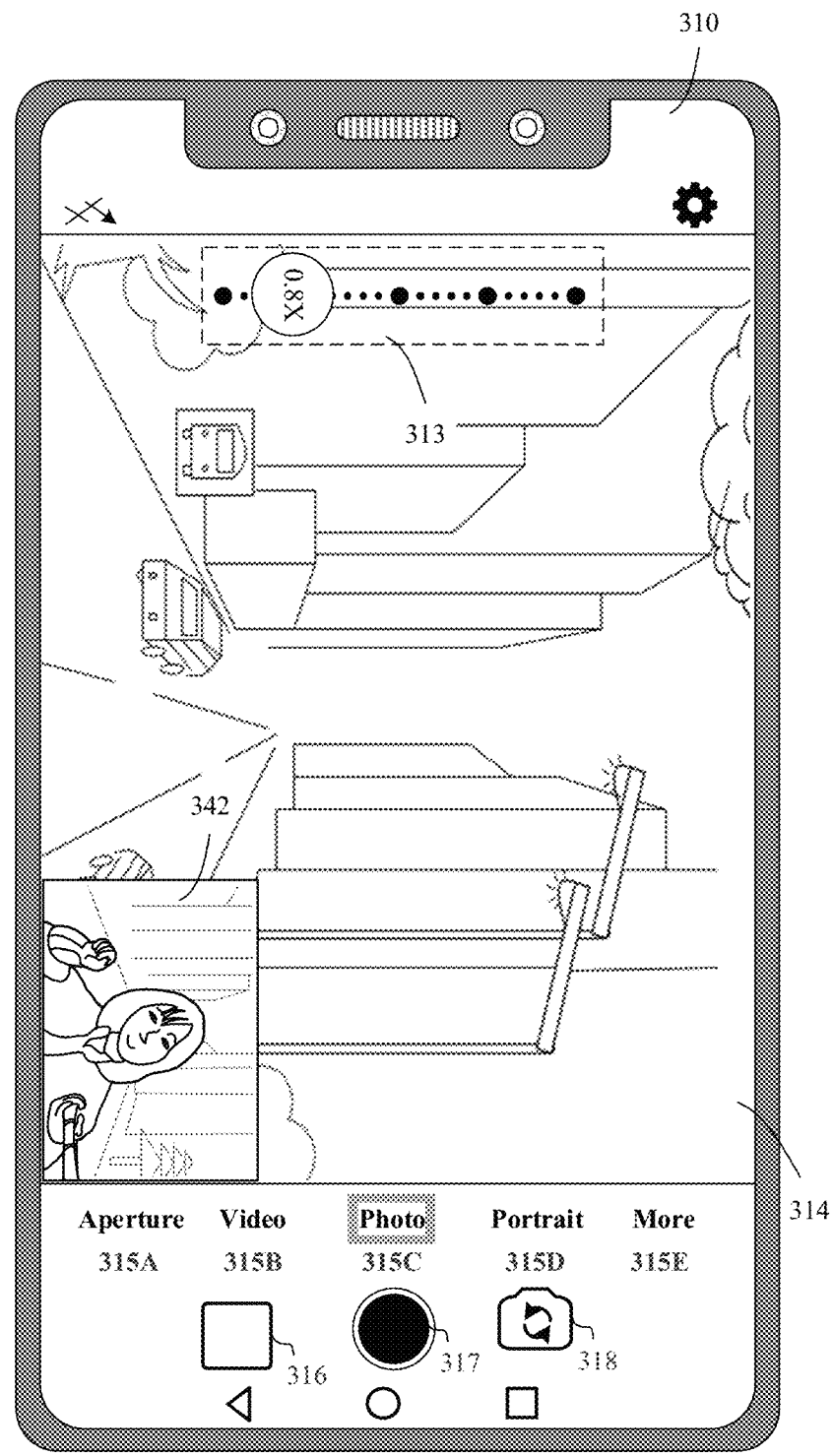

As shown in FIG. 6F, an initial zoom ratio 313 may be the wide ratio. Subsequently, the electronic device 100 may recognize, by using the front-facing camera, the gesture of clenching a fist and pulling backward, the preview angle presented by the image displayed in the preview box 314 is decreased, and the zoom ratio 313 is increased to 0.8×.

Figure 6G:
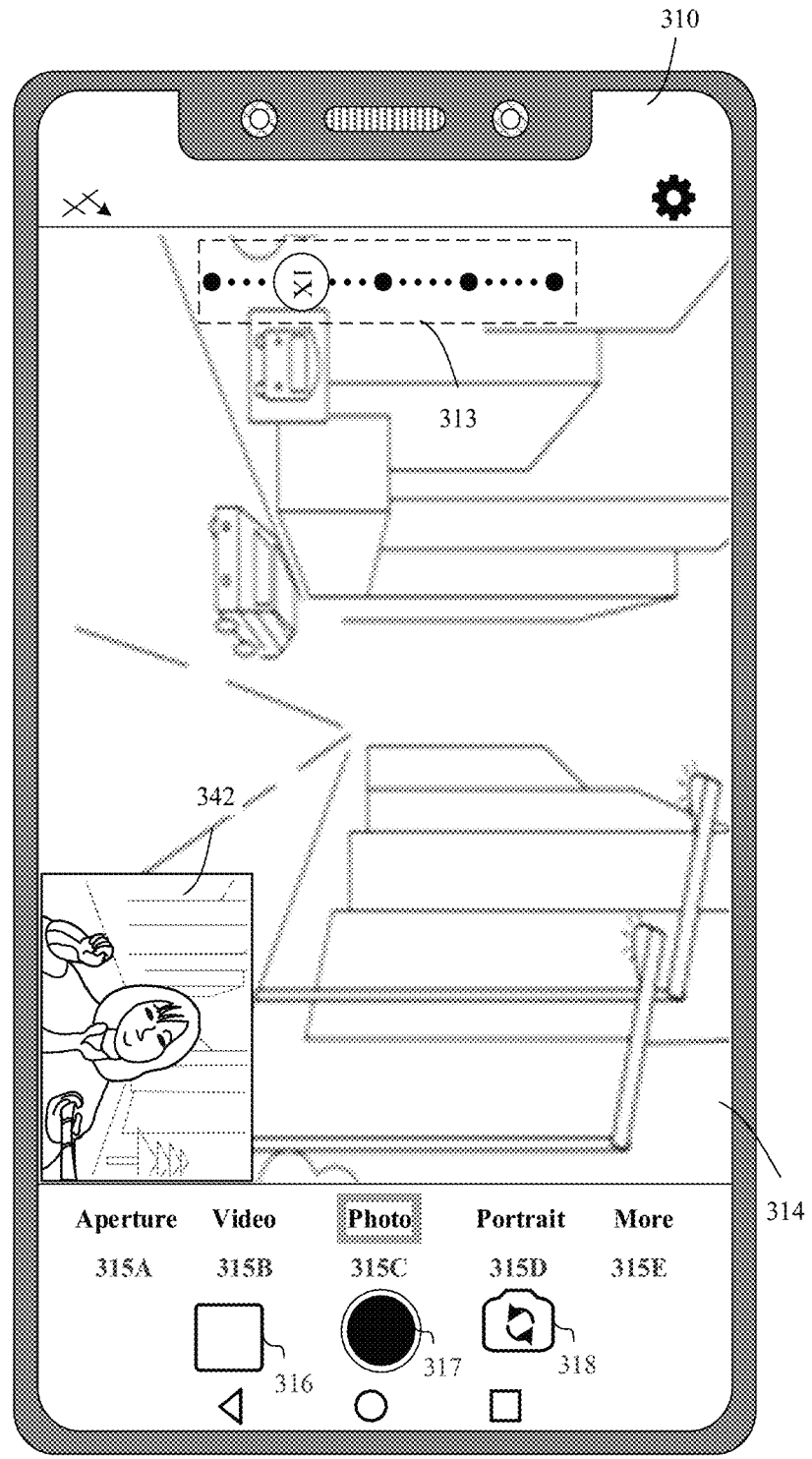

As shown in FIG. 6G, in comparison with the scenario shown in FIG. 6F, the electronic device 100 may recognize, by using the front-facing camera, a gesture of clenching a fist and continuing to pull backward, the preview angle presented by the image displayed in the preview box 314 is further decreased, and the zoom ratio 313 is increased to 1×.

Figure 6H:
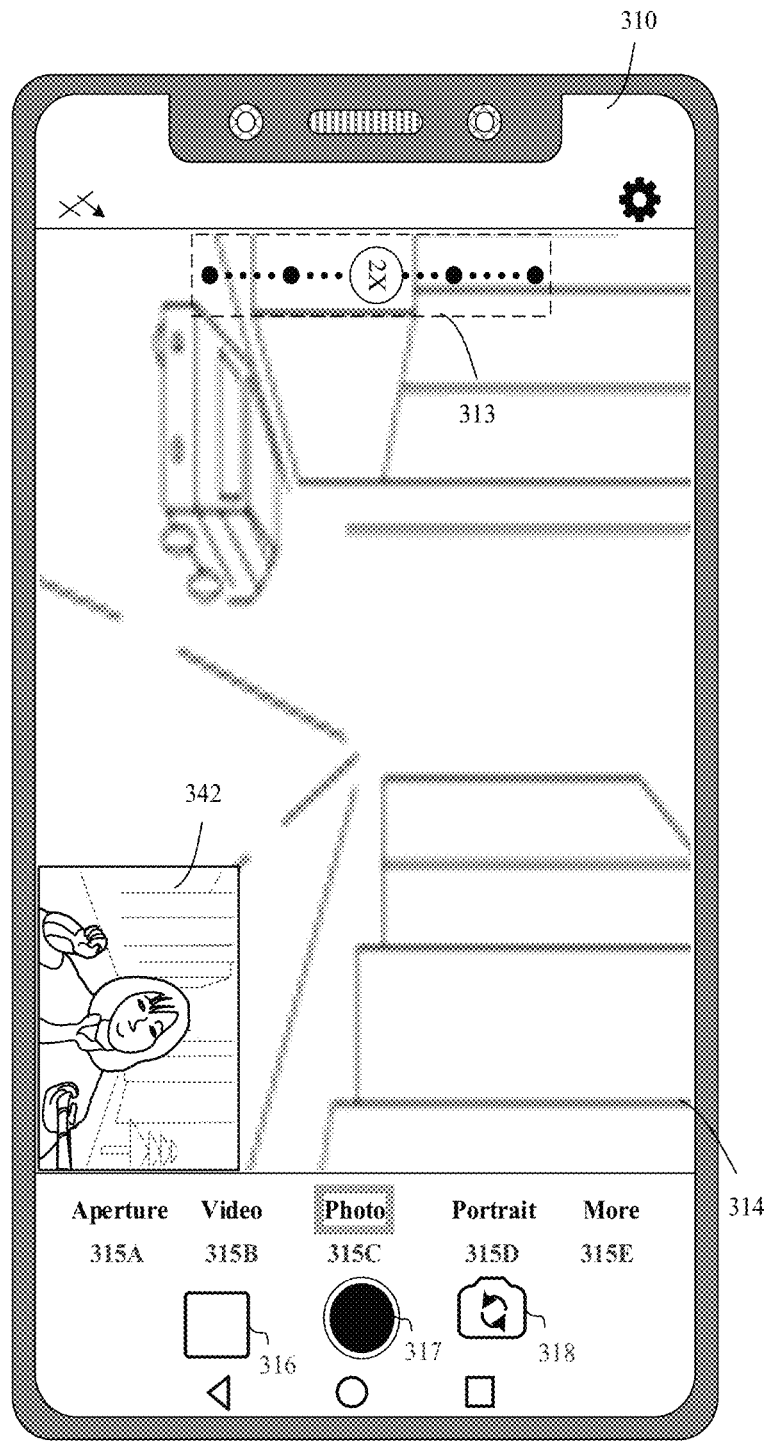

As shown in FIG. 6H, in comparison with the scenario shown in FIG. 6G, the electronic device 100 may recognize, by using the front-facing camera, a gesture of clenching a fist and further continuing to pull backward, the preview angle presented by the image displayed in the preview box 314 is still further decreased, and the zoom ratio 313 is increased to 2×.

Figure 6I:
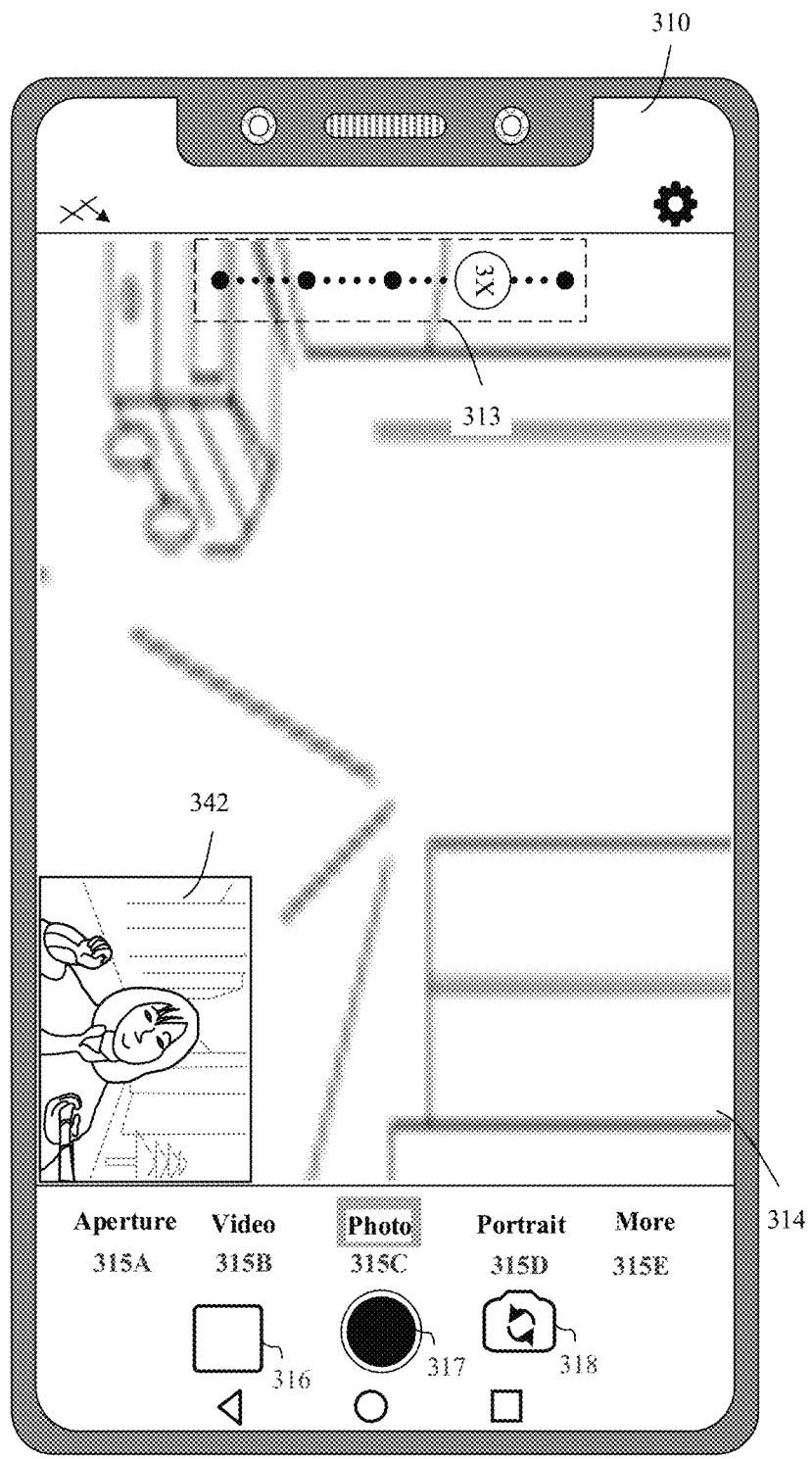

As shown in FIG. 6I, in comparison with the scenario shown in FIG. 6H, the electronic device 100 may recognize, by using the front-facing camera, a gesture of clenching a fist and still further continuing to pull backward, the preview angle presented by the image displayed in the preview box 314 is still further decreased, and the zoom ratio 313 is increased to 3×. In this case, an image displayed in the preview box 314 may be from a rear-facing telephoto camera.

In the scenarios shown in FIG. 6F to FIG. 6I, the zoom ratio 313 may be increased from 1× to 1.1×, increased from 1.1× to 1.2×, . . . , and gradually increased to 2×, and even further increased to 3×, and the preview angle presented by the image displayed in the preview box 314 is gradually decreased. In other words, in the front-facing photographing preview process, the user may decrease the preview angle by using the gesture of clenching a fist and pulling backward, and may perform switching to an angle of view of the rear-facing telephoto camera, to obtain a clear image with a smaller angle of view.

It may be learned from (1) to (3) that the user may adjust, by using a mid-air gesture of a single hand, the preview angle presented by the image displayed in the preview box. Especially in a scenario in which photographing is performed by using the front-facing camera, the user usually performs photographing by straightening an arm or by using a selfie stick. However, in the photographing method in this solution, the user may conveniently adjust the preview angle presented by the image displayed in the preview box. In this way, the user does not need to repeatedly hold the electronic device close and touch a screen of the electronic device with a finger to adjust the preview angle presented by the image displayed in the preview box. In addition, the user does not need to touch the screen of the electronic device with a finger, and therefore the user may feel impact of a change of the photographing angle in the preview box on a to-be-captured picture while adjusting the photographing angle displayed in the preview box.

A specific implementation of adjusting a preview angle during rear-facing photographing of an electronic device 100 is described below.

In some embodiments, the electronic device 100 includes a plurality of rear-facing cameras, for example, three front-facing cameras. The three front-facing cameras may include a common camera 193-3, a wide-angle camera 193-4, and a telephoto camera 193-5.

Phase 1: Increase an angle of view during photographing preview.

When recognizing a gesture of opening a palm and pushing forward, the electronic device 100 may gradually increase a preview angle presented by an image displayed in a preview box 314. Specifically, the electronic device 100 may first use an image collected by the common camera 193-3, and then use an image collected by the wide-angle camera 193-4. For the foregoing implementation process, refer to FIG. 4A and the foregoing embodiment in which the angle of view during photographing preview is increased during front-facing photographing. Details are not described herein.

Phase 2: Decrease the angle of view during photographing preview.

(1) The image collected by the wide-angle camera 193-4 is used.

(2) The image collected by the common camera 193-3 is used.

When recognizing a gesture of clenching a fist and pulling backward, the electronic device 100 may gradually decrease the preview angle presented by the image displayed in the preview box 314. Specifically, the electronic device 100 may first use the image collected by the wide-angle camera 193-4, and then use the image collected by the common camera 193-3. For a specific implementation in which the image collected by the wide-angle camera 193-4 and the image collected by the common camera 193-3 are sequentially used, refer to FIG. 4B and the foregoing embodiment in which the angle of view during photographing preview is decreased during front-facing photographing. Details are not described herein.

A difference from the embodiment in which the angle of view during photographing preview is decreased during front-facing photographing is that the rear-facing cameras further include the telephoto camera 193-5. That is, in an application scenario of rear-facing photographing, the electronic device 100 may decrease the preview angle presented by the image displayed in the preview box 314 to a smaller angle at a longer distance.

When using the image collected by the common camera 193-3, the electronic device 100 may crop, for a plurality of times, images sequentially collected by the common camera 193-3. There is an increasingly small cropping region for the plurality of times of cropping. When a preview angle presented by an image, in the cropping region, obtained by cropping the image collected by the common camera 193-3 is slightly greater than an angle of view of the telephoto camera 193-5, the electronic device 100 may make an adjustment from a case in which the image collected by the common camera 193-3 is used to a case in which an image collected by the telephoto camera 193-5 is used.

(3) The image collected by the telephoto camera 193-5 is used.

When using the image collected by the telephoto camera 193-5, the electronic device 100 may first display, in the preview box 314, the image collected by the telephoto camera 193-5, and then crop the image collected by the telephoto camera 193-5, and display a cropped image in the preview box 314. The electronic device 100 may crop, for a plurality of times, images sequentially collected by the telephoto camera 193-5. There is an increasingly small cropping region for the plurality of times of cropping.

The implementation that is of decreasing the angle of view during photographing preview and that is shown in FIG. 4B is used as an example. It is assumed that a preview angle presented by an image shown in an $(n+k)^{th}$ region is slightly greater than the angle of view of the telephoto camera 193-5. When an $(n+k)^{th}$ frame of image displayed by the electronic device 100 in the preview box 314 is the image shown in the $(n+k)^{th}$ region, a current zoom ratio is 2×, and the gesture of clenching a fist and pulling backward is recognized, an $(n+k+1)^{th}$ frame of image displayed by the electronic device 100 in the preview box 314 may be the image collected by the telephoto camera 193-5, and the zoom ratio may be increased to 2.1×.

When using the image collected by the telephoto camera 193-5, the electronic device first displays, in the preview box 314, the image collected by the telephoto camera 193-5, and then crops the image collected by the telephoto camera 193-5, and displays a cropped image in the preview box 314. The electronic device 100 may crop, for a plurality of times, images sequentially collected by the telephoto camera 193-5. There is an increasingly small cropping region for the plurality of times of cropping. A process of performing cropping for the plurality of times is a process of performing digital zoom for a plurality of times by the electronic device 100. In addition, in this process, the zoom ratio is gradually increased from 2.1×. For example, the zoom ratio may be increased from 2.1× to 2.2×, . . . , and increased from 2.9× to 3×.

In addition, for a user interface for adjusting a preview angle in a rear-facing video recording scenario, refer to the user interface for adjusting the preview angle in the front-facing video recording scenario. Details are not described herein.

Another photographing method provided in an embodiment of this application is described below.

In a front-facing photographing preview scenario, a front-facing video recording preview scenario, or a front-facing video recording scenario, when it is detected, by using an accelerometer, that acceleration at which an electronic device 100 moves away from a user exceeds a preset threshold, the electronic device 100 may increase a preview angle, to include more scenes in a preview box. For an implementation of increasing the preview angle, refer to the foregoing embodiments. Details are not described herein.

Figure 7A:
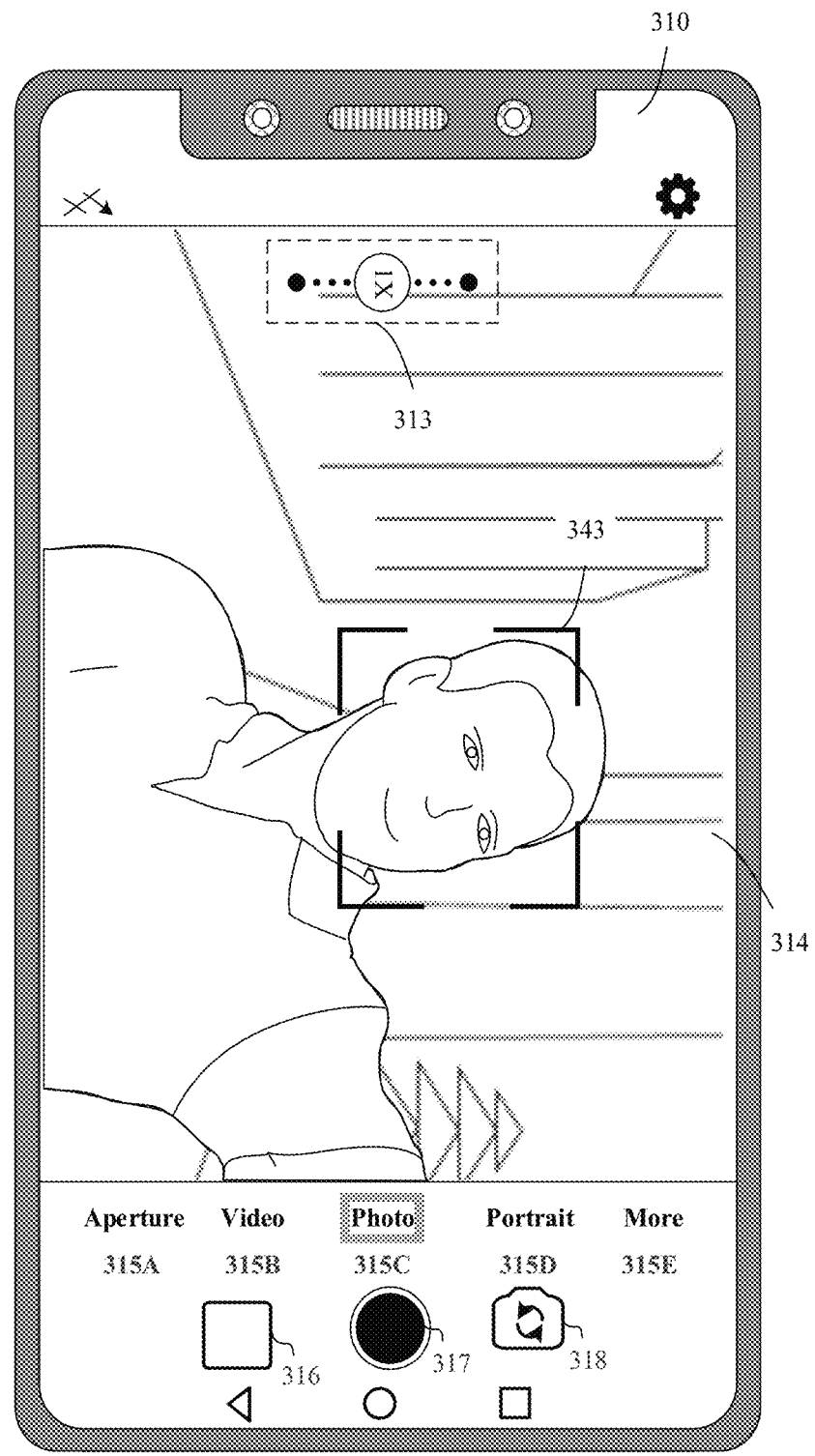
FIG. 7A and FIG. 7C show some user interfaces for performing photographing by an electronic device according to an embodiment of this application.
Figure 7B:
FIG. 7B is a schematic diagram of an application scenario of performing photographing by an electronic device according to an embodiment of this application.

For example, the electronic device 100 may display a user interface 310 shown in FIG. 7A. An image displayed in a preview box in the user interface 310 is from a common camera 193-1, and there is a relatively small preview angle. The image displayed in the preview box includes an image of a to-be-photographed object, for example, a face image of a to-be-photographed user. As shown in FIG. 7B, when the user starts a front-facing camera to take a selfie, the user may extend an arm, to include the user and a surrounding scene in the preview box 314. When the user extends the arm, the accelerometer in the electronic device 100 may detect the acceleration of movement of the electronic device 100, and whether the electronic device 100 moves away from the user is determined based on whether the image of the to-be-photographed object (for example, the face image of the to-be-photographed user) is reduced in a time t. If the image of the to-be-photographed object is reduced, it may be determined that the electronic device 100 moves away from the user. This constitutes no limitation. The electronic device 100 may determine, based only on motion data collected by the accelerometer, whether the electronic device 100 moves away from the user and the acceleration of movement.

Alternatively, the electronic device 100 may determine, based only on information indicating that the image of the to-be-photographed object is reduced or enlarged in a time t, whether the electronic device 100 moves away from the user, and determine the acceleration of movement of the electronic device 100 based on a degree to which the image of the to-be-photographed object is reduced or enlarged in the time t. If the image of the to-be-photographed object is reduced in the time t, it is determined that the electronic device 100 moves away from the user. If the image of the to-be-photographed object is enlarged in the time t, it is determined that the electronic device 100 approaches the user. If the to-be-photographed object is a person, when a face image is reduced, a facial recognition box 343 displayed in the preview box is correspondingly reduced. On the contrary, when the face image is enlarged, the facial recognition box 343 displayed in the preview box is correspondingly enlarged.

In this way, when determining that the electronic device 100 moves away from the user and the acceleration of movement exceeds the preset threshold, the electronic device 100 may increase the preview angle, for example, may gradually increase a preview angle presented by an image displayed in the preview box 314 to an angle of view of a wide-angle camera 193-2.

In other words, in the scenario of taking a selfie, the user may quickly extend the arm to increase the preview angle presented by the image displayed in the preview box 314 to the angle of view of the wide-angle camera 193-2.

In addition, in the front-facing photographing preview scenario, the front-facing video recording preview scenario, or the front-facing video recording scenario, when it is detected, by using the accelerometer, that acceleration at which the electronic device 100 moves towards the user exceeds the preset threshold, the electronic device 100 may decrease the preview angle. For an implementation of decreasing the preview angle, refer to the foregoing embodiments. Details are not described herein.

Figure 7C:
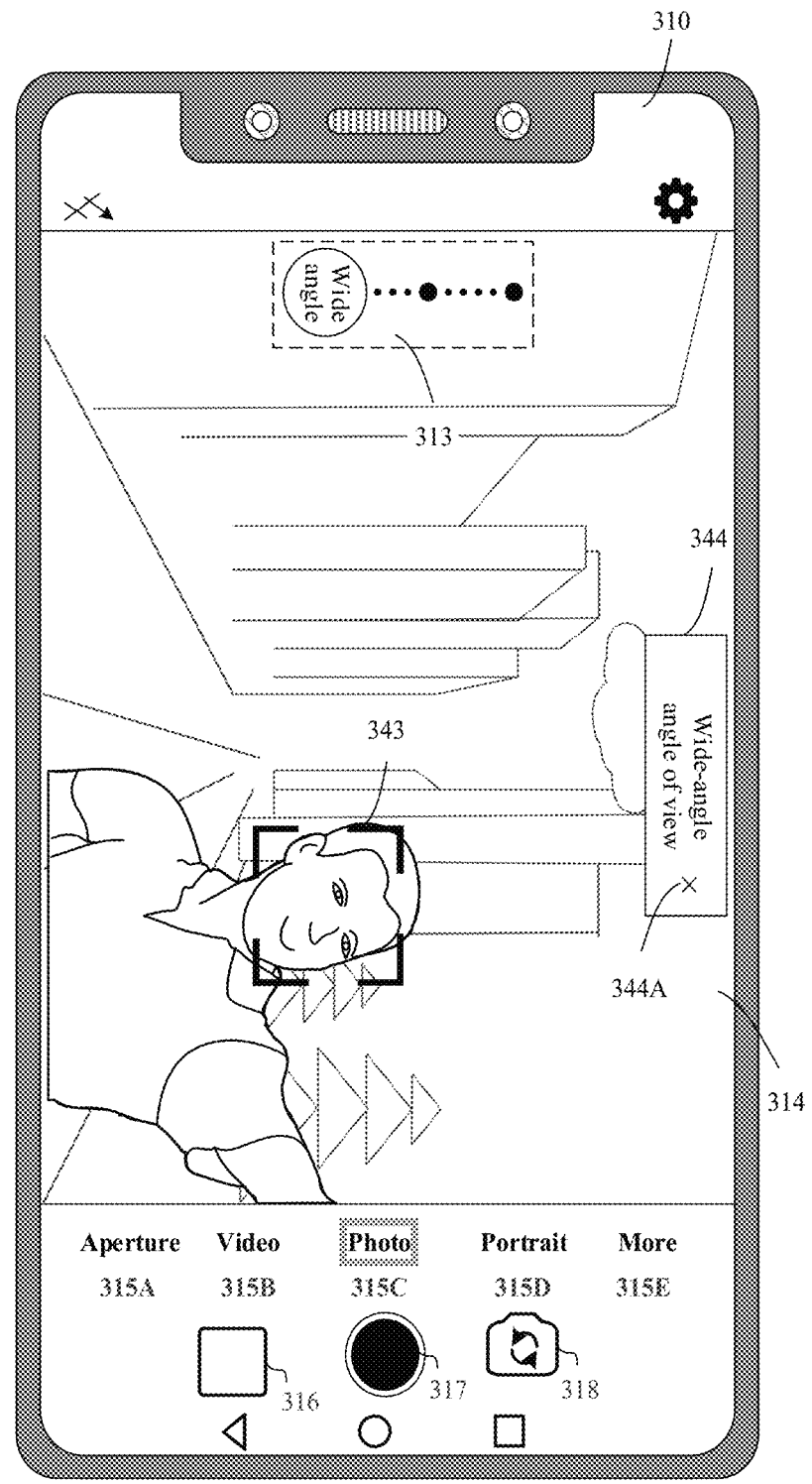

For example, the electronic device 100 may display a user interface 310 shown in FIG. 7C. An image displayed in a preview box in the user interface 310 is from the wide-angle camera 193-2, and there is a relatively large preview angle. When the user pulls the arm back, the accelerometer in the electronic device 100 may detect the acceleration of movement of the electronic device 100, and whether the electronic device 100 moves away from the user is determined based on whether the image of the to-be-photographed object is reduced in a time t. If the image of the to-be-photographed object is enlarged, it may be determined that the electronic device 100 moves towards the user.

Alternatively, the electronic device 100 may determine, based only on information indicating that the image of the to-be-photographed object is reduced or enlarged in a time t, whether the electronic device 100 approaches the user, and determine the acceleration of movement of the electronic device 100 based on a degree to which the image of the to-be-photographed object is reduced or enlarged in the time t. If the image of the to-be-photographed object is enlarged in the time t, it is determined that the electronic device 100 approaches the user. If the image of the to-be-photographed object is reduced in the time t, it is determined that the electronic device 100 moves away from the user.

In this way, when determining that the electronic device 100 moves towards the user and the acceleration of movement exceeds the preset threshold, the electronic device 100 may decrease the preview angle, for example, may gradually decrease the preview angle presented by the image displayed in the preview box 314 to an angle of view of the common camera 193-1.

This is not limited to the front-facing photographing preview scenario, the front-facing video recording preview scenario, or the front-facing video recording scenario, and a condition (namely, a movement of approaching or moving away from the user) for triggering increase or decrease of the preview angle in the foregoing content is also applicable to a rear-facing photographing preview scenario, a rear-facing video recording preview scenario, or a rear-facing video recording scenario.

A manner of triggering the mobile electronic device 100 to increase or decrease the preview angle is not limited in this embodiment of this application. For example, the user may trigger, by using a specific gesture of shaking the electronic device, to increase or decrease the preview angle.

Another photographing method provided in an embodiment of this application is described below.

Figure 8A:
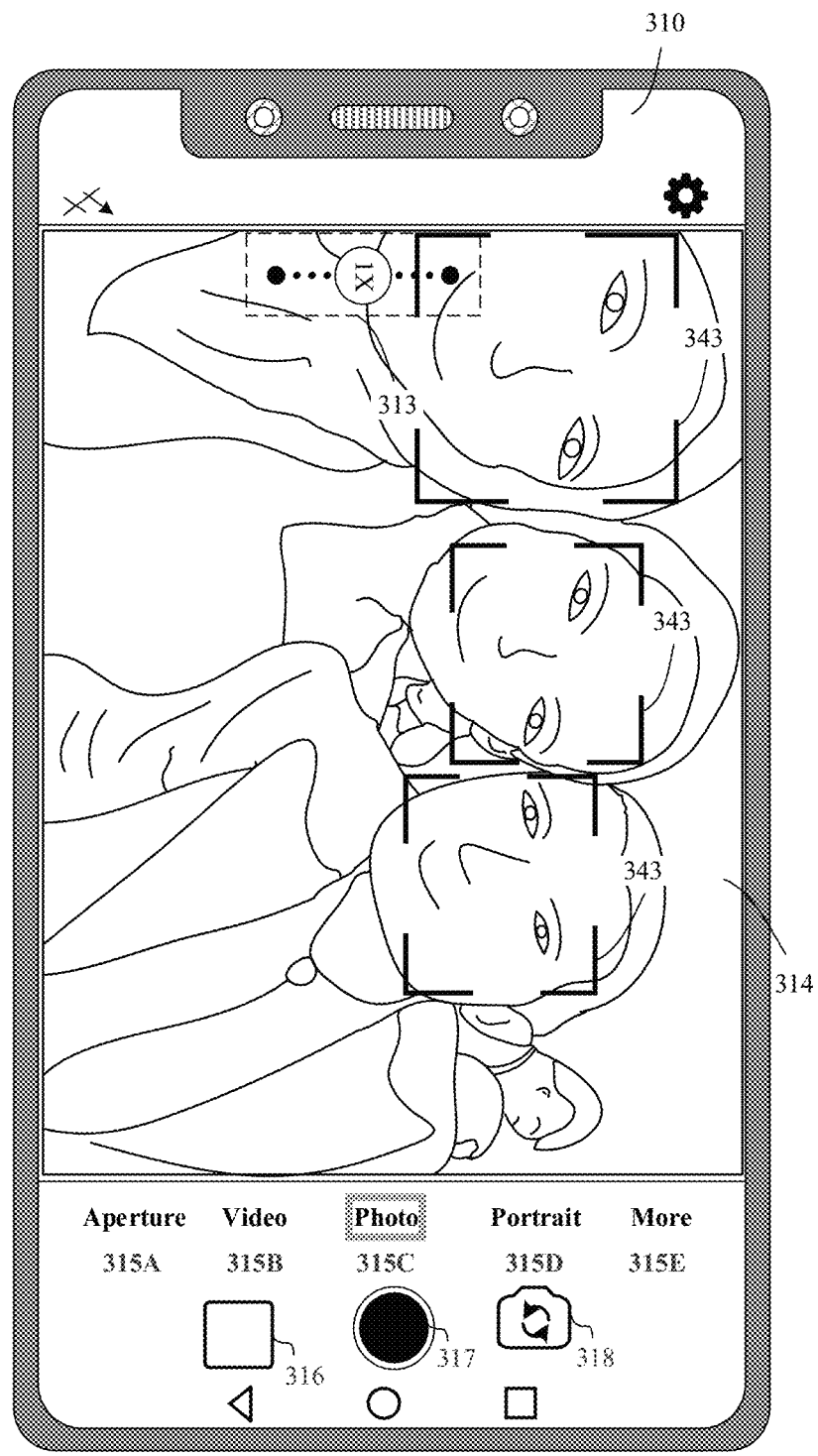
FIG. 8A and FIG. 8B show some other user interfaces for performing photographing by an electronic device according to an embodiment of this application.

In a photographing preview scenario, a video recording preview scenario, or a video recording scenario, an electronic device 100 may recognize a quantity N1 of faces included in an image displayed in a preview box 314 shown in FIG. 8A, and recognize a quantity N2 of human bodies included in the image. The electronic device 100 may compare N1 with N2. When N1 is greater than N2, it may indicate that a preview angle presented by the image currently displayed in the preview box 314 is relatively small, and both a face and a human body of a to-be-photographed object cannot be included in the preview box 314. In this case, the electronic device 100 may increase the preview angle, so that both the face and the human body of the to-be-photographed object are included in the preview box 314, in other words, the to-be-photographed object can be better photographed. Herein, the human body may be an entire human body, for example, includes an upper body and a lower body, or may be a part of a human body, for example, an upper body.

The electronic device 100 may recognize, through machine learning, the face and the human body included in the image in the preview box 314. A manner of recognizing the face and the human body is not limited in this embodiment of this application.

The electronic device 100 may compare a size of a recognized face in the preview image with a preset threshold (for example, a pixel area of 30×40), and add only a face whose size is greater than the preset threshold to the quantity N1 of faces. In this way, a probability that the electronic device 100 increases the photographing angle because a passerby is recognized can be reduced.

In a photographing scenario, the electronic device 100 may display a user interface 310 shown in FIG. 8A, and display, in the preview box 314, an image collected by a camera 193-1 with a common angle. The user interface 310 may include a zoom ratio 313, the preview box 314, and a plurality of face images. For description of the zoom ratio 313, the preview box 314, and the face image, refer to the description of the controls in the foregoing embodiments. Details are not described herein. The user interface 310 may further include more or fewer controls.

In the image displayed in the preview box shown in FIG. 8A, the electronic device 100 may determine that the quantity N1 of faces in the image is 3, and the quantity N2 of human bodies is 2. Sizes of the three faces are greater than the preset threshold. When N1 is greater than N2, the electronic device 100 may gradually increase, based on the preview angle (for example, an angle of view of the common camera 193-1) presented by the image currently displayed in the preview box 314, the preview angle presented by the image displayed in the preview box 314, until the electronic device 100 recognizes that the quantity N1 of faces that are in the image displayed in the preview box 314 and that exist after the preview angle is increased is equal to the quantity N2 of human bodies, or the preview angle presented by the image displayed in the preview box 314 is increased to a maximum angle (for example, an angle of view of a wide-angle camera 193-2).

For an implementation of increasing the preview angle, refer to the foregoing embodiments. Details are not described herein.

Figure 8B:
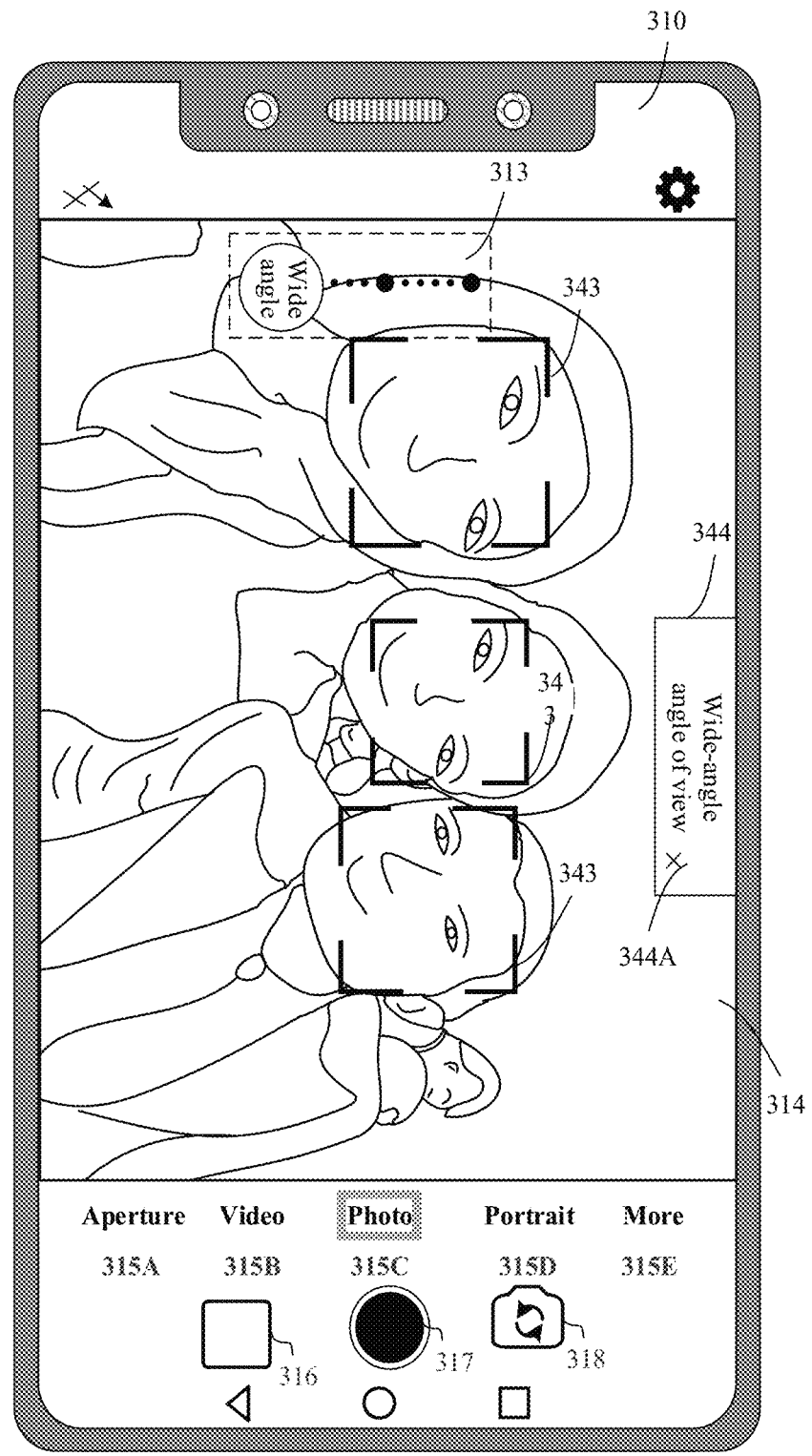

As shown in FIG. 8B, when increasing the preview angle presented by the image displayed in the preview box 314, the electronic device 100 may increase the preview angle presented by the image displayed in the preview box 314 to the angle of view of the wide-angle camera 193-2. In this case, the electronic device 100 may recognize that the quantity N1 of faces is 3, and the quantity N2 of human bodies is 3. A user interface 310 shown in FIG. 8B may include a plurality of face images and a current angle of view prompt 344. The current angle of view prompt 344 may be used to prompt a user with information indicating that the angle of view of the wide-angle camera 193-2 is currently changed to a wide angle of view. The current angle of view prompt 344 may include a cancel control 344A. In response to a user operation, for example, a tap operation, that acts on the cancel control 344A, the electronic device 100 may adjust the preview angle presented by the image displayed in the preview box 314 to the angle of view of the common camera 193-1 shown in FIG. 8A. In this way, in an application scenario in which the quantity of faces is greater than the quantity of human bodies in the preview box 314 and the user does not want to change the preview angle presented by the image displayed in the preview box 314 to the angle of view of the wide-angle camera 193-2, the electronic device may cancel, in response to the user operation acting on the cancel control 344A, adjustment of the preview angle presented by the image displayed in the preview box 314.

It may be learned from the foregoing embodiment that in an application scenario in which a plurality of to-be-photographed objects are photographed together (for example, a selfie is taken), when detecting that a preview angle presented by an image currently displayed in the preview box 314 is relatively small, and the plurality of to-be-photographed objects cannot be simultaneously included in the preview box, the electronic device may increase the preview angle, to provide convenience for the user to increase or decrease the preview angle during photographing and to perform photographing more efficiently.

This is not limited to portrait photographing. For photographing of a to-be-photographed object that is a scene of another type such as a building, when it is detected that an image displayed in the preview box does not include the entire to-be-photographed object, for example, the image includes only a torch part of the Statue of Liberty, the electronic device may increase a preview angle, so that the image in the preview box includes an image of the entire Statue of Liberty.

Figure 9:
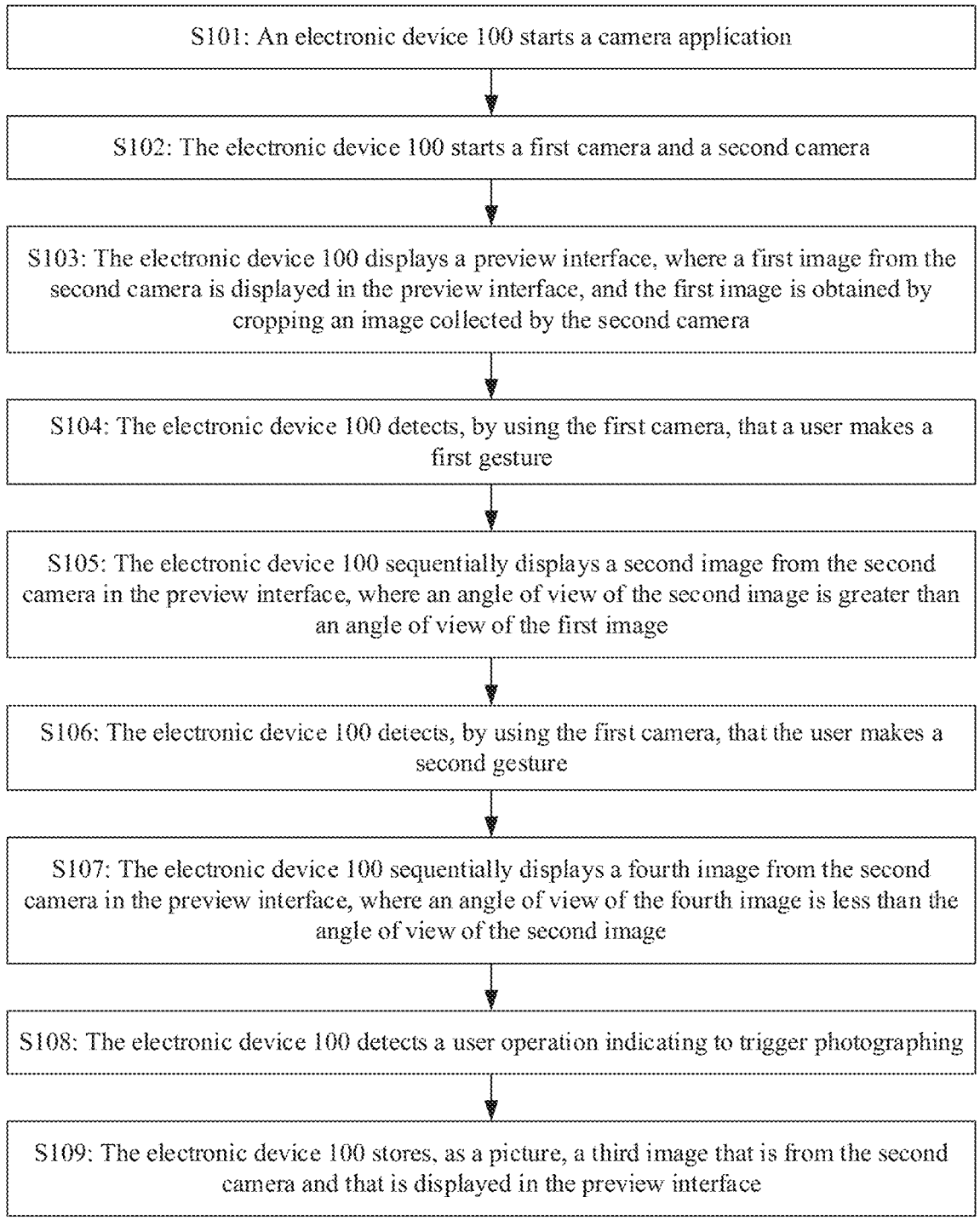
FIG. 9 shows an overall procedure of a photographing method according to an embodiment of this application.

Based on the electronic device 100 and the UI embodiments described in the foregoing content, the photographing method provided in this application is described in the following embodiment. As shown in FIG. 9, the method includes the following steps.

Phase 1 (S101-S105): Launch a photographing preview interface.

S101. The electronic device 100 starts a camera application.

For example, the electronic device 100 may detect a touch operation (for example, a tap operation on the icon 215D) acting on the camera icon 215D shown in FIG. 2C, and start the camera application in response to the operation.

S102. The electronic device 100 starts a first camera and a second camera.

Specifically, the first camera may be a front-facing camera, and may be configured to collect an image of a user. The second camera may be a front-facing camera or a rear-facing camera. The second camera may be configured to collect an image of a scene. Specifically, the second camera may be a front-facing camera or a rear-facing camera. For example, in a front-facing photographing scenario, the second camera is a front-facing camera; or in a rear-facing photographing scenario, the second camera is a rear-facing camera. The second camera may be one camera, for example, a common camera. Alternatively, the second camera may be a plurality of cameras with different optical angles, for example, a super telephoto camera, a telephoto camera, a common camera, a wide-angle camera, and an ultra-wide-angle camera.

In a possible case, in the front-facing photographing scenario, the second camera and the first camera may be a same camera, for example, a front-facing wide-angle camera or a common front-facing camera.

S103. The electronic device 100 displays a preview interface, where a first image from the second camera is displayed in the preview interface, and the first image is obtained by cropping an image collected by the second camera.

As shown in FIG. 3A, the preview interface includes a plurality of controls such as a zoom ratio 313, a preview box 314, a camera mode option 315, a shutter control 317, and a camera flip control 318. For functions of these controls, refer to the description in the foregoing UI embodiments. Details are not described herein.

The preview interface shown in FIG. 3A is used as an example. The first image displayed in the preview box 314 may be obtained by the electronic device by cropping the image collected by the second camera. Specifically, a central location of the preview image displayed in the preview box 314 may coincide with a central location of the image collected by the second camera. In this case, the first image displayed in the preview box 314 is obtained in a center cropping manner. When an angle of view presented by an image in a cropping region is the same as an angle of view presented by the image collected by the second camera, the preview image displayed in the preview box 314 may be the image collected by the second camera.

It should be noted that a preview image that is from a camera, that is displayed in the preview interface, and that is in this method is obtained by cropping an image collected by the camera.

Phase 2 (S104-S105): Increase an angle of view during photographing preview.

S104. The electronic device 100 detects, by using the first camera, that the user makes a first gesture.

Based on the image of the user collected by the first camera, the electronic device 100 may detect that the user makes the first gesture. Specifically, the electronic device 100 may collect an image and depth information of a hand of the user by using the first camera. When the image of the hand includes an image of the open palm, and the depth information indicates that the hand approaches the first camera, the electronic device 100 may determine that the user makes the first gesture. In other words, the first gesture is the gesture of extending a palm and pushing forward in the foregoing embodiment.

S105. The electronic device 100 may display a second image from the second camera in the preview interface, where an angle of view of the second image is greater than an angle of view of the first image.

Specifically, the angle of view of the second image displayed in the preview interface may be gradually increased. This may be specifically implemented as follows: The electronic device sequentially displays M second images from the second camera in the preview interface, where angles of view of the M second images are gradually increased, and M is a positive integer greater than or equal to 2.

The second camera may include H cameras with different angles of view, the H cameras are front-facing cameras or rear-facing cameras, and second images displayed in the preview interface may be sequentially from the H cameras with ascending angles of view, where H is a positive integer greater than or equal to 2.

For example, H is 2, that is, the second camera includes two cameras with different angles of view. The two cameras may be respectively a third camera and a fourth camera. An angle of view of the fourth camera is greater than an angle of view of the third camera. The first image may be from the third camera, and the second image may be from the fourth camera. Both the third camera and the fourth camera may be front-facing cameras or rear-facing cameras.

In a process in which the user makes the first gesture, the electronic device 100 may sequentially display a plurality of preview images from a common camera in the preview interface, and then continue to sequentially display a plurality of preview images from a wide-angle camera in the preview interface. Preview angles respectively presented by the plurality of preview images from the common camera may be gradually increased. Preview angles respectively presented by the plurality of preview images from the wide-angle camera may be gradually increased. The plurality of preview images from the common camera and the plurality of preview images from the wide-angle camera may form the M preview images from the second camera. A preview angle presented by an image last displayed in the plurality of preview images from the common camera is less than a preview angle presented by an image first displayed in the plurality of preview images from the wide-angle camera. An image first displayed in the plurality of preview images from the common camera may be the same as an image first displayed in the M preview images from the second camera. An image last displayed in the plurality of preview images from the wide-angle camera is the same as an image last displayed in the M preview images from the second camera.

As shown in FIG. 3B to FIG. 3D, in the process in which the user makes the first gesture, the electronic device 100 may increase the angle of view during photographing previewing. For a specific implementation, refer to the UI embodiment in FIG. 3B to FIG. 3D. Details are not described herein.

Phase 3 (S106-S107): Decrease the angle of view during photographing preview.

S106. The electronic device 100 detects, by using the first camera, that the user makes a second gesture.

Based on the image of the user collected by the first camera, the electronic device 100 may detect that the user makes the second gesture. Specifically, the electronic device 100 may collect an image and depth information of a hand of the user by using the first camera. When the image of the hand includes an image in which the hand clenches a fist, and the depth information indicates that the hand moves away from the first camera, the electronic device 100 may determine that the user makes the second gesture. In other words, the first gesture is a gesture of clenching a fist by the hand of the user and the hand of the user moves away from the first camera.

S107. In a process in which the user makes the second gesture, the electronic device 100 displays a fourth image from the second camera in the preview interface, where an angle of view of the fourth image is less than the angle of view of the second image.

Specifically, the angle of view of the second image displayed in the preview interface may be gradually decreased. This may be specifically implemented as follows. The electronic device sequentially displays N fourth images from the second camera in the preview interface, where angles of view of the N fourth images are gradually decreased, and N is a positive integer greater than or equal to 2.

The second camera may include H cameras with different angles of view, the H cameras are front-facing cameras or rear-facing cameras, and fourth images displayed in the preview interface may be sequentially from the H cameras with descending angles of view, where H is a positive integer greater than or equal to 2.

For example, H is 2, that is, the second camera includes two cameras with different angles of view. The two cameras may be respectively a third camera and a fourth camera. An angle of view of the fourth camera is greater than an angle of view of the third camera. The fourth image may be from the third camera, and the second image may be from the fourth camera.

In the process in which the user makes the second gesture, the electronic device 100 may sequentially display a plurality of preview images from the wide-angle camera in the preview interface, and then continue to sequentially display a plurality of preview images from the common camera in the preview interface. Preview angles respectively presented by the plurality of preview images from the common camera may be gradually decreased. Preview angles respectively presented by the plurality of preview images from the wide-angle camera may be gradually decreased. The plurality of preview images from the wide-angle camera and the plurality of preview images from the common camera may form the N preview images from the second camera. A preview angle presented by an image last displayed in the plurality of preview images from the wide-angle camera is greater than a preview angle presented by an image first displayed in the plurality of preview images from the common camera. An image first displayed in the plurality of preview images from the wide-angle camera is the same as an image first displayed in the N preview images from the second camera. An image last displayed in the plurality of preview images from the common camera is the same as an image last displayed in the N preview images from the second camera.

As shown in FIG. 3E to FIG. 3G, in the process in which the user makes the second gesture, the electronic device 100 may decrease the angle of view during photographing previewing. For a specific implementation, refer to the UI embodiment in FIG. 3E to FIG. 3G. Details are not described herein.

Phase 4 (S108-S109): Trigger photographing and store a picture.

S108. The electronic device 100 detects a user operation indicating to trigger photographing.

The user operation indicating to trigger photographing may be a tap operation acting on the shutter control 317 shown in FIG. 3A. Alternatively, when a smile capture mode is enabled, the user operation indicating to trigger photographing may be a smile recognized by the electronic device 100 in the preview image displayed in the preview interface. In other words, the user may trigger photographing by making a smile.

In this embodiment of this application, a time at which the electronic device 100 detects the user operation indicating to trigger photographing is not limited. For example, the electronic device 100 may detect, after performing the phase 2, that is, after increasing the angle of view during photographing preview, the user operation indicating to trigger photographing. The electronic device 100 may detect, after performing the phase 3, that is, after decreasing the angle of view during photographing preview, the user operation indicating to trigger photographing. The electronic device 100 may detect, after sequentially performing the phase 2 and the phase 3, that is, after sequentially increasing the angle of view during photographing preview and decreasing the angle of view during photographing preview, the user operation indicating to trigger photographing. Alternatively, the electronic device 100 may detect, after sequentially performing the phase 3 and the phase 2, that is, after sequentially decreasing the angle of view during photographing preview and increasing the angle of view during photographing preview, the user operation indicating to trigger photographing.

S109. The electronic device 100 stores, as a picture, a third image that is from the second camera and that is displayed in the preview interface.

In a possible case, the electronic device 100 performs only the phase 2, and after performing the phase 2, detects the user operation indicating to trigger photographing. In this case, an angle of view of the third image may be the same as the angle of view of the second image.

In a possible case, after sequentially performing the phase 2 and the phase 3, the electronic device 100 detects the user operation indicating to trigger photographing. In this case, an angle of view of the third image may be the same as the angle of view of the fourth image.

In a possible case, the electronic device 100 performs only the phase 3, and after performing the phase 3, detects the user operation indicating to trigger photographing. In this case, an angle of view of the third image may be less than the angle of view of the first image.

In a possible case, after sequentially performing the phase 3 and the phase 2, the electronic device 100 detects the user operation indicating to trigger photographing. In this case, an angle of view of the third image may be the same as the angle of view of the first image.

It may be learned that in the photographing method provided in this embodiment of this application, the user may adjust, by using a mid-air gesture of a single hand, the preview angle presented by the image displayed in the preview box. Especially in a scenario in which photographing is performed by using the front-facing camera, the user usually performs photographing by straightening an arm or by using a selfie stick. However, in the photographing method in this solution, the user may conveniently adjust the preview angle presented by the image displayed in the preview box. In this way, the user does not need to repeatedly hold the electronic device close and touch a screen of the electronic device with a finger to adjust the preview angle presented by the image displayed in the preview box.

In addition, when the user holds the electronic device close to adjust the preview angle presented by the image displayed in the preview box, a scene displayed in the preview box is usually not a scene that the user wants to capture. However, in the photographing method in this solution, while adjusting the preview angle presented by the image displayed in the preview box, the user may feel a change of the scene displayed in the preview box. In this case, the change of the scene displayed in the preview box is usually a scene that the user wants to capture. In this way, the user may quickly obtain a desired view while adjusting the preview angle presented by the image displayed in the preview box.

The method for increasing or decreasing the angle of view during photographing preview in steps S101 to S107 is also applicable to increasing or decreasing an angle of view during video recording preview and increasing or decreasing an angle of view in a video recording process. After the angle of view in the video recording process is increased or decreased, if a user operation indicating to stop video recording is detected, the electronic device 100 may store, as a video, a preview image displayed in the preview interface in the video recording process.

As shown in FIG. 5D to FIG. 5I, in the video recording process, the electronic device 100 may detect the first gesture and the second gesture, to increase or decrease the angle of view in the video recording process. For a specific implementation, refer to the UI embodiment in FIG. 5D to FIG. 5I.

As shown in FIG. 5J to FIG. 5O, the electronic device 100 may play a video stored after video recording ends. It may be learned from the video play interface shown in FIG. 5, to FIG. 5O that a preview angle presented by a preview image is gradually increased in a process in which the user makes the first gesture, and gradually decreased in a process in which the user makes the second gesture. For a specific implementation, refer to the UI embodiment in FIG. 5J to FIG. 5O.

Further, in the photographing method provided in this embodiment of this application, a function of performing switching to a larger angle of view (for example, an angle of view of the wide-angle camera) in one step may be further implemented.

Specifically, if a speed at which the hand of the user approaches the first camera when the user makes the first gesture exceeds a first speed, the angle of view of the second image may be the same as a first angle of view. The first angle of view is the same as the angle of view of the wide-angle camera, the first angle of view is the same as an angle of view of an ultra-wide-angle camera, a difference between the first angle of view and the angle of view of the wide-angle camera is less than a first value, or a difference between the first angle of view and an angle of view of an ultra-wide-angle camera is less than a second value.

That a difference between the first angle of view and the angle of view of the wide-angle camera is less than a first value means that the first angle of view is very close to the angle of view of the wide-angle camera, and that a difference between the first angle of view and an angle of view of an ultra-wide-angle camera is less than a second value means that the first angle of view is very close to the angle of view of the ultra-wide-angle camera.

For example, the first angle of view may be the angle of view of the wide-angle camera. The electronic device may collect the depth information of the hand of the user by using the first camera. The depth information may indicate that the hand of the user approaches the first camera. Based on a distance at which the hand of the user approaches the first camera in a time t, the electronic device may calculate the speed at which the hand of the user approaches the first camera when the user makes the first gesture. When detecting that the speed at which the hand of the user approaches the first camera when the hand of the user makes the first gesture exceeds the first speed, the electronic device may perform switching to the angle of view (namely, the first angle of view) of the wide-angle camera in one step in the preview interface.

In other words, the user may open the palm and quickly push forward. When a speed of pushing forward exceeds the first speed, switching to a larger angle of view, for example, the angle of view of the wide-angle camera, may be implemented in one step, to quickly switch the angle of view.

Further, in the photographing method provided in this embodiment of this application, a function of performing switching to a smaller angle of view (for example, an angle of view of the common camera) in one step may be further implemented.

Specifically, if a speed at which the hand of the user moves away from the first camera when the user makes the second gesture exceeds a second speed, the angle of view of the fourth image may be the same as the angle of view of the first image.

For example, the electronic device 100 may collect the depth information of the hand of the user by using the first camera. The depth information may indicate that the hand of the user moves away from the first camera. Based on a distance at which the hand of the user moves away from the first camera in a time t, the electronic device 100 may calculate the speed at which the hand of the user moves away from the first camera when the user makes the second gesture. When detecting that the speed at which the hand of the user moves away from the first camera when the hand of the user makes the second gesture exceeds the second speed, the electronic device 100 may perform switching to the angle of view of the common camera in one step in the preview interface.

In other words, the user may clench a fist and quickly pull forward. When a speed of pulling backward exceeds the second speed, switching to a smaller angle of view, for example, the angle of view of the common camera, may be implemented in one step, to quickly switch the angle of view.

For content not mentioned in the method embodiment in FIG. 9, refer to the foregoing UI embodiments. Details are not described herein.

According to the context, the term "when" used in the foregoing embodiments may be interpreted as a meaning of "if" or "after" or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

What is claimed is:

1. A photographing method implemented by an electronic device, wherein the photographing method comprises:
starting a first camera of the electronic device and a second camera of the electronic device;
displaying a preview interface on a screen of the electronic device;
displaying a first image from the second camera in the preview interface, wherein the first camera and the screen are disposed on a same side of the electronic device;

detecting, using the first camera, that a user makes a first gesture;

displaying, in response to the first gesture, a second image from the second camera in the preview interface, wherein a second angle of view of the second image is greater than a first angle of view of the first image;

detecting a first user input; and storing, as a picture or a video and in response to the user input, a third image from the second camera that is displayed in the preview interface.

2. The photographing method of claim 1, further comprising gradually increasing the second angle of the view.

3. The photographing method of claim 1, wherein the second camera comprises a third camera and a fourth camera, wherein a fourth angle of view of the fourth camera is greater than a third angle of view of the third camera, wherein the first image is from the third camera, and wherein the second image is from the fourth camera.

4. The photographing method of claim 1, wherein the second camera comprises H cameras with different angles of view, wherein the H cameras are front-facing cameras or rear-facing cameras, wherein second images displayed in the preview interface are sequentially from the H cameras with ascending angles of view, and wherein H is a positive integer greater than or equal to 2.

5. The photographing method of claim 1, wherein a third angle of view of the third image is the same as the second angle of view.

6. The photographing method of claim 1, further comprising:

detecting, using the first camera, that the user makes a second gesture; and displaying, in response to the second gesture, a fourth image from the second camera in the preview interface, wherein a third angle of view of the fourth image is less than the second angle of view.

7. The photographing method of claim 6, further comprising gradually decreasing the third angle of view.

8. The photographing method of claim 6, wherein the second camera comprises a third camera and a fourth camera, wherein a fourth angle of view of the fourth camera is greater than a fifth angle of view of the third camera, wherein the fourth image is from the third camera, and wherein the second image is from the fourth camera.

9. The photographing method of claim 6, wherein the second camera comprises H cameras with different angles of view, wherein the H cameras are front-facing cameras or rear-facing cameras, wherein fourth images displayed in the preview interface are sequentially from the H cameras with descending angles of view, and wherein H is a positive integer greater than or equal to 2.

10. The photographing method of claim 6, wherein a fourth angle of view of the third image is the same as the third angle of view.

11. The photographing method of claim 1, further comprising:

collecting, using the first camera, a fourth image of a hand of the user and depth information of the hand; and further detecting that the user makes the first gesture when the fourth image comprises a fifth image of an open palm and the depth information indicates that the hand approaches the first camera, wherein the first gesture comprises that the user has the open palm and the hand approaches the first camera.

12. The photographing method of claim 6, further comprising:

collecting, using the first camera, a fifth image of a hand of the user and depth information of the hand; and further detecting that the user makes the second gesture when the fifth image comprises a sixth image in which the hand clenches a fist and the depth information indicates that the hand moves away from the first camera, wherein the second gesture comprises that the hand clenches the first and the hand moves away from the first camera.

13. The photographing method of claim 1, wherein when a first speed at which a hand of the user approaches the first camera when the user makes the first gesture exceeds a first second speed, the second angle of view is the same as a third angle of view, wherein a first difference between the third angle of view and a fourth angle of view of a wide-angle camera is less than a first value, or wherein a second difference between the first third angle of view and a fifth angle of view of an ultra-wide-angle camera is less than a second value.

14. The photographing method of claim 6, wherein the third angle of view is the same as the first angle of view when a first speed at which a hand of the user moves away from the first camera when the user makes the second gesture exceeds a second speed.

15. The photographing method of claim 3, wherein the fourth camera is a front-facing wide-angle camera or a rear-facing wide-angle camera.

16. The photographing method of claim 1, wherein the first camera comprises a front-facing camera.

17. The photographing method of claim 16, wherein the second camera and the first camera are a same camera.

18. A photographing method implemented by an electronic device, wherein the photographing method comprises:

starting a camera of the electronic device;

displaying a preview interface on a screen of the electronic device;

displaying a first image from the camera in the preview interface;

detecting that the electronic device makes a first movement of moving away from a to-be-photographed object by and a moving speed of the electronic device exceeds a first speed;

displaying, in response to the first movement and the moving speed exceeding the first speed, a second image from the camera in the preview interface, wherein a second angle of view of the second image is greater than a first angle of view of the first image;

detecting a user input; and storing, as a picture or a video and in response to the user input, a third image that is from the camera and that is displayed in the preview interface.

19. The photographing method of claim 18, further comprising gradually increasing the second angle of view.

20. An electronic device comprising:

a first side;

a screen disposed on the first side;

a first camera disposed on the first side;

a second camera; and a processor coupled to the screen, the first camera, and the second camera and configured to:

start the first camera and the second camera;

display a preview interface on the screen;

display a first image from the second camera in the preview interface;

detect, using the first camera, that a user makes a first gesture;

display, in response to the first gesture, a second image from the second camera in the preview interface, wherein a second angle of view of the second image is greater than a first angle of view of the first image;
detect a user input; and
store, as a picture or a video and in response to the user input, a third image that is from the second camera and that is displayed in the preview interface.

\* \* \* \* \*

UNITED STATES PATENT AND TRADEMARK OFFICE
CERTIFICATE OF CORRECTION

PATENT NO. : 12,022,183 B2
APPLICATION NO. : 17/922252
DATED : June 25, 2024
INVENTOR(S) : Lei Wu It is certified that error appears in the above-identified patent and that said Letters Patent is hereby corrected as shown below:

In the Claims

Claim 13, Column 50, Line 14: "camera when the user makes the first gesture exceeds a first" should read "camera when the user makes the first gesture exceeds a"

Claim 13, Column 50, Line 19: "difference between the first third angle of view and a fifth" should read "difference between the third angle of view and a fifth"

Claim 18, Column 50, Line 42: "object by and a moving speed of the electronic device" should read "object and a moving speed of the electronic device"

Signed and Sealed this
Sixth Day of August, 2024

Katherine Kelly Vidal
*Director of the United States Patent and Trademark Office*